US007733366B2

(12) United States Patent
Beavers et al.

(10) Patent No.: US 7,733,366 B2
(45) Date of Patent: *Jun. 8, 2010

(54) COMPUTER NETWORK-BASED, INTERACTIVE, MULTIMEDIA LEARNING SYSTEM AND PROCESS

(75) Inventors: Jay Beavers, Duvall, WA (US); Randy Hinrichs, Sammamish, WA (US); Sarah Papp, Wilton, CT (US); Richard Anderson, Seattle, WA (US); Jeff Baxter, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1758 days.

This patent is subject to a terminal disclaimer.

(21) Appl. No.: 10/371,537

(22) Filed: Feb. 21, 2003

(65) Prior Publication Data

US 2004/0002049 A1      Jan. 1, 2004

Related U.S. Application Data

(63) Continuation-in-part of application No. 10/305,319, filed on Nov. 25, 2002, now Pat. No. 7,487,211.

(60) Provisional application No. 60/392,898, filed on Jul. 1, 2002.

(51) Int. Cl.
*H04N 7/14* (2006.01)
*G09B 3/00* (2006.01)
*G06F 9/00* (2006.01)
*H04L 9/00* (2006.01)
*G09B 7/00* (2006.01)

(52) U.S. Cl. .................... 348/14.08; 434/322; 434/118; 709/204; 713/163; 713/162

(58) Field of Classification Search ............... 434/350, 434/322, 118; 348/14.08; 709/204; 713/162, 713/163
See application file for complete search history.

(56) References Cited

U.S. PATENT DOCUMENTS

| 5,767,897 | A | * | 6/1998 | Howell | 348/14.07 |
| 5,862,329 | A | * | 1/1999 | Aras et al. | 709/204 |
| 5,991,276 | A | * | 11/1999 | Yamamoto | 370/260 |
| 6,074,216 | A | * | 6/2000 | Cueto | 434/322 |
| 6,108,687 | A | * | 8/2000 | Craig | 709/203 |
| 6,138,144 | A |   | 10/2000 | DeSimone et al. | |

(Continued)

OTHER PUBLICATIONS

"Multicast—Wikipedia, the free encyclopedia", http://en.wikipedia.org/wiki/Multicast, printed on Sep. 24, 2007, pp. 1-4.

(Continued)

*Primary Examiner*—Peter DungBa Vo
*Assistant Examiner*—Frank M Leiva
(74) *Attorney, Agent, or Firm*—Lyon & Harr, LLP; Richard T. Lyon

(57) ABSTRACT

A system and process for network-based, interactive, multimedia learning is presented. The learning system and process employs high quality, low latency audio/video links over a multicast network (such as Internet2), as well as an interactive slideshow that allows annotations to be added by both the presenter and lecture participants, a question management feature that allows participants to submit questions and receive answers during the lecture or afterwards, and a complete archiving of the data streams and metadata associated with the foregoing features.

11 Claims, 41 Drawing Sheets

U.S. PATENT DOCUMENTS

| | | | |
|---|---|---|---|
| 6,155,840 A * | 12/2000 | Sallette | 434/323 |
| 6,173,317 B1 * | 1/2001 | Chaddha et al. | 709/219 |
| 6,288,739 B1 | 9/2001 | Hales et al. | |
| 6,438,604 B1 | 8/2002 | Kuver et al. | |
| 6,463,471 B1 | 10/2002 | Dreke et al. | |
| 6,556,588 B2 | 4/2003 | Wan et al. | |
| 6,594,703 B1 | 7/2003 | Li | |
| 6,760,749 B1 * | 7/2004 | Dunlap et al. | 709/204 |
| 6,901,448 B2 | 5/2005 | Zhu et al. | |
| 6,909,708 B1 * | 6/2005 | Krishnaswamy et al. | 370/352 |
| 7,391,432 B2 * | 6/2008 | Terada | 348/14.08 |
| 2001/0012304 A1 | 8/2001 | Agraharam et al. | |
| 2001/0037472 A1 | 11/2001 | Li | |
| 2002/0019978 A1 * | 2/2002 | Terretta | 725/34 |
| 2002/0048275 A1 | 4/2002 | Atwater et al. | |
| 2002/0056123 A1 * | 5/2002 | Liwerant et al. | 725/87 |
| 2002/0065885 A1 * | 5/2002 | Buonanno et al. | 709/205 |
| 2002/0101997 A1 * | 8/2002 | Curtis et al. | 380/279 |
| 2002/0143951 A1 | 10/2002 | Khan et al. | |
| 2003/0005035 A1 | 1/2003 | Rodgers | |
| 2003/0041183 A1 * | 2/2003 | LaPierre et al. | 710/1 |
| 2003/0090506 A1 * | 5/2003 | Moore et al. | 345/730 |
| 2003/0182428 A1 | 9/2003 | Li et al. | |
| 2003/0194690 A1 * | 10/2003 | Wessner et al. | 434/350 |
| 2005/0223069 A1 * | 10/2005 | Cooperman et al. | 709/206 |

OTHER PUBLICATIONS

"Multicast: Information and Much More from Answers.com", http://www.answers.com/multicast?cat=technology. printed on Sep. 24, 2007, pp. 1-7.

"What is multicast?—A Word Definition From the Webopedia Computer Dictionary", http://www.webopedia.com/TERM/m/multicast.html, printed on Sep. 24, 2007, p. 1.

Final Office Action, Apr. 9, 2008, U.S. Appl. No. 10/305,319, Quang Nguyen.

Office Action, Sep. 27, 2007, U.S. Appl. No. 10/305,319, Quang Nguyen.

Office Action, Apr. 24, 2007, U.S. Appl. No. 10/305,319, Quang Nguyen.

Final Office Action, Dec. 14, 2006, U.S. Appl. No. 10/305,319, Quang Nguyen.

Office Action, Jul. 24, 2006, U.S. Appl. No. 10/305,319, Quang Nguyen.

* cited by examiner

COMPUTER NETWORK-BASED, INTERACTIVE, MULTIMEDIA LEARNING SYSTEM AND PROCESS

CROSS-REFERENCE TO RELATED APPLICATIONS

This application claims the benefit of a previously-filed provisional patent application Ser. No. 60/392,898 filed on Jul. 1, 2002. In addition, this application is a continuation-in-part of a prior application entitled "A/V INTERACTIVE, COMPUTER NETWORK-BASED VIDEO LEARNING SYSTEM AND PROCESS" which was assigned Ser. No. 10/305,319 and filed Nov. 25, 2002 now U.S. Pat. No. 7,487,211.

BACKGROUND

1. Technical Field

The invention is related to on-line, network-based learning systems, and more particularly to a system and process for providing a distributed, interactive, multimedia lecture that employs high quality, low latency audio/video links over a multicast network (such as Internet2), an interactive slideshow that allows annotations to be added by both the presenter and lecture participants, a question management feature that allows participants to submit questions and receive answers during the lecture or afterwards, and a complete archiving of the data streams and metadata associated with the foregoing features.

2. Background

The integration of wireless, distributed technology into the classroom has only just begun. To date this effort has primarily focused this technology at imitating the traditional classroom lecture environment. Only now are new models for advancing education based on a new generation of interactive technologies beginning to be explored. New methods for immersive hands-on learning, learning by doing, and interactive collaboration portend an evolution in classroom instruction. Technology today is opening new horizons for expanding the learning process. With recent advances in conferencing, network technologies, computer hardware and visualization technologies, a new frontier for advancing the human learning process is opening up. The quest should include researching and prototyping pedagogically sound technologies that offer educators an advantage in using the exponential raw power of emerging hardware and software. The key is to integrate modern learning methods (especially active based learning methods) into scalable software designs and build reliable software that uses emerging communication, collaboration, and integrative programming solutions.

Further, learner centric technologies must be created which shift away from solely lecture-based environments with pen and paper assessment. This shift to a learning-centric perspective will require instructors and their institutions not only to share traditional content resources in online formats, but to support enriched collaborative learning environments that can transform today's online page turning courses into opportunities to increase the learning outcomes of instruction.

The underbelly of integrating information and communication technology into the classroom is the ability to capture the learner's experience and provide adequate feedback and response. This vision requires the development of technologies that encourage immersion and exponentially engage the user in multiple activities, capturing both implicit and explicit knowledge interactions. It is the preamble of learning by doing and capturing the learning experience for personalizing education that may dominate the best designs.

There will also be a need to integrate technology into the collective learning experience, spanning beyond the initial experience in grades K-12, through university education through industrial education and into lifelong learning. Learning environments must reach beyond the school walls and directly into the home and workplace. Continuous learning for working adults requires technologies that support alternative delivery of educational programs.

Given the rapid advances in hardware and software development, the world's universities are currently developing compelling new learning environments for education. CPU power advances have already provided unprecedented computational power for problem formulation and solution presentation. Graphics power has enriched the experience and aided in visualizing concepts. Storage and networking have enabled digital libraries, instant communication, and wireless classrooms. Having come this far with current technological capability, imagine what this kind of power will enable for $21^{st}$ century scholarship and academics. It will connect people together in unique ways, help manage complex problem based learning environments; bring federated resources together for analysis, synthesis and interaction. It will facilitate the creation of connected learning communities.

But the desired rich collaborative experiences, pedagogically sound technology integration, embedded assessment, shared internet based laboratories, rich video conferencing technology, immersive constructive environments, and even a methodology for integrating technology into the classroom that is not disruptive, nor socially handicapped, has yet to be achieved.

While 97 percent of teachers have access to some computer technology today, only 32 percent are integrating computers in classroom learning. Introducing technology into the classroom is one thing, introducing it effectively is another. Too much effort has been concentrated on recreating the classroom, rather than using wireless distributed technology to extend the classroom, making instruction more flexible for the learner, the mentor and the instructor, while focusing on the experience of learning.

Traditional classrooms today fall short of providing sound education because they lack the flexibility to create a scaleable environment in which the students continually practice their art. In fact, most instruction today, reiterates teacher centric presentation models, videotaping the instructor with either Mylar or a slide presentation as a presentation mechanism, while students take notes on paper or computers. In addition, the interaction models are slow-paced and repetitive, hardly challenging to the "twitch speed generation" who are used to navigating both visual and textual data as rapidly as star fighters. Usually, in most learning environments, the teacher lectures, the student interrupts occasionally to ask a few questions, and dialogue is usually minimal, unless class size is restricted. Students read textbooks and work on textually based problems. Teacher office hours are the only way to talk to the faculty member or teaching assistant. Assessment is comprised of tests with long feedback loops or long lines waiting to get into laboratories.

Industry hasn't really achieved great gains in e-technologies for learning either. They have designed similar teacher centric electronic, distance learning environments, using lecture based technologies as the design model. E-learning applications in industry still focus primarily on the instructor as the active participant, and the learner as the passive participant. They have encouraged presence awareness but only simulate learner passivity. Tools for interacting with the instructor or each other are extremely limited. They are not designing e-learning systems to meet the skills required for problem solving in work environments.

Thus, neither university, nor industry has utilized the technology yet to enable the workforce to enhance their skills for employability.

To correct the shortcomings of existing technology-based learning systems, a set of core technologies is needed for building high bandwidth and optimal bandwidth learning services. The core technologies must include video conferencing capabilities that represent a vast improvement over existing systems. Low latency video grid conferencing is needed to allow for enriched immersion in a lecture based environments across multiple venues. Imagine being able to see live lectures and live learner and instructor interactions in those lectures across multiple learning environments. This visually immersive conferencing technology should be designed for ease of use, with rich educational experience, and scalability. It should also accommodate the use of new portable computing devices such as wireless PocketPCs and TabletPCs. In addition, it should include a simple, configurable archival system enabling individual participants to record and playback conferences and student and teacher interactions.

This technology should be designed and architected to be very scalable; from a single-machine deployment for small conferences and personal nodes, up to large, group-to-group-to-group conference scenarios, relying on simple software installation and hardware configuration.

The aim is to point the technology at collaborative working groups over real-time protocols meeting in classrooms, conferences, workspaces, in the field, etc. and couple it with wireless technologies for accessing federated scholarly data anywhere, anytime. A set of learning services could be built that address the pedagogical needs of the various users in the learning experience around conferencing technology, including the student, instructor, teaching assistant/mentor. The use of portable wireless computing devices such as the TabletPC will facilitate the creation of a more project based environment that allows students to move around, receive instruction, aggregate project work, integrate with others and take notes in their normal handwriting.

Thus, video conferencing technologies do not have to simply imitate the lecturer standing in front of the class. Instead, they can be used as a way of participating in a classroom, or in a conference room, the field, or a laboratory, virtually anywhere learning happens. When used effectively, the use of collaborative technology suggests that significant gains in student achievement will be achieved. For example, it has been found that students who viewed videotaped university-level lectures in an active discussion group performed half a grade-level better than those who attended the lectures in person.

The student experience must enhance the student's ability to communicate and collaborate. In lectures, students need to be able to interact with the content either during presentation or during reflection and review.

The instructor experience must focus on several requirements: active presentations, individual assignments, assessment, and group formation. Active presentation learning services provide delivery and feedback between faculty presentation and student response. For example, students should be able to write directly on presentations slide applications during student/teacher interactions, or during review of materials. Teachers should be able to receive this feedback either real time or post lecture and make adjustments to their instruction, to their materials or to their student's learning behavior.

The technology-based learning system should also accommodate for the classroom, for the conference room, for the single PC, laptop, PocketPC, TabletPC or any emerging device. In order for education to persist through lifelong learning, the Internet becomes the central repository of content, the warehouse of interactions with the content, the communication medium for interacting together, and the virtual learning environment—a kind of new school room.

A computer network-based, interactive, multimedia learning system and process in accordance with the present invention is a key step in the ultimate achievement of the foregoing vision.

SUMMARY

The learning system and process according to the present invention employs a plurality of computers, each of which is in communication with the same distributed computer network over a broadband network to provide a rich distributed learning experience, and which can also include distance learning. At least one of these computers is located at a site where a presenter of the lecture is located. The presenter could be a teacher or professor if the lecture is part of an educational course being offered by a school or university. Alternately, the presenter could be an instructor engaged in providing a business-oriented lecture. In addition to the computer located at the lecture site, at least one of the computers is also at each remote location participating in the lecture. An equipment set for capturing audio and video (A/V) is also present at the presenter's site and ideally at all the remote sites as well. Each of the A/V equipment sets is connected to the aforementioned network computer at each site and provides A/V from the site to all the other sites via the network. This is facilitated by an A/V computer program running on the respective site computers. The program multicasts the A/V data captured by the A/V equipment set resident at each site over the network, and subscribes to A/V data multicast from other sites. The A/V data received from all the sites is rendered and played as will be described shortly.

In addition to the A/V data, the present learning system and process also entails a presentation slideshow. To this end, either the same computer handling the A/V data or another one of the network-connected computers is employed to broadcast the slideshow from the presenter's site. In tested embodiments of the invention, a second computer (specifically a wireless tablet PC) was used for the convenience of the presenter in controlling the slideshow while giving the lecture. The presenter employs a slideshow computer program resident on the computer handling the slideshow to control the presentation. Generally, the slideshow program is used to facilitate the broadcasting of presentation slide data associated with the lecture over the network.

There are also one or more displays located at the presenter's site and each remote site, which are viewable by an audience at that site, and which are dedicated to displaying the A/V feeds received over the network, including the site's own feed. To this end, the A/V computer program running at each site is used to render the audio and video data taken from the network and playing the rendered A/V associated with each site in a separate sector of a window (referred to as the presence window) displayed on the one or more displays. The particular A/V feed showing the presenter is preferably played in a sector that is significantly larger than allocated to the A/V feeds from the remote sites. Ideally a single large screen display is used to display the presence window, however multiple smaller display spread throughout the site could be used as a substitute. Further, the A/V computer program running at each site can generate and displaying an information sector in the presence window. This information sector is used to display text, graphics, and/or animations that the presenter wishes to include as supporting material for the lecture.

The present learning system and process also can have a number of individuals participating in the lecture using one of the aforementioned computers that are in communication with the network. These individual lecture participants, who are typically students, can be physically located at one of the aforementioned sites and be part of the audience, or could be at a different location on their own (e.g., home, office, library, etc.). Each individual participant's computer runs a program that among other things, can multicast a thumbnail image to the presenter's site and remote sites via the network. This thumbnail image, which is representative of the individual lecture participant, is received and rendered by the A/V computer program running at the presenter's site and each of the remote sites. It can then be displayed with all the other individual participant thumbnails received in a sector of the present window dedicated for this purpose.

In addition to the displays dedicated to the presence window, there are also one or more displays located at the presenter's site and each of the remote sites, which are viewable by an audience at the site, and which are dedicated to displaying a workspace window. The workspace window is used to display the presentation slides of the aforementioned slideshow. To this end, the slideshow computer program is running on a selected computer at the presenter's site and at the remote sites (e.g., the same computer that handles the incoming A/V data at each site can be employed for this purpose, although another computer could also be used if desired). The slideshow program is used to render the presentation slide data received over the network and display the resulting presentation slides associated therewith in a slide sector of the workspace window. Here again, a single large screen display is preferably used to display the workspace window, however multiple smaller displays spread throughout the site could be used as a substitute. As is typical one presentation slide is rendered and displayed at a time according to the order and schedule dictated by the presenter via the separate slideshow program being used to control the presentation. In addition, the presenter's slideshow program allows annotations to be entered by the presenter. These annotations are associated with the currently displayed slide and are broadcast over the network to all the sites and to each individual lecture participant. The incoming annotation data is rendered by the local slideshow program and displayed on the currently displayed slide in a location specified by the presenter (e.g., where the presenter wrote the annotations on an image of the slide displayed on the screen of the aforementioned wireless tablet PC). Several variations of this annotation feature are possible. For example, the presenter can direct via the slideshow program running at the presenter's site that a blank space be displayed in lieu of a presentation slide at some point in the presentation. The aforementioned annotation can then be added to the blank space to create a virtual whiteboard. The slideshow program controlling the workspace display at each site (including the presenter's site) renders the blank space and annotations thereto, and displays them in the slide sector of the workspace window. This same procedure can be implemented but in a different sector of the workspace window such that both a presentation slide and the virtual whiteboard are displayed. In yet another variation of the annotation feature, the presenter can reduce the size of the slide displayed in the slide sector of the workspace window. Annotations can then be added as before in the resulting blank space around the displayed slide.

In addition to the presenter generated annotation feature, the slideshow program can allow annotations to the presentation slides by individual lecture participants. More particularly, the slideshow computer program inputs individual lecture participant generated comments in the form of annotations associated with a currently displayed presentation slide that were sent by a lecture participant over the network to the computing device running the slideshow program used to control the presentation at the presenter's site. In one version of the slideshow program, the comments are displayed on the current slide displayed on a display used by the presenter to monitor the presentation. The procedure for inputting lecture participant annotations includes inputting an indication as to what line of text in the currently displayed presentation slide the annotations pertain to as provided by the individual participant. The annotations are displayed adjacent to the line of text of the currently displayed presentation slide that they pertain to. There is also an option of displaying bounding boxes around each text line of the currently displayed slide in which the annotation would be contained to make it easier for the presenter to see what line the comments are addressing. Further, there is an option to append the name of the individual participant that generated the displayed annotation. Still further, there is a summarization option that when enabled displays the comments the individual participants provided in summarized form. This is useful where many comments are provided and the space adjacent the line of text is too small to accommodate them all. In one version of this summarization option, the individual participant is restricted to choosing a comment from a prescribed list of comments. The comments are summarized by displaying only the most commonly chosen comment as an annotation to the line of the currently displayed slide that the comments apply to. In another version of the summarization option, a running total of the number of comments received on a particular line of the currently displayed presentation slide is kept and only this number is displayed as the summarized annotation adjacent the line. The actual comments are stored and accessible by the presenter.

It is noted that in the case of the presenter's site, two copies of the slideshow window could be running—one on the computer employed by the presenter to control and broadcast the slideshow presentation and one on the computer used to receive and generate the workspace window in the aforementioned audience display or displays. Alternately, a single copy of the slideshow program could be running on a computer at the presenters' site in which case it would control both the slideshow presentation and the workspace display. For example, modern tablet PC devices support a multiple monitor feature whereby the device has two separate output spaces which can display different windows. Typically in a tablet PC one of the output spaces is for the LCD panel of the device and an independent one fro a VGA output port. Thus, the LCD panel display could be used to by the presenter to the slideshow presentation, while the VGA port could be connected to a projector which would project the workspace view on to a large screen display. In any case, the slideshow program generates a unique graphic user interface to facilitate the control of the presentation and display of the workspace. This interface will be described in detail later.

The present learning system and process also includes a question management feature. In essence, this feature involves respective ones of the aforementioned computers being dedicated for use by respective assistants to the presenter. Each of these computers runs a question management computer program that receives questions from an individual lecture participant and provides answers to the participant over the network. The presenter's computer can also run this program. In addition, the previously mentioned computers employed by the individual lecture participants run a question submission computer program that facilitates the submission of questions to the presenter's assistant (and possible the presenter too) and receives answers in response over the network. The foregoing interaction is implemented using instant messaging. More particularly, an individual participant submits questions as instant messages to a presenter's assistant (and possible the presenter) and receives instant message answers in response, using an instant messaging client program. Likewise, the presenter and presenter's assistants use an instant messaging client program to receive questions from an individual participant as instant messages and provide answers thereto as instant messages. The attendant instant messaging server program is resident on a computer which is also in communication with the distributed computer network. It is noted that the questions and answers can be sent during the lecture, or afterwards as long as the recipient is connected to the network at the time.

The question management program employed by the presenter and the assistants has provisions for modifying, discarding or combining incoming questions prior to providing an answer. In the case where questions are combined, the answer is sent to all the authors of the questions used to form the combined question. The question management program also allows a presenter assistant receiving a question to discuss the question with other presenter assistants via an instant messaging chatroom, prior to at least one of the assistants providing an answer to the question.

In one version of the question management feature, an individual lecture participant can submit a question to the presenter (if allowed) or any of the assistants available at the time. However, in another version of the feature, the individual lecture participant submits the question generally in that no one recipient can be specified. In this latter case, the instant messaging server program can be configured to hold each question submitted in a question queue. The presenter or an assistant then accesses the question queue and downloads a question from the queue. Alternately, the instant messaging server program can be configured to broker the incoming question to one or more of the presenter assistants.

The question management feature also allows a presenter assistant to forward a question, in its original or in a modified form, to the presenter so that the presenter can respond personally. If this occurs during the lecture, then the presenter may elect to answer it as part of the presentation, or the presenter could respond via an instant message either during the lecture, or more likely afterwards either by email or via the network if both the presenter and participant responsible for the question are on-line. It is noted that this question forwarding ability could be restricted to one particular assistant who would be the ultimate decision maker as to whether a question goes to the presenter.

The learning system and process according to the present invention further includes an archiving feature. This feature employs an archiving computer program running one of the aforementioned network computers that saves the lecture for future playback and analysis by synchronously recording the data streams and any associated metadata generated by the presenter, remote sites and any individual lecture participants during the lecture to a lecture database. In addition, this program supports the synchronized playback of all or selected ones of the recorded streams from the database. The data streams recorded include the A/V data multicast from the presenter's site and the remote sites, the presentation slide data including any annotations or virtual whiteboard associated with the lecture that is broadcast over the network, any presentation slide annotations generated by an individual lecture participant or summarizations thereof, and thumbnail image data from an individual lecture participant. Further, a computer program managing an individual's participation in a lecture can be configured to transfer any input generated by the individual during the lecture to the computer running the archiving program where they will be recorded. These inputs can include bookmarking actions and notes entered into the computer running the program. As will be described next, an individual lecture participant can also access the lecture database and playback a previously recorded lecture. In connection with the playback, the aforementioned managing program can be configured to transfer any inputs made by the individual while reviewing the lecture to the computer running the archiving program. Theses inputs are also recorded in the lecture database by the archiving program.

As indicated above, an individual participant can access the lecture database to playback a previously recorded lecture. The presenter and any of the presenter's assistants can also access the lecture database. More particularly, the presenter, assistant or individual participant employs a lecture playback program having a facilitating graphic user interface. The lecture playback program allows the playback of all or selected video clips of the recorded data streams of a lecture. The archiving computer program would provide the desired playback. More particularly, playback would be requested by first requesting a list of recorded lectures available the archiving program would provide the list and the client (i.e., the presenter, assistant or individual lecture participant) would select the desired lecture. In addition, the client would specify the particular data streams it is desired to playback and request the playback to start. The archiving program would then playback of the specified streams of the selected lecture. Once the playback has commenced, the client can control the playback to pause, forward, reverse, stop and restart the playback. The archiving program would be called upon to perform these actions. In addition, the archiving program can include a capability to filter the list of available lectures provided to the client based on various criteria selected by the client, such as the name of the lecture, the date of the lecture and the group affiliation associated with the lecture.

The presenter and assistants would also have the ability to access the archiving program to initiate the recording of the data streams and associated metadata generated during a lecture in the lecture database. More particularly, the presenter or assistant would provide identifying details for the lecture, such as the name, group affiliation, expected length, purpose and so on, as desired. The presenter or assistant would then direct the recording to begin. The archiving program would then commence the recording and associate the provided lecture details with the lecture recording. Once the lecture is complete the presenter or assistant would direct that the recording cease and the archiving program would stop the recording.

In one version of the present learning system, the archiving feature is implemented via a .NET TCP remoting transport scheme. In another version, the access and the foregoing actions would be accomplish directly between the presenter, assistant or individual lecture participant's lecture playback program and the archiving program resident on the computer responsible for archiving the lecture it is desired to playback.

Another aspect of the archiving feature involves recording questions and answers generated in connection with a lecture. The questions and answers are generated in connection with the previously described question management feature of the learning system and process. The archiving of the question and answers initially involves using the aforementioned question management computer program and submission computer program to respectively transfer the questions and answers when they are generated over the network to the computer running the archiving computer program, which in turn records them in a question forum database. It is noted that in one embodiment of the archiving feature, the lecture question forum databases are implemented in the form of an SQL server.

The archiving computer program allows the presenter and at least one of the presenter's assistants to access the question forum database to perform various actions such as entering an answer into the database to a question contained therein (which is also sent to the individual responsible for the question), modifying any question or answer contained in the database, and deleting any question or answer contained in the database. It is noted that the question management feature can also involve modifying or deleting questions and answers that have already been recorded in the question forum database, as described previously. In such a case, the computer program responsible for implementing the question management feature will automatically transfer this information to the computer running the archiving program which will replace the previously recorded question or answer with the modified version, and delete any previously recorded question or answer as necessary.

The access to the question forum database can be handled in various ways. For example, in one version of the archiving feature, access would be obtained by communication with the archiving program directly. In another version, the database is accessed via the aforementioned .NET TCP remoting service with all its attendant security and commerce features typical of such services. In addition, the .NET TCP remoting service would provide a graphical user interface that would facilitate performing the previously described actions in regard to managing the database.

Some variations of the foregoing procedures are also possible. For example, the question management feature allows a presenter assistant to forward a question to the presenter so that the presenter can respond personally. If this occurs during the lecture, then the presenter may elect to answer it as part of the presentation. In such a case, the presenter or the presenter's assistant can access the archiving program and enter the answer to the question directly into the question forum database. In addition, an individual lecture participant can submit questions and receive answers at times other than during the lecture. If the presenter or one of the presenter's assistance is logged onto the network, then this transaction can be handled as described above. However, if neither the presenter nor one of the presenter's assistance is logged onto the network, the individual participant may elect to email the question to one of them. In such a case, the presenter's and the assistants' question management computer program will allow them to send the email question to the database as if the question had come directly from the individual participant.

When a question is recorded in the question forum database, the archiving program will also obtain information as to the identity of the individual participant who submitted the question, and then the individual's identity, as well as the time and date the question is recorded in the database is associated with the question. Likewise, when an answer is recorded in the database, the identity of the presenter or presenter's assistant that provided the answer is obtained and associated with the answer along with the time and date the answer is recorded in the database. Further, the archiving program obtains an identifier identifying the lecture during which the question or answer being recorded was generated, and associates this with the question or answer as well.

The question forum database is also accessible to an individual lecture participant to review the questions and answers recoded there, although this access can be restricted by the presenter or a presenter's assistant. The individual participant uses their submission computer program to access the database either directly via the archive program or via the aforementioned .NET TCP remoting service. Once access is obtained, the individual participant can review the questions and answers, and if desired register a recommendation for a question or answer. These recommendations indicate how important a question is to the group of individual participants in general. As such, a recommendation for a question is typically registered only if the question is unanswered. In the case of an answer, an individual participant would register a recommendation for it if they thought is was a particularly good one. Only one recommendation per participant can be made for any one question or answer. The archiving program keeps a running count of the number of recommendations registered by the participants.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

Figure 1:
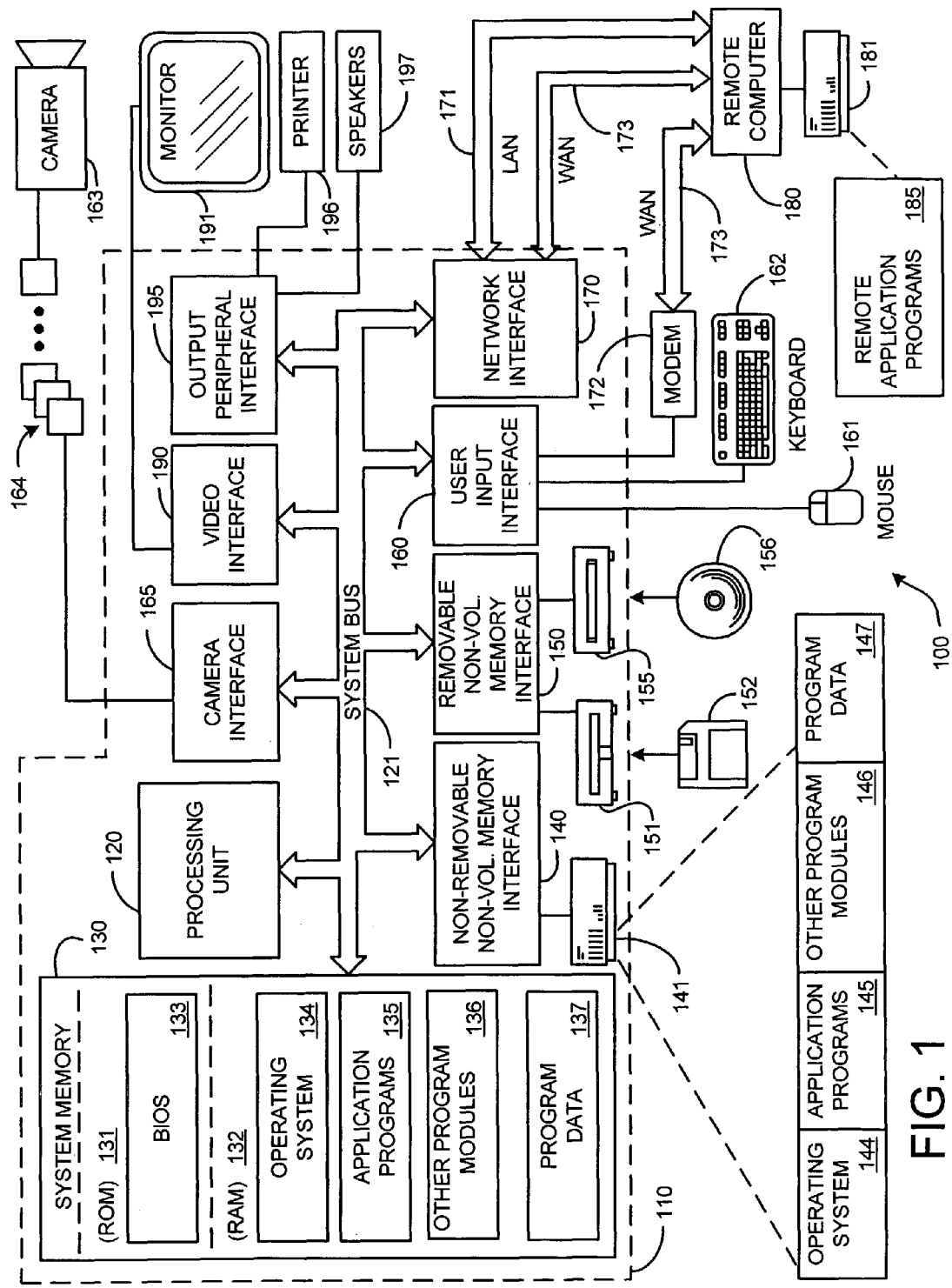
FIG. 1 is a diagram depicting a general purpose computing device constituting an exemplary system for implementing the present invention.

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

In general the present invention pertains to on-line, network-based learning systems, and more particularly, to an interactive multi-media lecturing system and process, and its associated user interfaces. Current learning systems designed for connecting people at different locations in a distributed lecture on a public computer network (such as the Internet) are troublesome because of bandwidth constraints, and overall inadequate tools for simultaneous voice, text, video, and graphic communication. The present learning system and process resolves these problems to provide high quality, low latency audio/video links over a multicast network (such as Internet2), an interactive slideshow that allows annotations to be added by both the presenter and lecture participants, a question management feature that allows participants to submit questions and receive answers during the lecture or afterwards, and a complete archiving of the data streams and metadata associated with the foregoing features. It is noted that throughout the following description of the present learning system and process, any reference to a computer network or the Internet assumes a multicast network such as the Internet2 or an intranet having similar capabilities is being employed.

One use of the present system is in educational settings where a presenter (e.g., teacher or professor) gives a lecture and local or remote students observe with audio/video and/or slideshows. Another use is in a business setting where the presenter (e.g., instructor) gives a business presentation and local or remote audience members observe with audio/video and/or sideshows. Thus, in general the present learning system and process involves the presenter delivering an educational or business-oriented presentation through the use of video, audio and a slideshow, among other things, to individuals or groups of individuals located at the presenter's location and one or more remote locations. When the presentation is provided to a group of people at a particular site, including the presenter's site, it is envisioned that there will be one or more display screens for presenting the video portion of the presentation and one or more screens for presenting the slideshow portion of the presentation. The nature of these display screens will be discussed in more detail in connection with a description of the hardware configuration of the learning system. The views that the audience sees for both the video and slideshow portions of the presentation are quite unique in themselves. The view associated with the video portion is referred to as the presence window and the window associated with the slideshow is referred to as the workspace window. These will be described in the sections to follow as well.

In order to provide the workspace and presence windows to the audiences at each site, the presenter (or a representative thereof and a representative at each remote site works with a set of unique user interfaces. These include a slideshow window that the presenter will use to initiate and run the aforementioned slideshow. In addition, the representative at each site will use this same interface to receive and tailor the slideshow presentation for his or her site (including the presenter site where the presenter could be the representative). There is also a unique user interface for initiating and tailoring the video and audio aspects of the presentation used by the presenter or his representative. This same interface, referred to as the conferencing window, is also employed by representatives of the remote sites to receive and tailor the video and audio portions of the presentation. There are also various interfaces involved with the aforementioned question management and archiving features. All of these interfaces will also be described in more detail in the sections to follow.

It is noted that in the description to follow to the terms presenter, teacher, professor, instructor and the like will be used interchangeably to refer in general to the presenter of the lecture. In addition, the terms individual lecture participant, student, audience member and the like will be used interchangeably to refer in general to a participant in the lecture. Finally, it is noted that the aforementioned representative at the presenter's site can also be the presenter's assistant whose duties will be discuss in detail later.

1.0 The Learning System Computing Environment

Before providing a description of the preferred embodiments of the present invention, a brief, general description of a suitable computing environment in which the invention may be implemented will be described. FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone or microphone array for capturing audio, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). At least one monitor 191 or other type of display device (e.g., a projection screen and projector) is also connected to the system bus 121 via an interface, such as a video interface 190. In addition to the monitor, computers may also include other peripheral output devices such as speakers 197 and printer 196, which may be connected through an output peripheral interface 195. A camera 163 capable of capturing a sequence of images 164 can also be included as an input device to the personal computer 110. Further, while just one camera is depicted, multiple cameras could be included as input devices to the personal computer 110. Generally, the images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163. The aforementioned camera or cameras 163 can take various forms, such as a digital/electronic still or video camera, or even film/photographic scanner equipment.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is typically connected to the LAN 171 through a network interface or adapter 170. When used in a WAN networking environment, the computer 110 sometimes includes a modem 172 or other means for establishing communications over the WAN 173, such as the Internet. The modem 172, which may be internal or external, may be connected to the system bus 121 via the user input interface 160, or other appropriate mechanism. Alternately, the computer 110 can be connected to the WAN 173 via aforementioned network interface or adapter 170. This later connection scheme is particularly applicable to the present invention. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

2.0 The Learning System Hardware Configuration

The exemplary operating environment having now been discussed, the next part of this description section will be devoted to a description of the learning system hardware configuration. In general, the present learning system requires the use of only one computer (such as described above) to input local video and audio, input video and audio from other sites participating in the presentation, input slideshow presentation slides and annotation data, and output audio and separate views of the slideshow and video to the audience of the site. This is in comparison to some existing learning systems that require multiple computers to accomplish similar tasks. In addition, the site associated with the presenter of the presentation could have a wireless tablet PC or the like for broadcasting the slideshow presentation slides to the participating sites' computers. Thus, the hardware configuration at the presenter's site is somewhat different than at a site viewing the presentation. The hardware configuration for the presenter's site will be described first, and then the viewing sites' configuration.

2.1 The Presenter's Site Hardware Configuration

Figure 2:
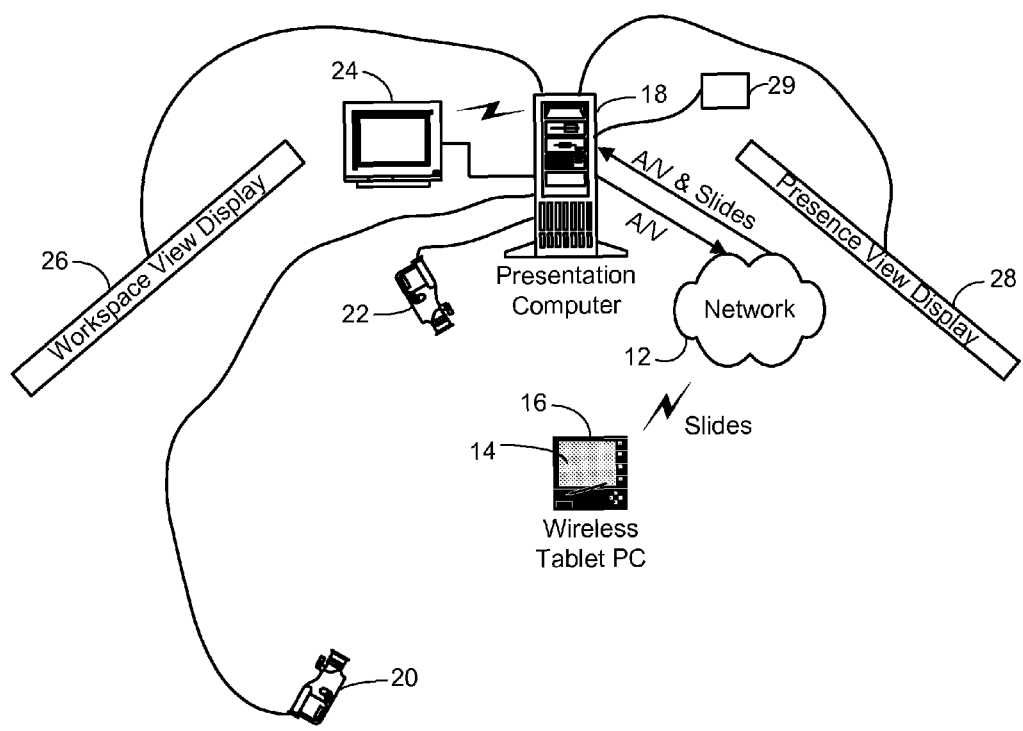
FIG. 2 is a diagram showing the hardware configuration of a typical presenter's site in accordance with the present learning system.

Referring to FIG. 2, the hardware configuration of a typical presenter's site will be described. The slideshow portion of the presentation is handled using the wireless tablet PC 16. Essentially, the tablet PC 16 broadcasts the presentation slides over the network 12 to all the sites participating in the presentation, including the presenter's site. The tablet PC has a display 14 used to display the slideshow window interface that the presenter uses to initiate and run a slideshow presentation.

It is noted that the learning system also supports a conventional presentation slide annotation feature (often referred to as a scribble feature), which allows a presenter to use an pen-type input device on the tablet PC 16 to add what appears to be handwritten notes, sketches and the like to the currently displayed slide. This feature will be described in more detail later.

A presentation computer 18 is also employed in the learning system at the presenter's site. The presentation computer 18 is the heart of the learning system. In general, this computer 18 is used to send and receive audio and video (A/V) data via a distributed computer network to and from all the other participant sites. More particularly, the A/V data sent by a participant site is broadcast over the network and the A/V data received by a participant site is obtained by subscribing to the multicasts of other participant sites.

In general, a computer network multicast is provided to the set of receivers who have first "subscribed" to the information. In this case the receivers are the participant sites who have joined the same lecture. In order for a participant to participate in a conference, they must have an IP multicast group address to which their A/V data is to be sent starting at the appointed time for the lecture. The multicast group address is just a special case of an ordinary IP address. However, unlike an ordinary address which is used to identify the "location" of a receiver where data is to be sent, a multicast group address is used by routers in the network to identify data being transmitted on the network as part of the multicast, so that it can be routed to a subscribing participant site (who will have a completely different address). A participant site joins a scheduled lecture by "entering" a prescribed venue selected for the meeting. A venue is, in essence, just the aforementioned multicast address, but it seems to the participant sites to be a virtual classroom for the lecture. A venue is entered by each participant site subscribing to the multicasts of all the participant sites. This is done by the participant site notifying the network that they wish to join the multicast group. These subscriptions to the group cause various routers in the network to update their states, to ensure that the multicast information eventually reaches the subscribing participant sites. Thus, referring to FIG. 3, participant sites 200*a-c* send A/V data 202*a-c* from their physical location to the network 204 using the specified venue multicast address. When a network router receives data with that address, it sends copies of the data (which is typically in the form of a continuing sequence of packets) through each outgoing interface that leads to a subscribing participant site. This causes the data 206*a-c* to reach the participant sites at some point, albeit with the inevitable loss due to network congestion and buffer overflow. However, the losses can be mitigated using a standard layered multicast scheme with integrated forward error correction. Protocols are also employed to include identifiers in the A/V data packets that identify the participant site that multicast the data. In this way, each participant site's computer can receive and reconstruct the audio and video sent by each of the other participant site, and know what participant sites are participating in the lecture. Thus, the audio and video of each of the other participant sites can be played by the receiving participant site.

It is evident for the foregoing description that at the very least a participant site needs to know the multicast address associated with a venue. In a simple form of the learning system, each of the participant sites' computers could be pre-loaded with a multicast address for each venue the participant site can access. However, given that such data is subject to frequent change, in another version of the system, the multicast address data is provided to the participant sites when their learning system is activated. For example, a central server called a venue server could be established. Each time a participant site starts a program implementing the present learning system on their computer, it could employ a pre-loaded network address to contact the server, which would then download the address of one or more venues that the participant site can access.

Figure 4:
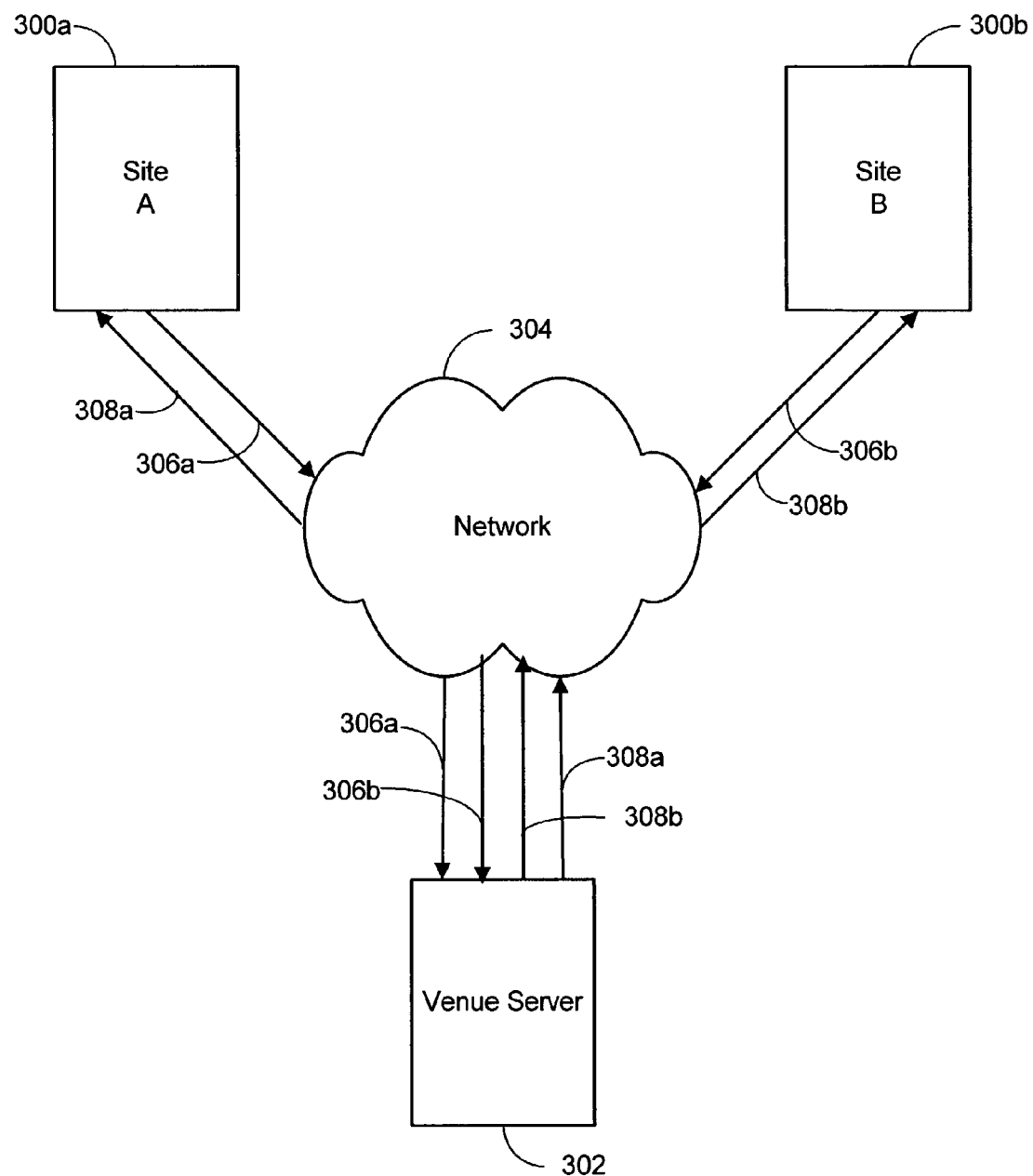
FIG. 4 is a diagram depicting the flow of information over a distributed computer network between two sites participating in an interactive, multimedia lecture and a supporting venue server according to the present invention.

The foregoing exchange between a participant site and the venue server could also include more than the transfer of multicast addresses. For example, the venue server might be accessed via a .NET TCP remoting service with all the attendant security and commerce features typical of such services. The participant site would provide information to a server, which would then determine what venues, if any, the participant site is entitled to access. The multicast addresses of the authorized venues would then be provided to the participant site. Still further, the venue server could be a repository of information about each venue, other than just its multicast address. For instance, the server could store and provide the name of the venue to a participant site along with the venue's address. Other information that might be provided includes the affiliation of the venue and who can access it. Once a participant site has "joined" a venue and other participant sites are also participating, the participant sites might want information about each other. This could be requested and transferred directly between the participant sites' computers, however, it is also possible for the venue server to act as a repository for participant site information. In this latter scenario, each participant site would be required to provide certain information to the server where it would be stored. When a participant site is participating in a conference and another participant site wants information about that participant site, the server could be queried. The server would then provide the information to the requesting participant site. This participant site information could include contact data such as a participant site's name, physical location, email address and telephone number. The above-described interplay between the participant sites and the venue server can be summarized as follows. Referring to FIG. 4, each participant site 300*a-b*, sends requests for venue addresses, and optionally requests for venue and participant site data (collectively 306a-b), to the venue server 302 via the network 304. In response, the venue server 302 provides addresses 308a-b via the network 304 to the requesting participant site 300a-b associated with those venues the conference is allowed to access, as well as optionally any requested venue or participant site data (collectively also 308a-b).

Figure 3:
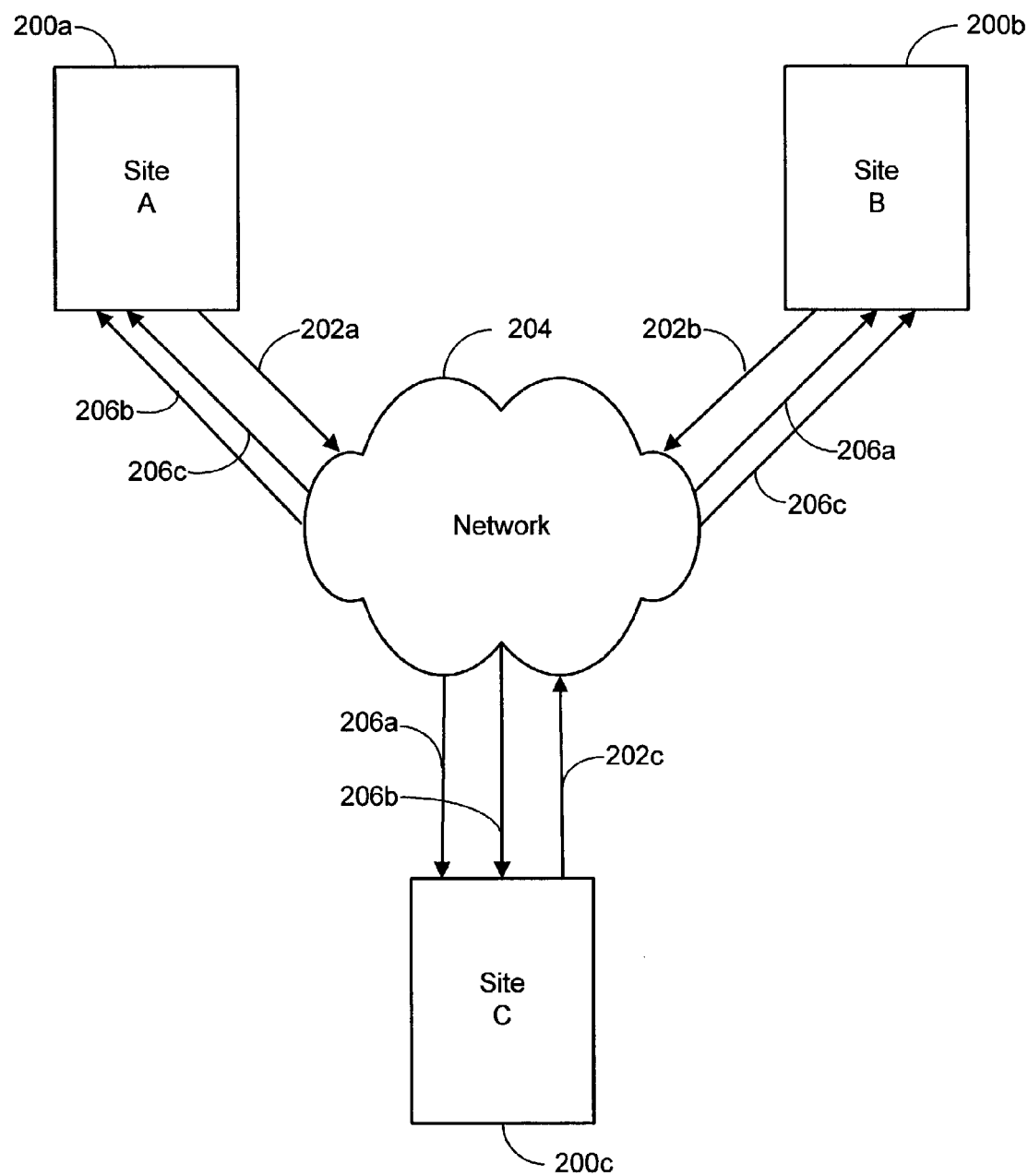
FIG. 3 is a diagram depicting the flow of audio and video data over a distributed computer network between three sites participating in an interactive, multimedia lecture according to the present invention.

It is noted that while only two or three participant sites are depicted in FIGS. 3 and 4, there can be, and typically would be, more.

To implement the present learning system, a participant site's computer is loaded with conventional processing programs for transmitting, multicasting and receiving A/V data over the network, as well as the unique learning system program mentioned previously. In addition, the participant site's computer is outfitted with A/V equipment, as was generally described in the discussion of the computing environment. However, in order for the present learning system to provide a substantially real time conferencing experience, it is desired that high quality video with a low latency be provided. This could be achieved, for example, by employing a pair of digital video cameras connected to the participant sites' computers via an IEEE 1394 interface. One of the cameras is the presenter's camera and is pointed at the presenter, the other camera is the audience camera and is pointed toward the audience. While any video codec can be used for the transfer of the video and audio data over the network, some tested versions of the present learning system employed M-JPEG, MPEG-4, DivX and MSVideo codecs with success. As for the audio portion of the presentation, tested versions of the learning system employed a high end audio system to handle the site audio requirements that included echo cancellation, automatic gain control and noise reduction (29 of FIG. 2). As a result of employing the foregoing learning system configuration, full screen video provided at 30 frames per second and with a latency of less than 250 ms was achieved. This was done while maintaining relatively low bandwidth requirements, e.g., only about 256 kb per second per participant with a frame size of 320×240, and only 1024 kb per second per participant with a frame size of 640×480. The presentation computer also has a presenter's display which communicates with the computer via either a wired or wireless connection. This display is used to display the conferencing window interface that the presenter uses to initiate the multicast of the aforementioned audio and video feeds.

Referring again to FIG. 2, the presentation computer also 18 receives the aforementioned slideshow portion of the presentation via the network from the tablet PC 16, as well as video and audio feeds from the remote sites participating in the presentation. This data is used to create two separate views that are displayed to the audience at the presenter's site. Specifically, the slideshow data is used to create the workspace window depicting the current presentation slide being discussed by the presenter, as well as any annotations that the presenter has added using the aforementioned tablet PC 16. In one embodiment of the system, the workspace window is displayed to the audience on a conventional large screen display device 26. As for the video data from both the presenter's site and participating remote sites, the presentation computer 18 creates the presence window which is displayed to the audience on a separate large screen display device 28. The audio from the remote sites is output from the presentation computer 18 and played via an audio processing system using echo cancellation to prevent feedback loops (not shown), which can be integrated into the displays or as separate units.

It is noted that in an alternate embodiment of the system, the large screen display devices could be replaced with multiple smaller monitors that are disbursed throughout the site. Ideally, each monitor location would have a pair of monitors, with one displaying the workspace window and the other the presence window.

2.2 The Remote Site Hardware Configuration

Essentially the hardware configuration at a remote site is a subset of the configuration employed at the presenter's site. As no slideshow presentation is being broadcast from a remote site, the tablet PC is not needed. Thus, a remote site's hardware configuration need only include the presentation computer and some of its associated components.

Figure 5:
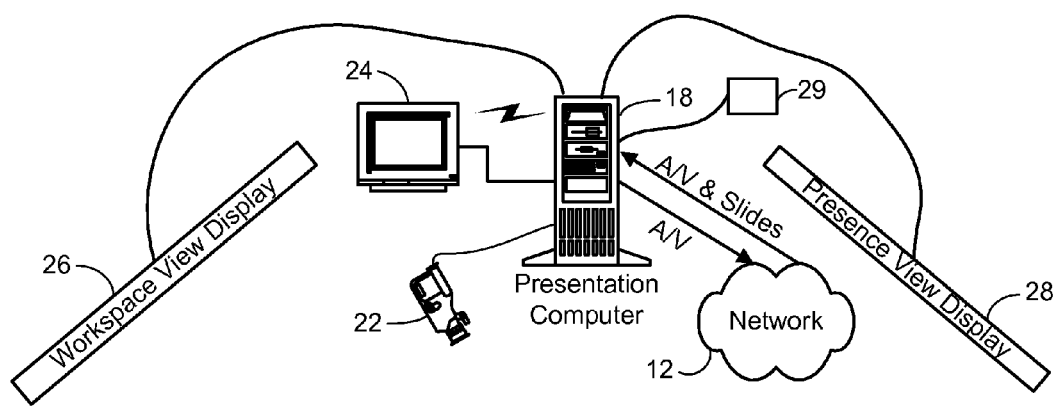
FIG. 5 is a diagram showing the hardware configuration of a typical remote site in accordance with the present learning system.

Specifically, referring to FIG. 5, a remote site's hardware configuration includes a presentation computer 18 and its associated display 24 that communicates with the computer via either a wired or wireless connection. As with the presenter's site, this display 24 is used to display the conferencing window interface, which in this case involves setting up the receipt of the broadcast of the incoming audio and video feeds. It is noted that the presentation computer 18 and its display 24 are also used to display the aforementioned slideshow window, which in the case of a remote site is used to initiate the receipt of the slideshow presentation slides and to tailor the appearance of the window and the workspace window shown to the audience.

The presentation computer 18 at a remote site needs only one camera—namely the audience camera 22, as there is no presenter. Thus, the presentation computer 18 inputs video of the audience via the audience camera 22, as well as audio via an appropriate audio system 29, like the one used at the presenter's site in the tested versions of the learning system. Here again, the camera 22 is preferably a digital video camera and connected to the presentation computer 18 using an IEEE 1394 connection. The audio and video data is multicast via the network 12 to all the remote sites participating in the presentation. The same codec that is used by the presentation computer at the presenter's site to transfer the video and audio data from that site is used to transfer the like data from the remote site.

The presentation computer 18 also receives the aforementioned slideshow portion of the presentation via the network from the tablet PC at the presenter's site, as well as video and audio feeds from that site and all the other participating remote sites. This data is used to create the aforementioned workspace and presence windows, which can be respectively displayed to the audience at the remote site using separate large screen display devices 26, 28. The audio from the presenter's site and the other participating remote sites is output from the presentation computer 18 and played via an audio processing system using echo cancellation to prevent feedback loops (not shown), which can be integrated into the displays or as separate units. Once again, it is noted that as an alternative, the large screen display devices could be replaced with multiple smaller monitors that are disbursed throughout the site.

Figure 6:
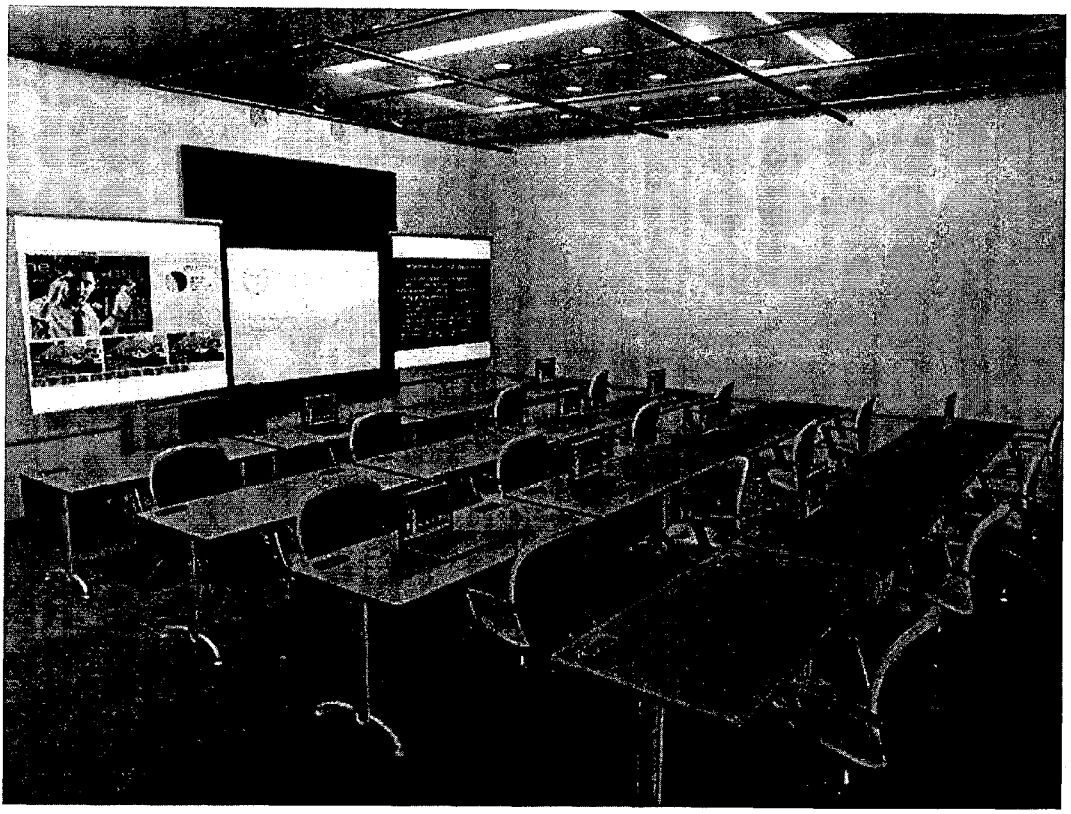
FIG. 6 is an image of what a remote site might look like when viewing an educational lecture in a classroom.

FIG. 6 provides an image of what a remote site might look like when viewing an educational lecture in a classroom. Note the presence window is being displayed on the left hand display screen, and the workspace window is being displayed on the right hand screen. In this case, the aforementioned large screen display devices took the form of projectors (not shown) and conventional movie screens. It is noted that small notebook style computers can be seen at some of the seats depicted in FIG. 6. These computers are employed by the lecture participants and the presenter's assistants to participate in various parts of the lecture, as will be described later. Also note that while a notebook style computer is shown in FIG. 6, in reality any appropriate computing device can be employed (either with a wired or wireless network connection) such as those described previously in the learning system computing environment section. Further, when the present learning system and process is being used after a lecture, such as to ask a question or provide and answer, or to review recorded lecture materials, the same type of computers could be used by not only individual students, but by the presenter and the presenter assistants as well.

3.0 The Learning System User Interfaces

As mentioned previously, the presenter or his representative (which for sake of convenience will be referred to just as the presenter in the sections to follow) employ a slideshow window and a conferencing window to initiate, tailor and run the slideshow and video/audio portions of the presentation, respectively. In addition, the representative at each remote site uses the slideshow and conferencing windows to receive and tailor certain viewing aspects of the slideshow and video/audio portions of the presentation, respectively. There are also the aforementioned presence and workspace windows that can be displayed at the presenter's site, the remote sites, or both. The presence and workspace windows are used to respectively present the slideshow and video portions of the presentation or lecture to the audience at these sites. A teacher's assistant (TA) interface including a TA window can also be included to manage and answer student questions. This interface would run on each of the TA computers discussed previously. There is also a lecture participant (i.e., student) interface that is used by a participant both synchronously (i.e., during the lecture or presentation) to participate interactively in the lecture, or asynchronously (i.e., after the lecture) to review the lecture, among other things.

The foregoing interfaces will now be described in more detail.

3.1 The Slideshow Interface

Figure 7:
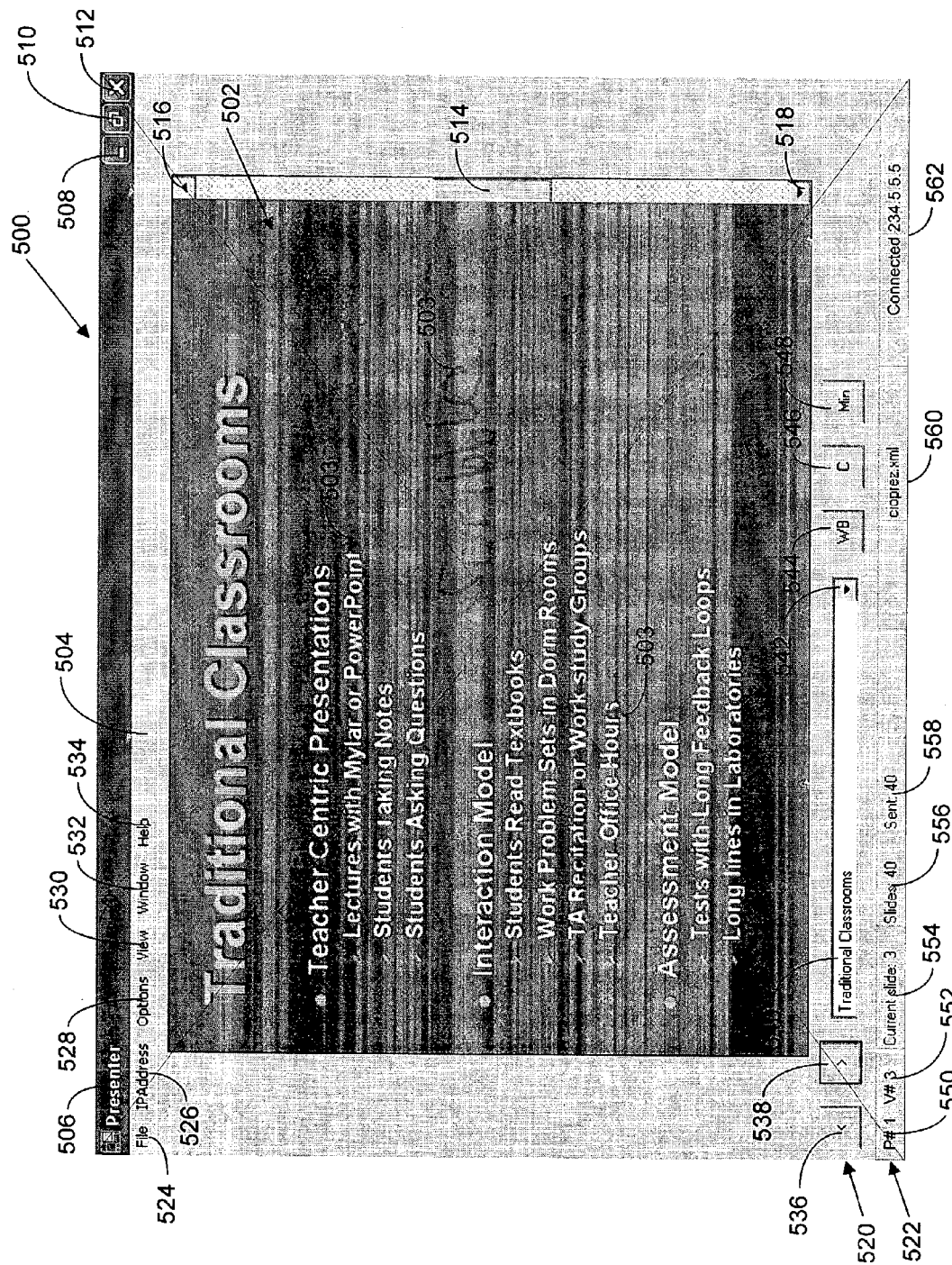
FIG. 7 is an image showing a user interface slideshow window layout according to the present learning system.

In essence the slideshow interface is embodied in a graphical user interface window that allows a presenter to initiate, run, and broadcast a presentation slide program in conjunction with an educational lecture or business presentation. In reference to the previously described hardware configuration of the learning system, the slideshow window is displayed to the presenter via the display screen of the tablet PC. In addition, the slideshow window is also employed at each site to connect to a presentation being broadcast and to set certain viewing parameters. In this latter case, the slideshow window can be displayed on the screen of the presentation computer display. Referring to FIG. 7, the majority of the slideshow window 500 is dedicated to displaying a current slide of the presentation to the presenter in the slide display sector 502. This is the view also displayed to the audience via the aforementioned large screen slideshow display or the multiple slideshow display monitors, and which is referred to as the workspace window.

As mentioned previously, the learning system supports a presentation slide annotation (i.e., scribble) feature. This scribble function mimics a presenter using a felt-tip pen to write on a presentation slide transparency that is being projected onto a screen via a conventional overhead projector. Examples of the annotations that could be created with the scribble feature are shown in the presentation slide 503 depicted in FIG. 7. Specifically, two of the "talking points" of the presentation slide have been circled and the word "Scribble" has been added to the right of the text.

Just above the display sector 502 is a menu bar 504 and above that a title bar 506. The title bar 506 includes a name given to the slideshow window 500, which in the case of tested versions of the present learning system as exemplified in FIG. 7, was "Presenter". To the far right of the title bar 506, the standard window control buttons are displayed, including a minimizing button 508, maximizing button 510 and a button 512 to close the slideshow window. A graphic scroll bar in the form of a standard slider 514, as well as up 516 and down 518 arrows is displayed to the right of the display sector 502. It is noted that the scroll bar controls the scrolling of the aforementioned scribble added by the presenter to the displayed slide or in the blank areas of the display sector 502. This feature will be described in more detail later.

A control bar 520 is displayed just below the display sector 502. The control bar 520 includes several buttons used to control the slides and scribble displayed in the display sector 502, and so displayed on the aforementioned large screen slideshow display or the multiple slideshow display monitors. The aforementioned control buttons will be described shortly. Finally, an information bar 522 is displayed below the control bar 520. The information bar 522 includes several fields in which text providing information about the presentation is displayed to the presenter, as will be described in more detail later as well.

3.1.1 The Menu Bar

In general, the menu items in the menu bar 504 are used by the presenter to set up and initiate the broadcast of a presentation, and by remote sites to connect to and set certain viewing options. In addition, a few miscellaneous features involving the scribble and a presentation slide log are controlled via the menu bar 504. Each feature accessed through the menu bar 504 will now be described.

3.1.1.1 The File Menu Item

Figure 8:
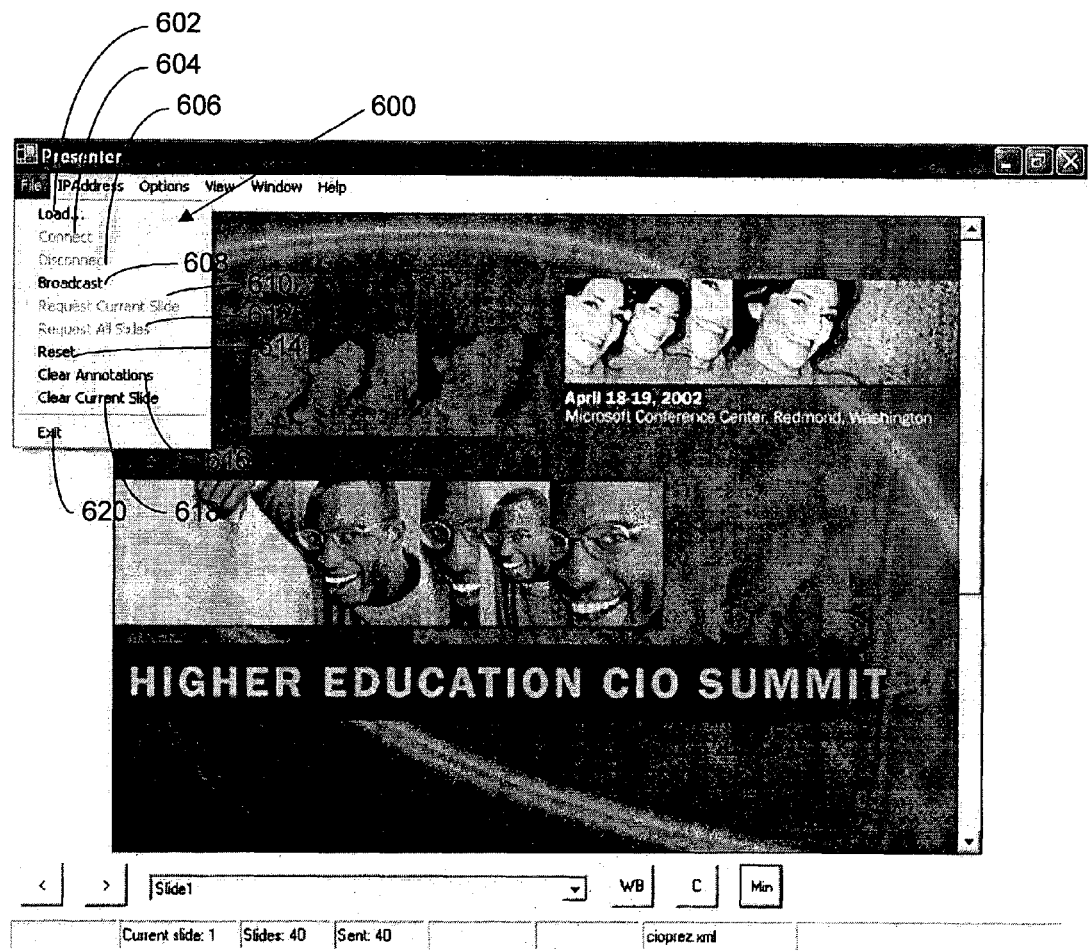
FIG. 8 is an image showing a view of the slideshow window of FIG. 7 where the file menu item has been selected causing a drop-down list of commands to be displayed.

The first menu item of the menu bar 504 that will be described is the file menu. Upon selecting the file menu item 524 in the menu bar 504, a drop-down list of commands appears in the slideshow window 500. Referring to FIG. 8, this list of commands 600 includes a "Load" command 602. Upon selection of the load command 602, a conventional open file dialog box (not shown) appears over a portion of the slideshow window. This dialog box is used in the typical manner by the presenter to load the presentation slide deck file containing the presentation slides that are to be broadcast. It is noted that the list of commands displayed when the file menu item 524 (or any menu item) is selected is contextual in that those commands that are not applicable to the current state are inactive. In tested versions of the present slideshow window, this was accomplished by "graying out" the inactive commands in the standard manner. This is not the only way this could be accomplished however. In general, the inactive commands can be distinguished from the active commands using any visually distinguishing technique. In FIG. 8, the command to connect (as will be described shortly) is grayed out to indicate it is inactive because the figure is an example of a "screen shot" taken a time when no venue had been selected, and so no connection is possible. It is also noted that only those commands that are applicable to a presenter are active when the slideshow window is being employed by a presenter, and conversely, only those commands applicable to a viewer are active when the slideshow window is being used by a viewer. This is true of all the slideshow window functions even outside the menu bar 504.

The next command in the file command list 600 is the "Connect" command 604. The connect command 604 is used to connect to a previously specified venue. For a presenter this command 604 is employed to connect the tablet PC to the presentation computer at the presenter's site, so that slides can be broadcast to that computer (and ultimately displayed to the audience at the presenter's location via the workspace window). In the case of a viewer using the slideshow window, the connect command 604 is selected to connect the presentation computer associated with the viewer's site to the tablet PC handling the broadcast of the presentation at the presenter's site. The aforementioned connection is accomplished over the aforementioned distributed network using pre-established addresses for each venue in a conventional manner.

There is also a "Disconnect" command 606 in the file menu command list. This command 606 is active when the presenter or viewer (as the case may be) is connected to the presenter's tablet PC. When the disconnect command 606 is selected, the presenter's or viewer's presentation computer is disconnected from the presenter's tablet PC.

The next command in the file command list 600 is the broadcast command 608. This command 608 is used to broadcast previously "loaded" presentation slides to all the sites connected to the tablet PC, including the presentation computer resident at the presenter's site. The broadcast command 608 is made inactive in the case of a viewer using the slideshow window as it is inapplicable to a non-presenter.

The next two commands in the command list 600, which apply to both the presenter and the viewer(s), are the "Request Current Slide" 610 and the "Select All Slides" 612 commands. The request current slide command 610 is selected to have the currently displayed slide in the presenter's slideshow window broadcast to the presentation computer of the selecting site. The request current slide command 610 is used when a particular slide broadcast to the requesting site was lost or corrupted in some manner. This can include the presenter's site as well. It is noted that a missing slide would preferably appear as a blank screen on the display screen at the site. The request all slides command 612 is typically selected by a viewer site, in that its primary purpose is to have the tablet PC at the presenter's site broadcast the presentation slides in a case where a remote site connects to the tablet PC after the slides were originally broadcast. The command 612 could also be used by the presenter if for instance the presentation slides were inadvertently broadcast before the presenter's site was connected to the tablet PC, or by either the presenter or viewer sites if for instance the original broadcast was not received or corrupted.

The file menu command list 600 also includes a reset command 614. This command 614, when selected, resets the presenter's or viewer's system (as the case may be) to their initial state when first initiated. This would include disconnecting if the venue was connected to the presenter's tablet PC.

The next two commands in the file menu command list 600 involve the previously described scribble feature. As these commands only apply to the presenter, they are inactive when a viewer is using the slideshow window. Specifically, the "Clear Annotations" command 616 clears all the "scribble" annotations added by the presenter via the aforementioned tablet PC to any slide of the presentation. Thus it clears all annotations made to the slides. In contrast, the "Clear Current Slide" command 618, clears only those "scribble" annotations added to the currently displayed slide. These annotations include both those currently displayed over the current slide, as well as any that were scrolled out of view as will be described later.

The last command in the file menu command list 600 is the standard exit command 620 which closes the slideshow window when selected. It is noted that this also disconnects the presenter's or viewer's presentation computer from the presenter's tablet PC if it was connected at the time.

It is noted that the menu bar items and the commands that appear when an item is selected, as well as any other learning system interface element described hereinafter, are all selected using conventional methods and standard user interfaces. For example, a selection can be made by placing a screen cursor over the button and activating a selection switch on an input device (e.g., "clicking" a button on a computer mouse).

3.1.1.2 The IPAddress Menu Item

Figure 9:
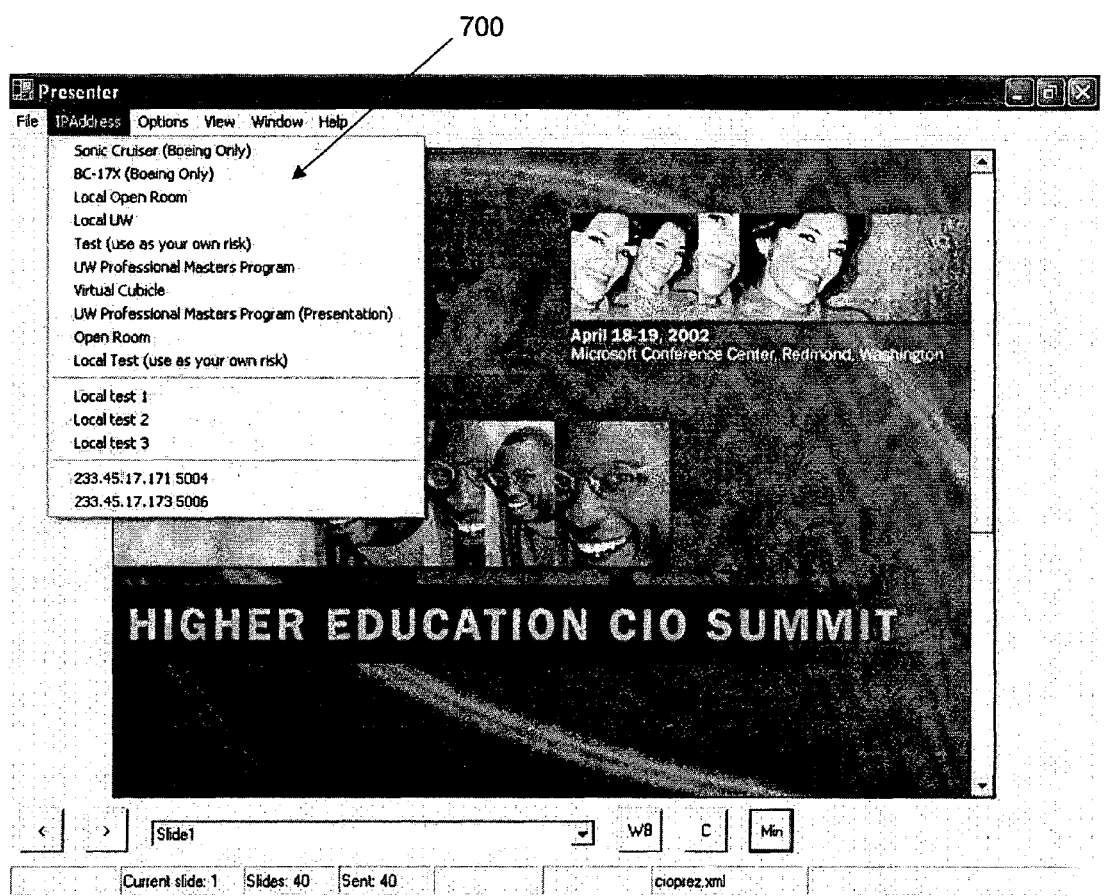
FIG. 9 is an image showing a view of the slideshow window of FIG. 7 where the IPAddress menu item has been selected causing a drop-down list of venues to be displayed.

Referring again to FIG. 7, the next menu item in the menu bar 504 is the "IPAddress" item 526. Upon selecting the IPAddress item 526, a drop down menu list appears. Referring to FIG. 9, the drop down list 700 is a list of the known venues associated with the learning system (i.e., those venues that the IP address is known to the tablet PC of the presenter). The presenter or viewer, as the case may be, selects a venue from the list 700 for the purpose of connecting with the site's presentation computer to receive the presentation. This connection is made once the venue is selected, using the previously described connect command in the file menu command list. It is noted that the venues that can be selected may include some test sites as indicated in the venue listing 700 in FIG. 9. In addition, it is noted that when a venue is selected, a checkmark icon appears adjacent the selected site, although any method of indicating a particular venue has been selected could be employed instead (e.g., highlighting the selection)

3.1.1.3 The Options Menu Item

Figure 10:
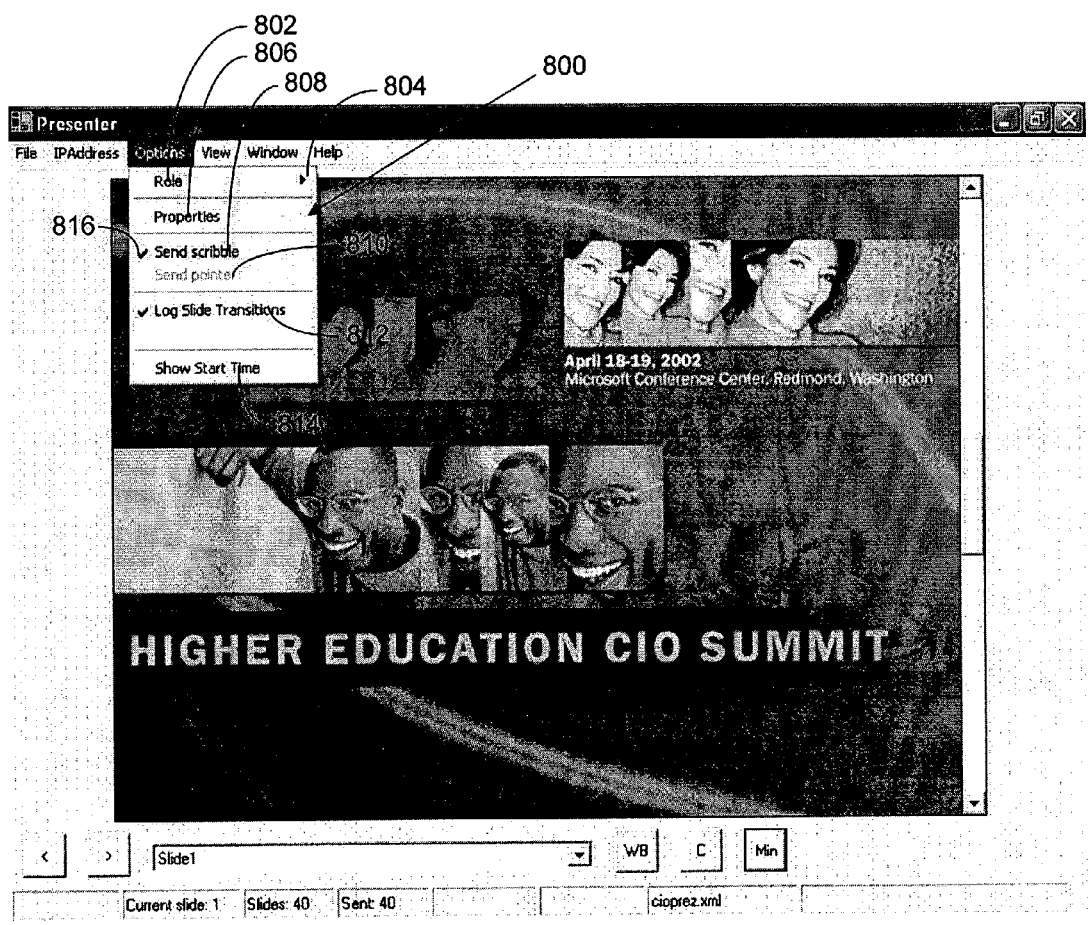
FIG. 10 is an image showing a view of the slideshow window of FIG. 7 where the options menu item has been selected causing a drop-down list of slideshow options to be displayed.

Referring once again to FIG. 7, an options menu item 528 is also included in the menu bar 504. Upon selection of the options menu item 528, a drop-down list of options appears in the slideshow window 500. Referring to FIG. 10, this list of options 800 includes a "Role" option 802. Upon selection of an arrow 804 adjacent the role option 802, a sub-list of options appears (not shown) with two possible selections—namely a presenter option and a viewer option. These options are used to identify whether a presenter or viewer is using the slideshow window. The option the user selects will determine what commands are active at any point in the presentation, as described previously. It is noted that the selection mode when selecting the arrow 804 can be a simple "hovering" maneuver where the screen cursor is placed over the arrow and no other action is needed. Further, once selected, a checkmark icon appear adjacent the selected role to indicate what selection was made. As with the venue selection described previously, any appropriate alternate method of indicating that a particular role has been selected can be employed instead.

The next option category in the options list 800 is the "Properties" category 806. Upon selection of the properties option category 806, a dialog box (not shown) appears over a portion of the slideshow window. This dialog box is used in the typical manner by the presenter to specify certain network parameters associated with the broadcast of the presentation. Specifically, a standard data entry field is included for the presenter to enter the desired packet delay, which could be set between 0 and 30 milliseconds in tested versions of the learning system (although 20 milliseconds was used as a default setting). In addition, a forward error correction (FEC) data entry field is included in the dialog box. In tested versions of the learning system, the forward error correction took the form of a simple process of broadcasting multiple versions of the presentation data in case a packet of any one of the repeated broadcast is lost or corrupted during transit over the network. The aforementioned data entry field is used to specify how many times a packet of the presentation data is to be sent. In tested versions of the system this could be varied between 1 and 5 times, with 2 being the default.

Figure 11:
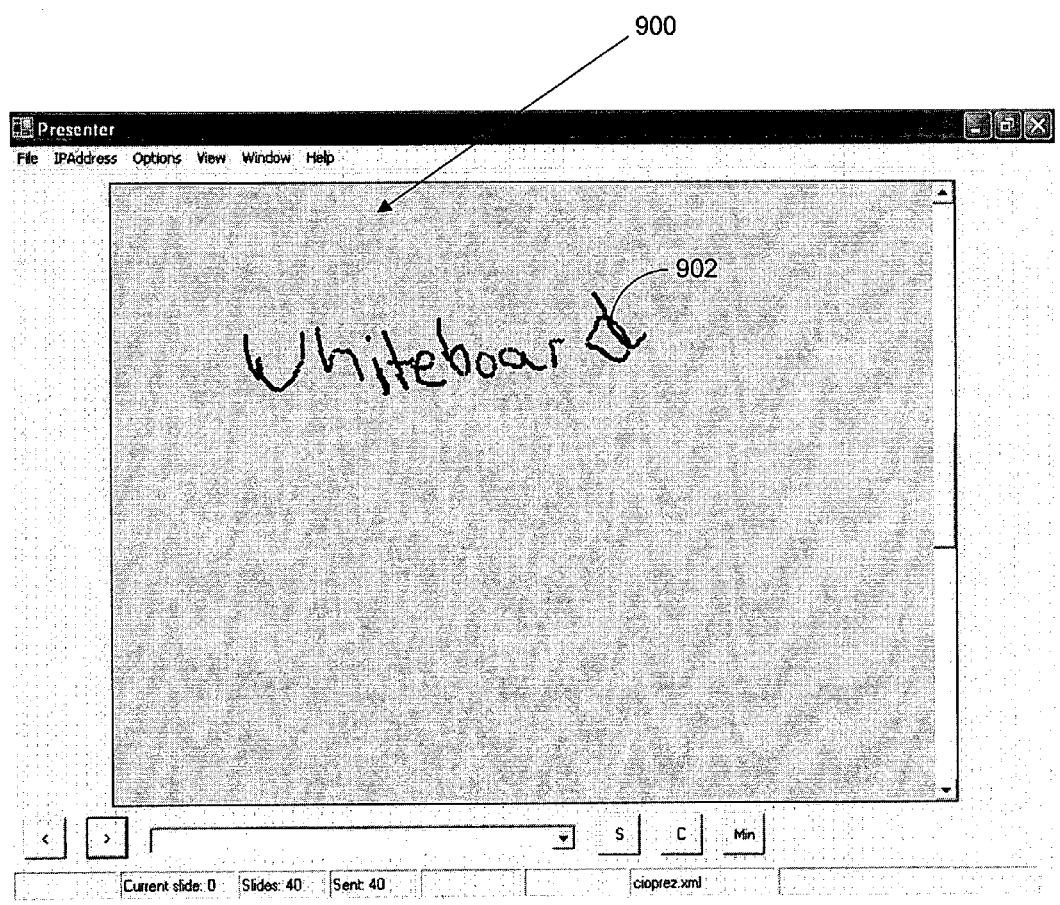
FIG. 11 is an image showing a view of the slideshow window of FIG. 7 where the virtual whiteboard feature according to the present learning system is active.

A "Send Scribble" 808 option and a "Send Pointer" option 810 are also included in the options list 800. These options are available to the presenter only. The send scribble option is selected when it is desired that the annotations entered by the presenter on the aforementioned tablet PC be broadcast by the tablet PC so that they appear on the aforementioned large screen slideshow display or the multiple slideshow display monitors of each connected site. A very useful feature associated with the send scribble option involves selecting this option without broadcasting presentation slides. The result is a virtual whiteboard, which initially appears to the audiences at each connected site as a blank space in the aforementioned workspace window, and where the presenter can "draw" on the "board" using the aforementioned tablet PC. An example of how the slide display sector 900 might look with the virtual whiteboard feature initiated is shown in FIG. 11. In the example, the scribble feature has been used to add the word "Whiteboard" 902 to the blank space in the slide display sector 900.

Another option, the send pointer option 810, is selected by the presenter to broadcast a cursor which is displayed on the workspace window. This cursor mimics the movements of the cursor in the slide display sector of the slideshow window.

The next option in the options list 800 is the "Log Slide Transitions" option 812. When the log slide transitions option 812 is enabled, a file is generated that contains entries identifying each slide presented and the time it was displayed. This file can be quite advantageous for replaying the presentation at a later date or analyzing the flow of the presentation.

The final option included in the options list 800 is the "Show Start Time" option 814. When this option 814 is enabled, the start time of the presentation is displayed in the previously discussed title bar of the slideshow window adjacent the title.

It is noted that whenever the send scribble option 808, send pointer option 810, log slide transitions option 812 and show start time option 814 are enabled by the user selecting them, their enabled status is indicated by any appropriate means, such as a checkmark icon 816 that appears adjacent the selected option as was done in tested versions of the slideshow window. Any of these functions once enabled can be disabled by selecting it again. Once disabled, the enabled indication is removed.

3.1.1.4 The View Menu Item

Figure 12:
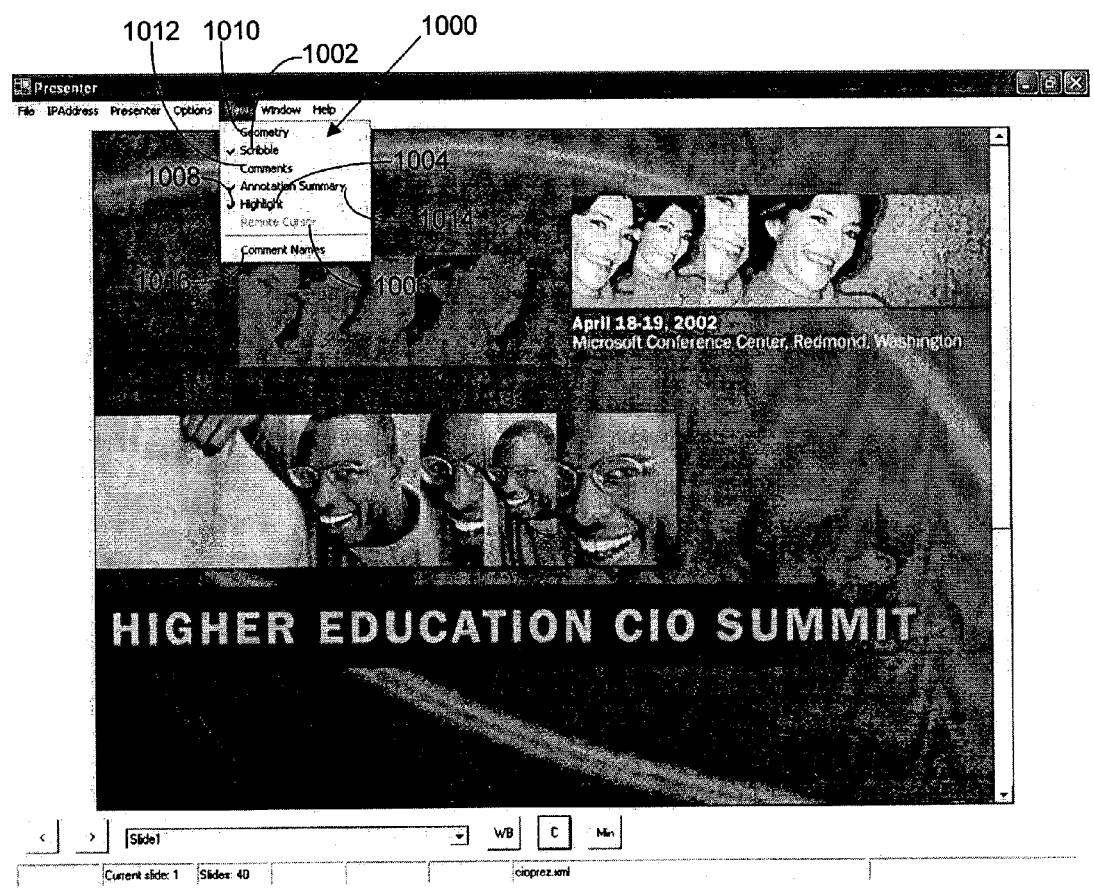
FIG. 12 is an image showing a view of the slideshow window of FIG. 7 where the view menu item has been selected causing a drop-down list of viewing and presenter annotation options to be displayed.

Referring again to FIG. 7, a view menu item 530 is also included in the menu bar 504. The view menu item 530 allows the sites to select certain viewing options. If the viewer role option is selected, upon selection of the view menu item 530, a drop-down list of viewing options appears in the slideshow window 500. Referring to FIG. 12, this list 1000 includes a "Scribble" option 1002 that allows the viewer to elect whether to view the aforementioned presenter annotations. If the scribble option 1002 is enabled, the presenter annotations will appear in both the slideshow window on the presentation computer residing at the electing viewer's site, as well as on the aforementioned large screen slideshow display or the multiple slideshow display monitors at that site.

There is also a "Highlight" option 1004 included in the viewing options list 1000. This option allows the viewer to elect whether to view the highlighting of the text components of a slide. When the option is enabled, the viewer sees this highlighting and when the option is disabled, the viewer will not see the highlighting. This highlighting is a feature of the slideshow window when the presenter role option is selected. Essentially, the presenter can manipulate the screen cursor via conventional means to select portions of the text in the currently displayed slide within the slide display sector of the slideshow window. These portions are then automatically highlighted in any appropriate visually distinguishing way (e.g., bolding, changing color, etc.). Thus, the presenter can use highlighting during the presentation to emphasize a portion of the slide he or she is currently discussing.

A "Remote Cursor" option 1006 is also included in the viewing options list 1000. This option allows the viewer to elect whether to view the presenter's cursor. As was described earlier, the presenter can elect (via the send pointer option under the options menu item) to broadcast a cursor which is displayed on the workspace window of the sites connected to the presentation and which mimics the movements of the cursor in the slide display sector of the presenter's slideshow window. It is the viewing of this cursor that the viewer can elect to view or not using the remote cursor viewing option 1006. Essentially, when the option 1006 is enabled, the viewer sees the cursor and when the option is disabled, the viewer will not see the cursor.

3.1.1.4.1 The Annotation Feature

The "Geometry", "Comments", "Annotation Summary" and "Comment Names" options included in the viewing options list 1000 are related to the aforementioned optional individual lecture participant annotation feature of the learning system. In general, the annotation feature requires the computer handling the control of the slideshow presentation at the presenter's site to accept comments in the form of annotation inputs from the individual particpants and to display them on the slides shown to the presenter on the presenter's display. The annotation inputs are received by the presenter site computer via the network.

Figure 13:
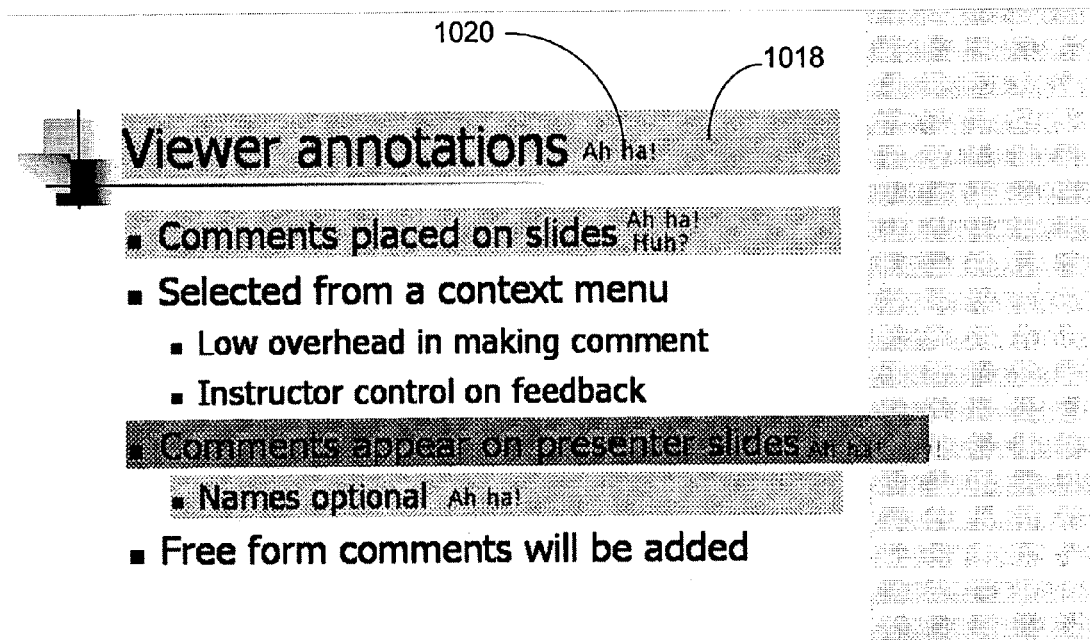
FIG. 13 is an image showing a presentation slide displayed in the slideshow window where the student annotation feature is active and annotations are shown displayed within bounding boxes surrounding the lines of text of the slide.

The aforementioned "View" menu item 1000 of the presenter view is used by the presenter to activate and customize the annotations feature, as shown in FIG. 12. The geometry item 1010 under the view menu 1000, when selected, displays bounding boxes 1018 around each line in the slide currently displayed, as shown in FIG. 13. If the presentation slideshow was created using Microsoft Corporation's Powerpoint® presentation graphics program, one way of displaying the bounding boxes would be to employ the "divs" and "spans" information generated when a slide is saved as an HTML file as part of the creation process to define the bounding boxes, and then to shade the box area so that it stands out against the background color of the slide. Another way of identifying the bounding box regions is to derive them from the image of the slide directly. If the bounding boxes are derived directly from the image of the slide, they need not be rectangular, and can take on other shapes as desired.

Referring again to FIG. 12, the "comments" item 1012 under the view menu 1000, when selected, causes the comments received from students to be displayed in the regions outside the text of the line of the slide and within the bounding box for that line, as shown in FIG. 13. It is noted that the bounding box itself need not be displayed in conjunction with the comments, as when the geometry option is not selected. However, the comments 1020 still appear with the region associated with the bounding box.

The comments can be displayed as input by the student. However, if there are more than just a few students commenting, the space allotted to annotations could be quickly exhausted. Accordingly, a summarization feature can be incorporated, which displays the comments in a summarized form. The annotation summary feature is initiated by selecting the "annotation summary" item 1014 under the view menu 1000. The summary is displayed in the bounding box of the line to which the comments apply in lieu of the comments themselves.

Summarization of the comments can be intensity based in that only the most common comment or comments are shown. One way of accomplishing this would be to associate a comments menu with the aforementioned student interface that when activated provides a list of prescribed comments that can be selected by the student. Then, the most commonly selected comment is displayed adjacent the affected line. Using a prescribed list of comments has the advantages of giving the presenter control over what type of feedback is provided from the students, and with proper encoding makes the overhead of transmitting, receiving and saving the comments very low. These prescribed comments can be anything desired and could include comments indicating a state of mind of the student (e.g., "huh"), action requested by the student (e.g., "explain again"), comments of the pace (e.g., "too fast"), positive feedback indicating the student understands what is meant by that line of the slide (e.g., "a ha"). The prescribed comments could even include canned answers to a quick poll. For example, a quick poll question could be posed in some manner, such as verbally by the presenter during the lecture or on the slide itself, and the students would respond by selecting an answer from the prescribed comments list (e.g., yes or no). In this case, the slideshow program could display a running tally of the poll in the associated bounding box. It is noted that the summarization method can vary between lines of the slide as well.

The annotation summary feature can also take the form of a numerical summary that is simply a number indicating how many comments have been received for the affected line of the slide. In this case the comments can be stored in the presenter's computer and counted by the slideshow program. The program causes the current number of comments to be displayed adjacent the line being commented on. The comments can be generated via a prescribed comments list as described above, thereby enjoying the same advantages, or they can be free form allowing the student to say anything they want.

The "comment name" item 1016 under the view menu 1000 when selected causes the name of the student making a comment to be displayed adjacent the comment associated with the line of the slide being commented on. The name listed is the name provided by the student when logging into the system. It is noted that this option is only available when the comments item 1012 has been previously enabled. The comment name item 1016 is "grayed out" when the comments item 1012 is not enabled to indicate it is not selectable.

It is noted that here too, whenever any of the view menu viewing options are enabled by the user selecting them, their enabled status is indicated by any appropriate means, such as a checkmark icon 1008 that appears adjacent the selected option as was done in tested versions of the slideshow window. Any of these functions once enabled can be disabled by selecting it again. Once disabled, the enabled indication is removed.

3.1.1.5 The Window Menu Item

Figure 14:
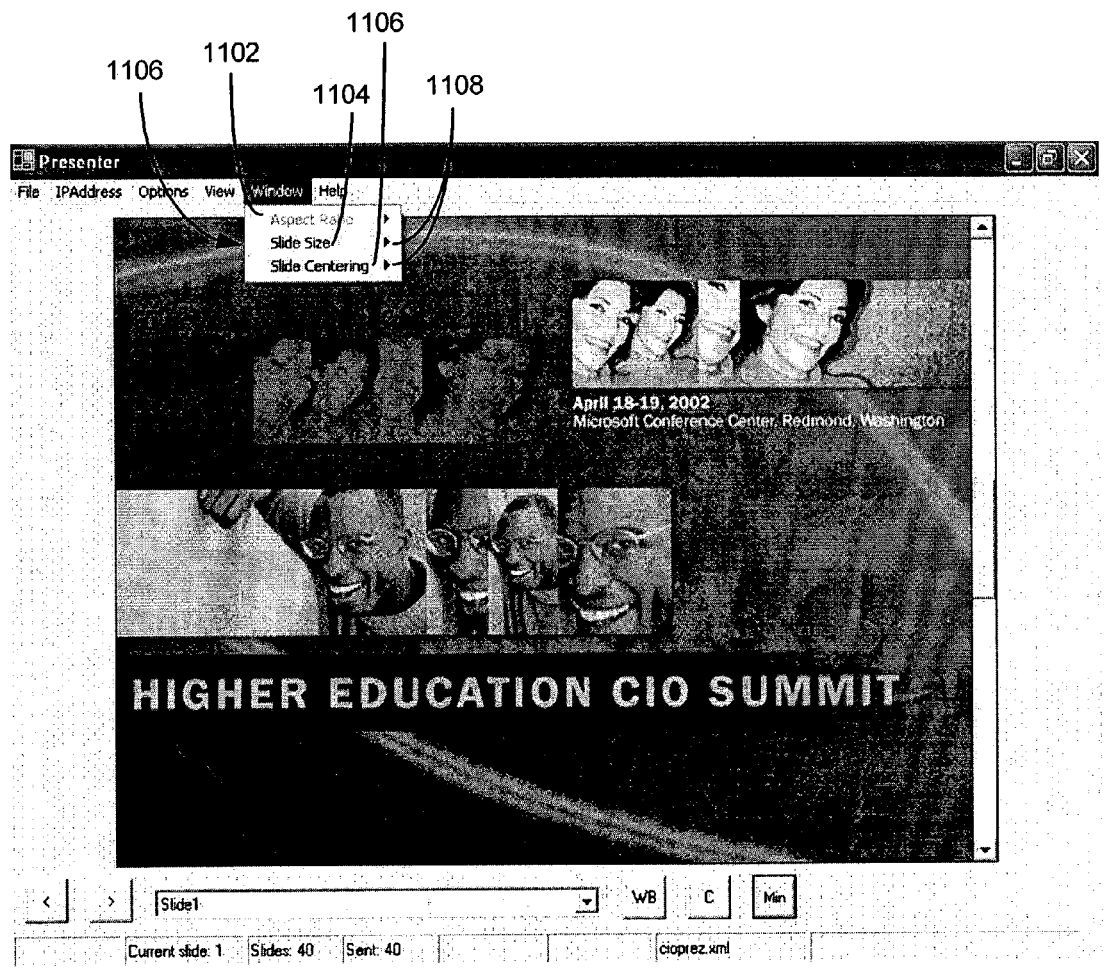
FIG. 14 is an image showing a view of the slideshow window of FIG. 7 where the window menu item has been selected causing a drop-down list of sizing commands to be displayed.

Referring once again to FIG. 7, a window menu item 532 is included in the menu bar 504, as well. The window menu item 532 is used to manipulate the size of the slideshow window 500 and the slides displayed in the slide display sector 502 of the window. In operation, when either the presenter or a viewer selects the window menu item 532, a drop-down list of sizing commands appears in the sideshow window 500. Referring to FIG. 14, this list 1100 includes an "Aspect Ratio" command 1102 that when selected causes a sub-list of pre-defined aspect ratios (not shown) to appear. Essentially, the selection of a particular aspect ratio from the displayed list changes the width and/or height of the slideshow window. This allows the window size to be tailored to the particular display screen being employed to view and interact with the slideshow window.

Figure 15:
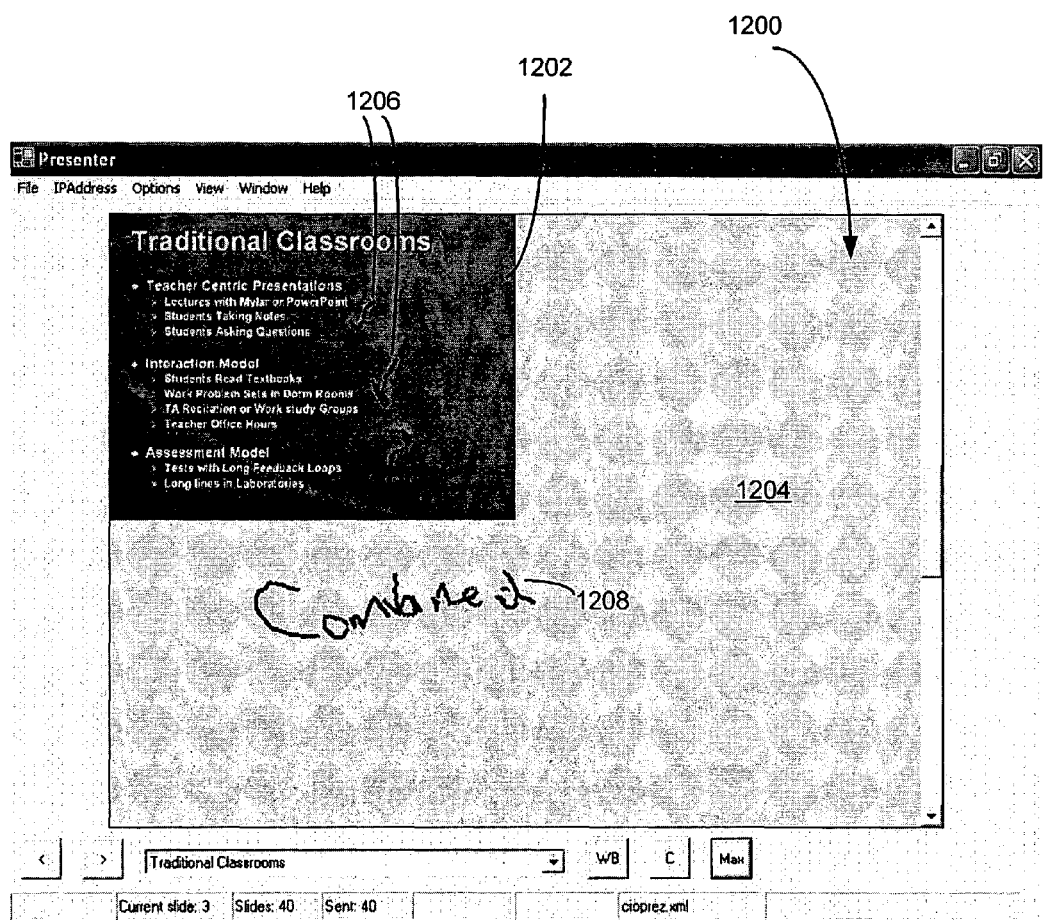
FIG. 15 is an image showing a view of the slideshow window of FIG. 7 where the combined presentation slide display and virtual whiteboard according to the present learning system is active.

The next two sizing commands in the list 1100 are the "Slide Size" 1104 and "Slide Centering" 1106 commands. When the slide size command 1104 is selected, a sub-list of pre-defined slide sizes (not shown) appears in the slideshow window. In tested versions of the slideshow window, the slide sizes range from 100 percent, which when selected fills the entire slide display sector with the current slide, to 50 percent, which when selected causes a slide image having half the width and height of the full size version to be displayed in the slide display sector. It is noted that smaller slide sizes could be included as desired. When a slide size of less that 100 percent is selected, there will be blank space adjacent to the slide image. This is significant, as it supports a combined slide display and whiteboard feature of the learning system. Essentially, by making the presentation slide smaller and creating blank space around the slide image, the presenter can use the space for annotations that he or she does not want to put directly on the slide. This combined configuration is shown in the exemplary screen shot of FIG. 15. Thus, the slide display area 1200 of the slideshow window, and so the workspace window displayed to the audiences at each site, is partially filled with an image of the current slide 1202 and partially blank space 1204 that the presenter can fill with annotations 1206 in addition to annotations 1208 added to the slide itself. It is noted that the foregoing combined slide display and whiteboard feature presupposes that the presenter has enabled the send scribble option under the options menu item and a viewer has enabled the scribble option under the view menu item.

Referring again to FIG. 14, the slide centering command 1106 complements the slide size command 1104 in that whenever the slide size is set to less than 100 percent, the slide centering command 1106 allows the presenter to specify where in the slide display sector the reduced size slide image appears. In tested versions of the slideshow window, when the slide centering command 1106 is selected, a dialog box (not shown) that allows the presenter to select pre-defined slide locations appears in the slideshow window. Namely, the presenter can specify the reduced slide image's vertical position by selecting whether the slide appears at the top, middle or bottom of the slide display sector. This is accomplished by selecting a check box adjacent the desired choice, after which a check mark appears in the previously empty check box. Similarly, the presenter can specify the slide's horizontal location by selecting whether the slide is to appear on the left side, in the middle, or at the right side of the slide display sector. Thus, in all, the presenter can select between nine different slide locations in tested versions of the learning system. As an example consider the slide size and position shown in FIG. 15. As can be seen, the slide size has been set to 50 percent and the location has been set to top-left. It is noted that this is the default location in tested versions of the system.

Referring once again to FIG. 14, it is noted that the aspect ratio 1102, slide size 1104, and slide centering 1106 commands each have an arrow 1108 displayed adjacent thereto, this arrow is selected to access the respective sub-lists and dialog box. It is further noted that the mode of selecting the arrow 1108 can be a simple "hovering" maneuver where the screen cursor is placed over the arrow and no other action is needed.

3.1.1.6 The Help Menu Item

The last menu item is the help item 534. Selecting the help menu item 534 causes a drop-down list (not shown) to appear in the slideshow window. In tested versions of the present system, this list included only one listing—namely an "About" link. Selecting the about link causes an information box to appear in the slideshow window. This information box is a standard "about" box and includes information such as the title of the program and its version number, copyright data, the licensee's name, and perhaps links to other informational windows. While the tested embodiments were limited to just the about link, this need not be the case. Links to various help directories, as well as links to "on-line" support sites, could be included.

3.1.2 The Control Bar

Referring again to FIG. 7, the functions of the aforementioned control bar 520 will now be described. In general, the control bar is made up of a series of control buttons and a selection field that are used by the presenter to run the presentation slide show (and so inactive if the viewer role has been selected under the options menu item). To this end there is a previous slide button 536 and a next slide button 538. When selected, these buttons 536, 538 respectively change the currently displayed presentation slide to the previous or next slide in the slide deck. In addition, there is a slide selection field 540 that lists the name of the currently selected slide, and which has a drop-down arrow 542 at one end. When the arrow 542 is selected a drop-down list (not shown) appears in the slideshow window listing all the slides in the presentation by name and in the order from top to bottom which they are scheduled to be shown. When a name is selected from the list, the presentation slide associated with that name is displayed in the slide sector of the sideshow window. In addition, if there are too many slides to list in the space allocated to the drop-down list, a standard graphic scroll bar is included along one side of the list so that the user can scroll up or down the list to display the hidden slides. It is note that the names of the slides can be related to a title on the slide, or could be defaulted to list the slide by its sequence number in the slide deck (e.g., "Slide 3").

The control bar 520 also has three scribble related buttons. The first of these buttons 544 (which is labeled "WB" as short for whiteboard in tested versions of the slideshow window) activates the previously described whiteboard function where only the scribble is displayed in the slide display sector 502. Thus, the whiteboard button 544 represents a shortcut to using the previously described menu options. When the whiteboard button 544 is selected, its label changes. In tested versions of the slideshow window the label changed to an "S" (short for Slides). When the presentation is in the whiteboard mode, selecting the whiteboard button 544 (then labeled with an "S") changes the presentation back to its slide-with-scribble display mode. It is noted that this latter mode is the default mode. There is also a clear ink button 546, which is label with a "C" in tested versions of the slideshow window. The clear ink button 546 clears all the annotations entered by the presenter with the aforementioned tablet PC in association with the currently displayed slide, or if a space which was initially blank is currently being displayed, the button 546 clears any annotations added in that space by the presenter. It should be noted that this button 546 is also a short cut to the "Clear Current Slide" command found under the file menu item 524. Finally, there is a slide minimizing/maximizing button 548 in the control bar 520. In tested versions of the slideshow window, the default mode for the presentation is for the entire slide display sector 502 to be filled with the image of the current slide (i.e., corresponding to the 100 percent setting in the slide size command of the window menu item 532). As such the minimizing/maximizing button 548 is initially configured to minimize the slide size. In tested versions of the slideshow window, the button 548 is labeled "Min" at this the initial stage, and selecting it minimized the slide size to 50 percent of its initial width and height. In addition, the minimized slide is displayed in the upper left region of the slide display sector. Further, when the minimizing/maximizing button 548 is selected with the slide size maximized, the button label changes to "Max". In this configuration, the slide size is once again maximized when the presenter selects the button 548. Here again the slide minimizing/maximizing button 548 acts as a short cut for the slide size and slide centering commands under the window menu item 532.

It is noted that while the tested versions includes only those short cut buttons described above, any other feature accessible through the menu bar could have a short cut button included in the control bar 520, as desired. The ones included were simply believed to be the particular features that would be accessed most frequently.

3.1.3 The Information Bar

As mentioned previously, the information bar includes several information fields providing information about the presentation. Referring once again to FIG. 7, these fields include information field 550 that displays the title "P#" followed by a number indicating the number of presenters, which is always "1" if no error has occurred. Adjacent this first field 550 is a field 552 displaying the title "V#" followed by a number indicating the number of viewing sites that the presentation is being broadcasted to, including the presenter's location. Another information field 554 included in the information bar 522, has a title "Current Slide:" followed by the sequence number of the slide currently being displayed in the display sector 502. Yet another information field 556 shows a title "Slide:" followed by a number indicating the total number of slides in the presentation slide deck. A slide sent field 558 is also included which has the title "Slides Sent" followed by a number indicating the number of individual slides broadcasted. For instance, as shown in the example presentation window of FIG. 7, if there are 15 slides in the presentation and there are 3 sites participating, the slides sent field 558 would indicate the 45 slides have been broadcasted. There is also an information field 560 displaying the name of the slide presentation, and finally a field 562 displaying the name of the site from which the presentation is being broadcasted. In the example window shown in FIG. 7, the network address of the presenter's site is displayed to represent the name of the site. However, any name can be given to the site and displayed in the site name field 562 in lieu of the network address.

3.1.4 The Scrollable Overlay Feature

Figure 16A:
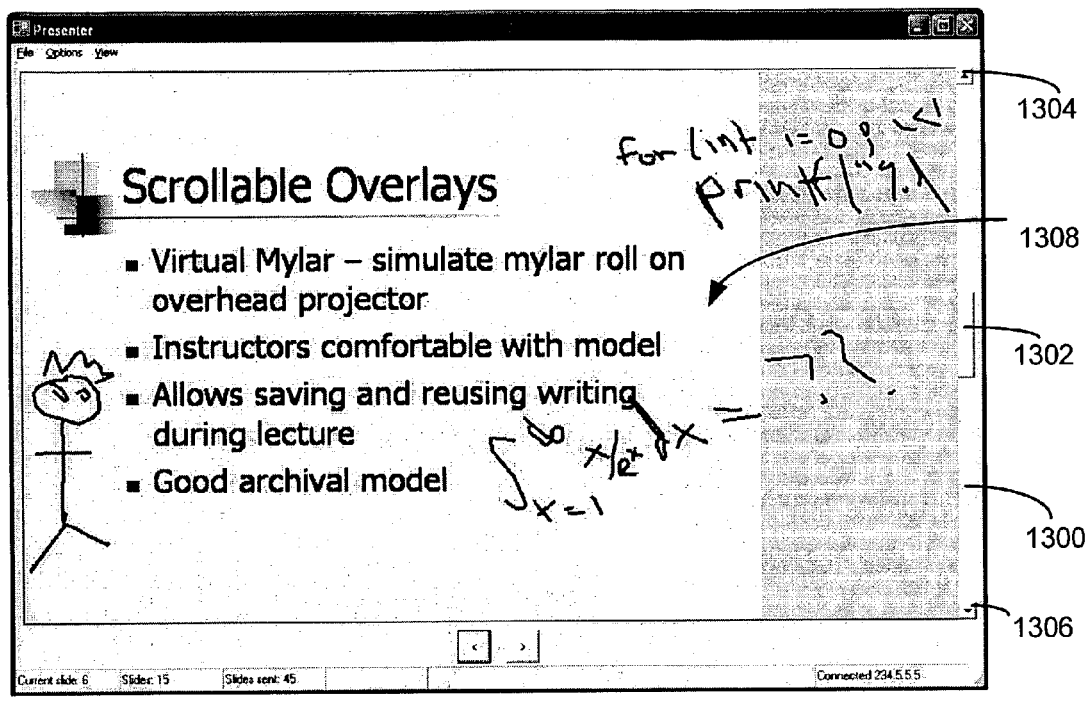
FIGS. 16A and 16B are images showing a view of the slideshow window of FIG. 7 where the scrollable presenter annotations feature according to the present learning system is active.

Referring to FIG. 16A, as described previously, a graphic scroll bar 1300 in the form of a standard slider 1302, up arrow 1304 and down arrow 1306, is displayed to the side of the slide display sector 1308. The scroll bar 1300 is used to control a scrollable overly feature of the learning system. This feature is designed to mimic the somewhat archaic, but well liked, method of using a roll of mylar film to add annotations to a presentation slide in the form of a transparency placed on a transparency-type overhead projector. The roll of mylar film is rotatably supported on one side of the transparency bed of the overhead projector and stretched across this bed to a take-up reel on the opposite side. The presenter writes on the film with a felt tip pen, thus annotating the slide being displayed. When the presenter wants to add additional annotations but does not what the previous annotations to appear (such as when there is not more room to add annotations), the presenter rolls the mylar up onto the take-up reel, thereby bringing a blank portion of the roll of mylar over the transparency.

In the present system, the presenter can add annotations 1310 to a currently displayed presentation slide, or to surrounding blank regions (if existing), using the aforementioned scribble feature. When the presenter runs out of room or wishes to clear the way for additional annotations for whatever reason, he or she can employ the scroll bar 1300 to move the existing annotations 1310 out of view. Specifically, in tested versions of the present slideshow window this is done by dragging the slider 1302 downwards using a conventional dragging maneuver, or repeatedly selecting the down arrow 1306. However, the window functionality could be configured to accomplish the same thing by dragging the slider 1302 upwards or repeatedly selecting the up arrow 1304.

Figure 16B:
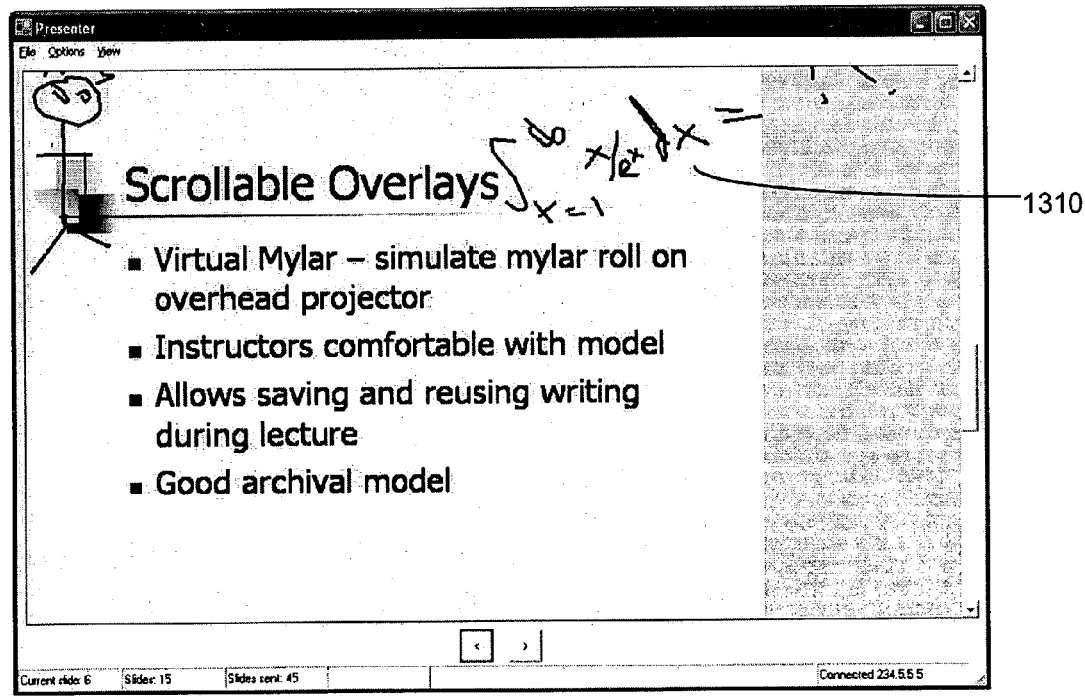

The above-described scrollable overlay feature could be thought of as virtual mylar in reference to the previous use of mylar rolls to annotate slides during a presentation. An example of how this scrolling of annotations might look is shown in FIG. 16B, where the previously added annotations 1310 depicted in FIG. 16A, are being scrolled up and out of view.

It is noted that the annotations are periodically saved and associated with the presentation slide they were "written" onto, along with the position of the scroll bar 1300. In this way, the annotations can be later retrieved and viewed by scrolling. In addition, if during a presentation the presenter has added annotations and then scrolled them out of view, he or she can move them back into view by dragging the slider 1302 upward, or by repeatedly selecting the up arrow 1304 (or vice versa if configured differently).

It is further noted that the same scrolling feature is available where the aforementioned whiteboard feature has been initiated.

3.1.5 The Slideshow Process

Figure 17A:
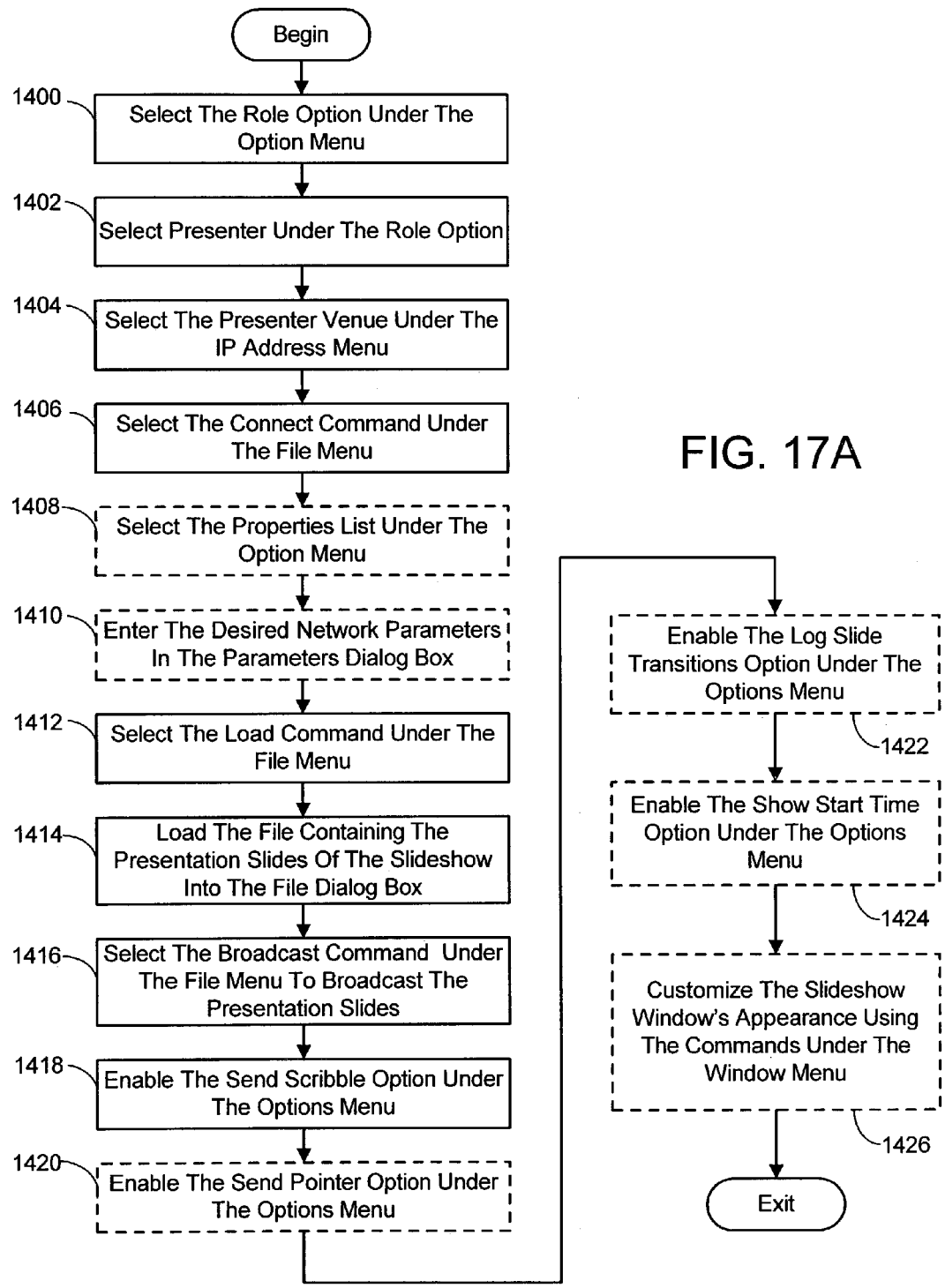
FIGS. 17A and 17B are flow charts diagramming an overall process according to the present invention for a presenter to initiate and run a slideshow presentation with the presenter annotation feature activated (FIG. 17A) and additionally with the student annotation feature activated (FIG. 17B).

Given the foregoing slideshow window interface, the following process can be used to initiate and run a slideshow presentation. Specifically, the following process will exemplify how a presenter would initiate and run a slideshow presentation with the scribble feature enabled once the slideshow window has been opened. Referring to FIG. 17A, the process begins by the presenter selecting the option menu item and then the role option (process action 1400). The presenter then designates himself or herself to be the presenter under the role option (process action 1402). Next, the presenter selects the IP Address menu item and then selects his or her venue from the venue list (process action 1404). The file menu item is selected after the venue is selected and the connect command is chosen (process action 1406). It is noted that the network parameter could be set at this point if desired (or if not the default values will be used). To accomplish this task the presenter accesses the properties list under the option menu item (optional process action 1408), and then enters the desired network parameters in the parameters dialog box (optional process action 1410). It is noted that the optional nature of process actions is indicated in FIG. 17A by the use of broken line boxes.

The next action in the slideshow process is to select the file menu item and then the load command (process action 1412). The presenter uses the open file dialog box that appears to load the file containing the presentation slides of the slideshow (process action 1414). Next, the presenter selects the file menu item and then the broadcast command to broadcast the presentation slides (process action 1416). In addition, the presenter selects the options menu and enables the send scribble option (process action 1418). If desired, the presenter can also enable the send pointer (optional process action 1420), log slide transitions (optional process action 1422), and/or show start time options (optional process action 1424) while the option list is displayed. Finally, the presenter can customize the slideshow window's appearance using the window menu item and its underlying commands (optional process action 1426).

Figure 17B:
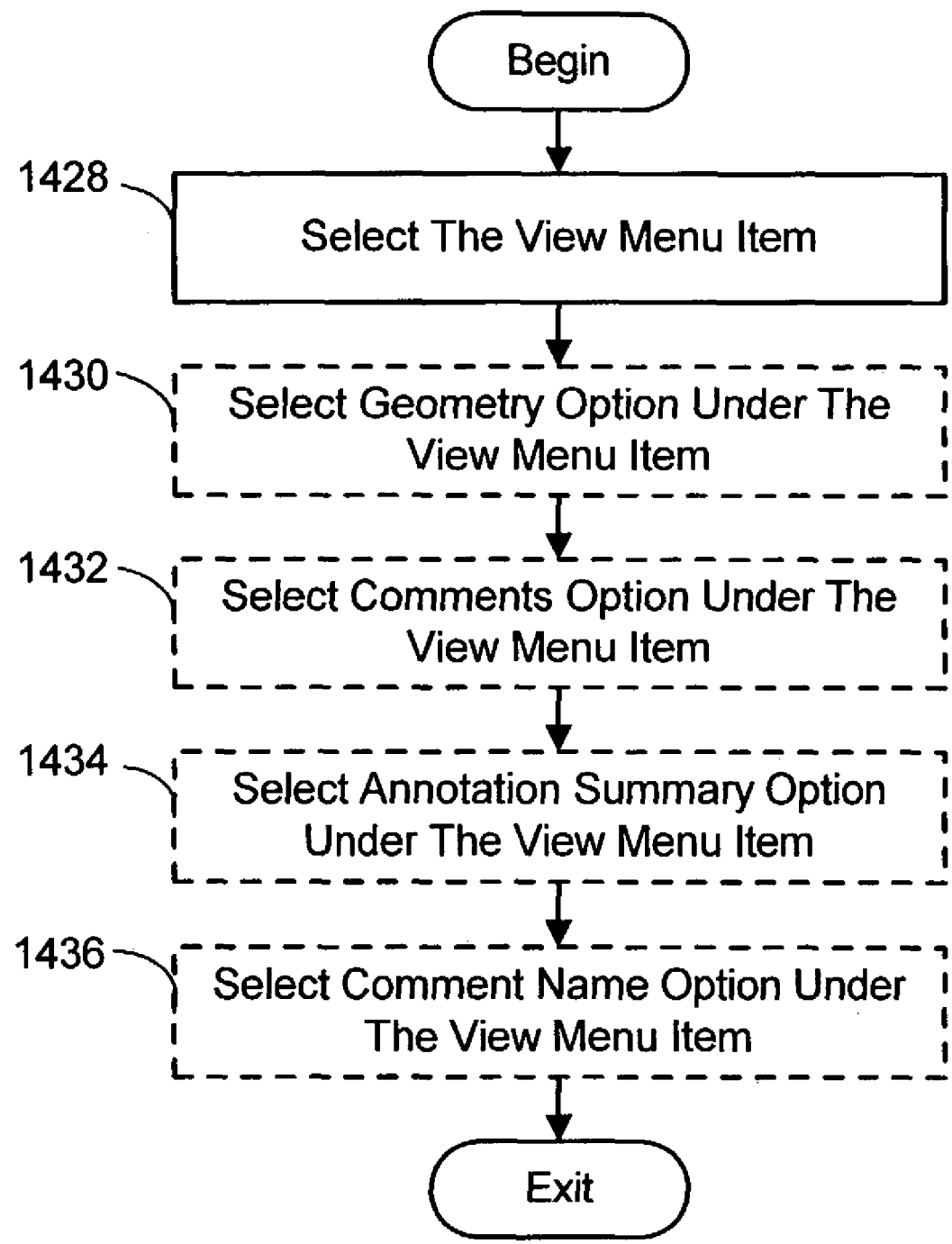

Referring now to FIG. 17B, the presenter can optionally enable the individual lecture participant annotation feature of the learning system as follows. First, the presenter selects the view menu item to access the viewing options list (process action 1428). Next the viewer selects those annotation feature options he or she wishes to implement. For example, the presenter can select the geometry option (process action 1430) to display the aforementioned bounding boxes around each text line of the slides as they are shown. The presenter can also select the comments option (Process action 1432) from the viewing options list. This causes any comments received from students to be displayed in some form within the bounding box region surrounding the line of the slide being commented on. Further, the presenter can select the annotation summary option (process action 1434) from the list. This causes the comments received from students to be summarized in a prescribed way and the summary information displayed in the bounding box region surrounding the applicable line of the slide being displayed. Finally, the presenter can select the comment name option (process action 1436) to cause the name of the commenting student to be displayed adjacent the student's comment. Note that the comments option must be selected for this last option to be selectable. It is also noted that the optional nature of the foregoing actions is indicated in FIG. 17B by the broken line boxes.

Figure 17C:
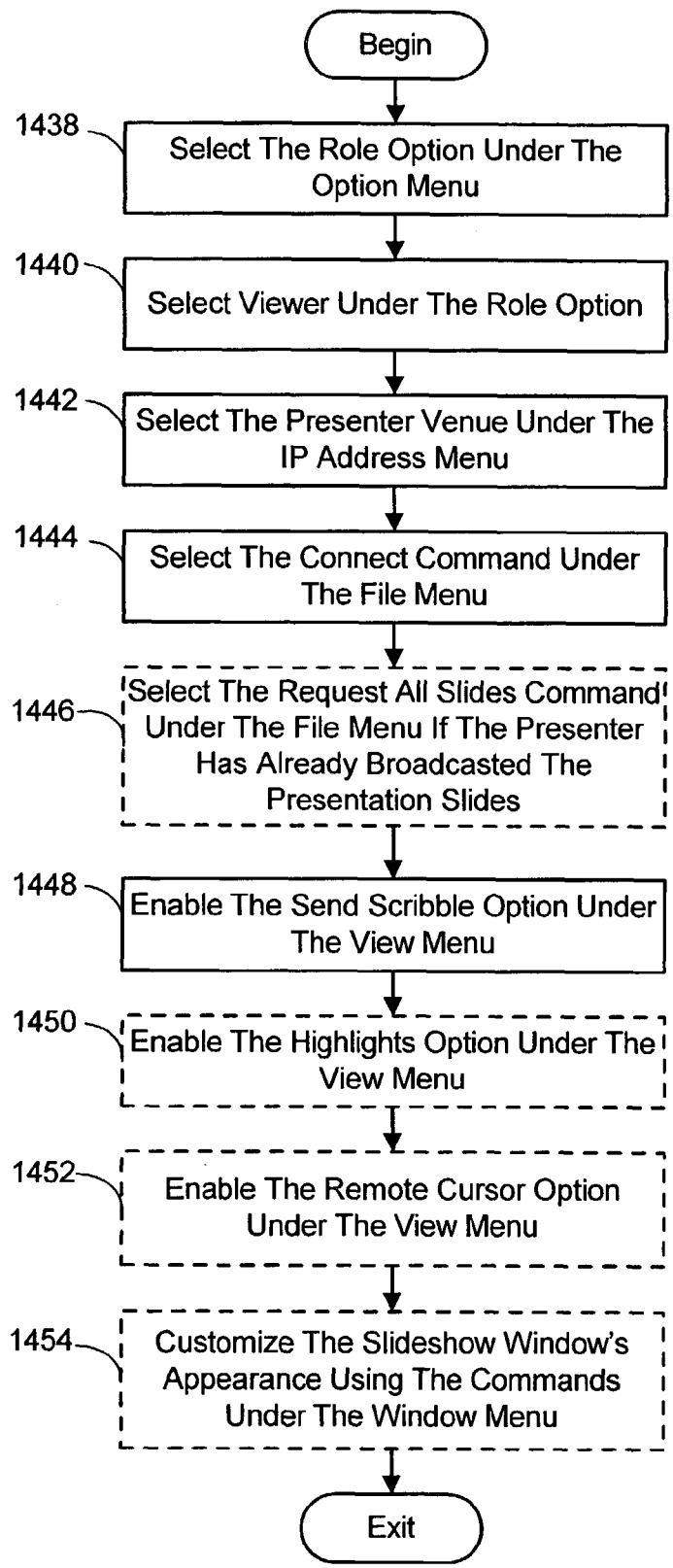
FIG. 17C is a flow chart diagramming an overall process according to the present invention for a site representative to initiate and display a slideshow presentation with the presenter annotations being displayed as well.

As for each remote viewing site, the following process can be used to receive and customize the slideshow presentation. Specifically, the following process will exemplify how a site representative would initiate the reception and customization of a slideshow presentation with the scribble feature enabled. Referring to FIG. 17C, the process begins by the representative selecting the option menu item and then the role option (process action 1438). The representative then designates the site to be the viewer under the role option (process action 1440). Next, the representative selects the IP Address menu item and then selects the venue associated with the presenter of the slideshow from the venue list (process action 1442). The file menu item is selected after the venue is selected and the connect command is chosen (process action 1444). It is noted that if the presenter has already broadcasted the presentation slides prior to the representative connecting to the presenter's site, then the representative selects the file menu item and chooses the request all slides option from the file menu command list (optional process action 1446). The representative next selects the view menu item and enables the send scribble option from the view options list (process action 1448). In addition, the representative can also enable the highlights and remote cursor options if desired (optional process actions 1450 and 1452). Finally, the site representative can customize the slideshow window's appearance using the window menu item and its underlying commands (optional process action 1454). It is noted that the optional nature of the foregoing actions is also indicated in FIG. 17C by the use of a broken line boxes.

3.2 The Conferencing Interface

As discussed previously, the conferencing interface is embodied in graphic user interface window used to disseminate and receive the video and audio portions of an educational lecture or business-oriented presentation. The conferencing window will be described in context of its application in a presentation multicast first, followed by a description of the aforementioned presence window presented to the audience at each participating site.

3.2.1 The Conferencing Window

A unique A/V computer program is employed to manage the multicast and receipt of A/V data by a lecture "participant's" computer as described above, as well as to provide a user interface between the computer and the participants. For the purposes of the description in this section, the term "participant" will be employed to mean both the presenter (or lecturer), as well the representative of a remote site. The presenter and remote site representative terms will be used when an item applies only to one and not the other.

In general, the interface involves displaying an interactive conferencing window that is used by a participant in setting up the receipt of audio and video feeds broadcast by other participants, and to send audio and video data to the other participants. The conferencing window is a graphical user interface that allows a presentation presenter to initiate and broadcast a live video of an educational or business presentation, and to receive video and audio from participants at other locations—all via a distributed network. In reference to the previously described hardware configurations, the conferencing window is displayed to the presenter via the display screen of the presentation computer or a remote display device in communication with the computer. In addition, the conferencing window is employed by representatives at remote sites to connect to a presentation being broadcast and to set certain viewing parameters. In this case as well, the conferencing window is displayed via the display screen of the site's presentation computer or a remote display device in communication with the computer.

Figure 18:
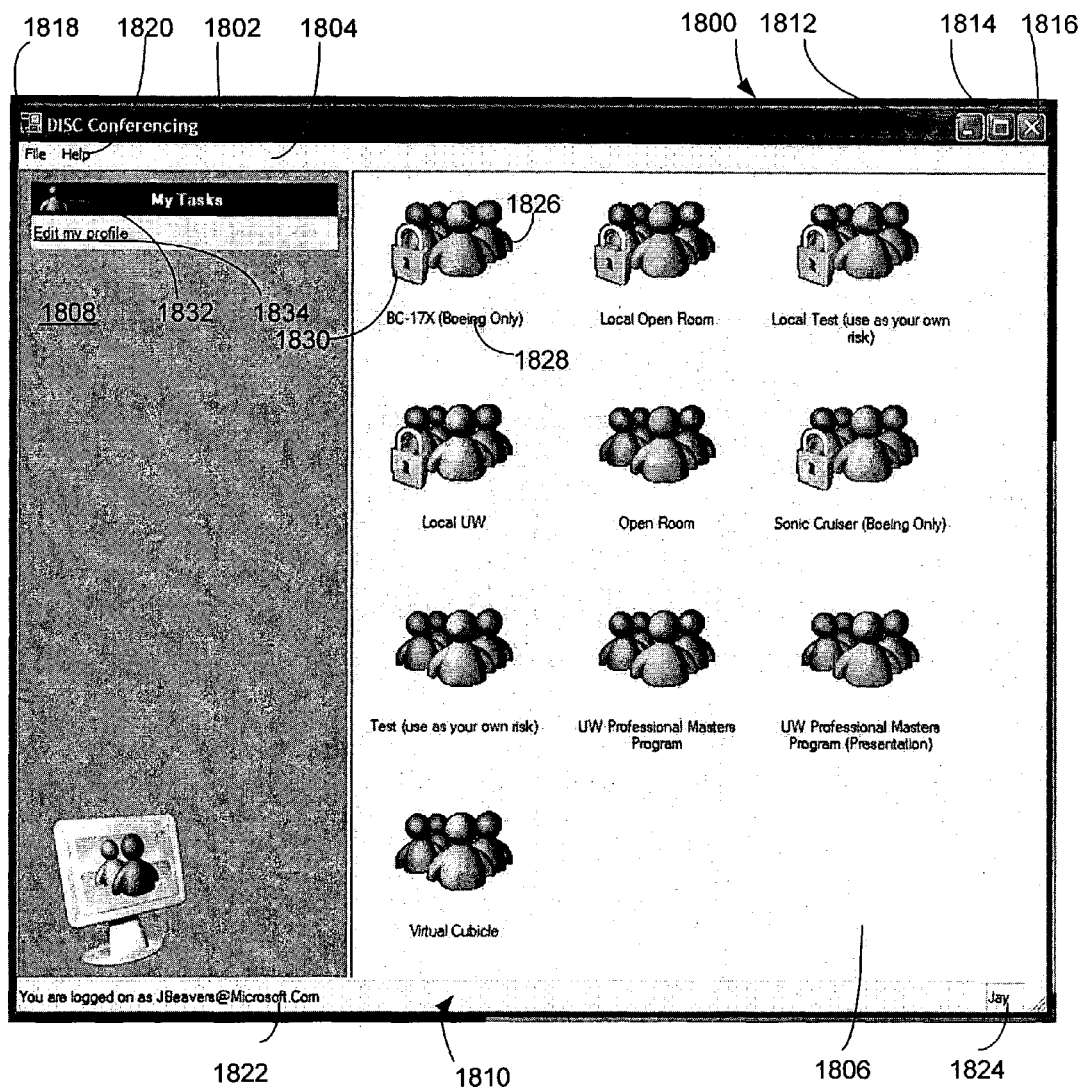
FIG. 18 shows a user interface conferencing window layout according to the present learning system.

In reference to FIG. 18, when the present learning system program is executed, the conferencing window 1800 is displayed to a participant via the display screen of the participant's computer. In general, the conferencing window 1800 includes a title bar 1802, a menu bar 1804, a venue sector 1806, a task sector 1808, and an information bar 1810.

The title bar 1802 includes a name given to the conferencing window 1800, which in the case of the example window shown in FIG. 18 is "Conferencing". To the far right of the title bar 1802, the standard window control buttons are displayed, including a minimizing button 1812, maximizing button 1814 and a button 1816 to close the conferencing window 1800.

The menu bar 1804 includes two menu items—namely a "File" menu item 1818 and a "Help" menu item 1820. Upon selecting the file menu item 1818, a drop-down list of commands (not shown) appears in the conferencing window 1800. In tested versions of the window, this list included just one command, namely a standard "Exit" command. The exit command simply closes the conferencing window when selected. Upon selecting the help menu item 1820, a drop-down list (not shown) appears in the conferencing window. In tested versions of the present system, this list included only one listing—namely an "About" link. Selecting the about link causes an information box to appear in the conferencing window. This information box is a standard "about" box and includes information such as the title of the program and its version number, copyright data, the licensee's name, and perhaps links to other informational windows. Further, additional links to various help directories, as well as links to "on-line" support sites, could be included, as desired.

The information bar 1810 includes two information fields. The first of these fields 1822 provides information about the current status of the conferencing process. For example, in the conferencing window configuration seen when the window is first opened, the status field 1822 indicates the name that the participant logged onto the network under. As the conferencing process proceeds, the status field 1822 changes to provide pertinent status information. The exact nature of the information can be any desired and is pre-defined by the programmer implementing the present conferencing window and its underlying functionality as specified herein. The second of the information fields 1824 is provided to indicate what name the participant has chosen to be identified by, as will be discussed shortly.

As for the venue and task sectors 1806, 1808, these are somewhat more complex and change depending on the status of the conference. For example, the venue sector 1806 initially displays a list of venues prior to a venue being joined, and a list of participants in the venue once it is entered. A venue is essentially a "virtual classroom" where all the participants "meet" at a prescribed time, and is managed via a venue server that will be described later. The task sector also changes depending on the actions of the participant. Each of these sectors will be described in more detail in the sections to follow, which have been divided between the period of time before a venue is entered and after it is entered.

3.2.1.1 Venue and Task Sector Operations Prior to Entering a Venue

In general, the venue sector 1806 initially provides a space to list all the venues that are potentially accessible by a participant. The participant selects a venue it was agreed will act as the host for the virtual presentation site at an agreed to time. In the case of a presenter, the presentation will be seen on the aforementioned large screen presentation display or the multiple presentation display monitors at that location. The view that is seen on the display screens is the "presence" view and will be discussed in more detail later. It is noted that only one venue can be selected at a time. Thus, a participant must disconnect from a selected venue before accessing another one.

In tested embodiments the venue list took the form of a collection of icons 1826 with an adjacent text title 1828 indicative of the location or nature of the venue represented by the icon. In addition, some private venues include a lock icon 1830 to indicate that the audio and video streams from that venue cannot be accessed outside the organization associated with the venue. The venues listed are loaded from a venue server that is automatically contacted via the network when the conferencing window 1800 is opened. If there are too many venues to fit icons 1826 for them all in the space allocated to the venue sector 1806, vertical and/or horizontal scroll bars (not shown) will appear at the periphery of the sector. These scroll bars are used in a conventional manner to bring venue icons into view as desired.

Just adjacent the venue sector 1806 is the task sector 1808. Generally, the task sector 1808 is used to access information about the venues and to initiate certain commands that will be described shortly.

3.2.1.1.1 The Profile Dialog Box

Figure 19:
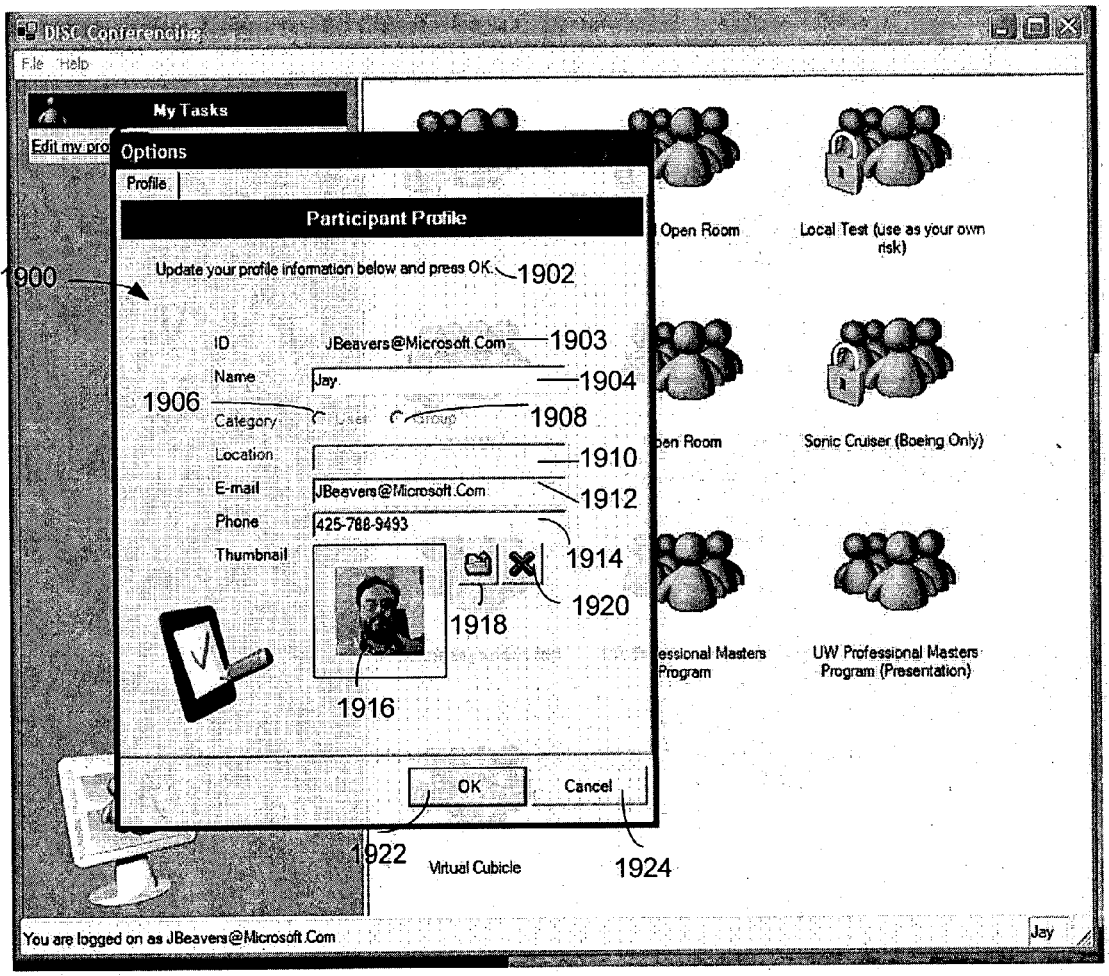
FIG. 19 shows a profile dialog box for entering and editing information regarding a lecture participant or site using the present learning system.

Prior to the participant selecting a venue, the only action that can be taken is to edit the participant's own information. To this end a "My Tasks" command list 1832 is displayed in the task sector 1808 with a single command listed thereunder. This command 1834 is entitled "Edit My Profile" in tested versions of the conferencing window. If the participant selects the edit my profile command 1834, a profile dialog box appears in the conferencing window. As seen in FIG. 19, the profile dialog box 1900 includes several informational and editable fields. The first field 1902 provides instructional information about the purpose of the profile dialog box 1900. The next filed is a non-editable "ID" field 1903 that displays the name that the participant is logged onto the network under, and matches what is displayed in the first field of the aforementioned information bar of the conferencing window. The next field is a data entry field 1904 entitled "Name" and is editable by the participant. Essentially, the participant enters the name that will appear adjacent their participant thumbnail that will be discussed shortly. In addition, this name appears in the second field of the aforementioned information bar of the conferencing window.

The next field of the profile dialog box is named the "Category" field and includes a series of checkboxes that allow the participant to indicate his or her status in regards to the presentation. For instance, in the example dialog box 1900 shown in FIG. 19, there are two category checkboxes—namely a "User" checkbox 1906 and a "Group" checkbox 1908. In the context of a presentation, the user would likely be the presenter and the group would be a classroom or presentation site associated with the participating sites. Other category checkboxes could also be added to be more specific. For example, if the presentation is part of an educational program, categories for student and presenter-professor might be included.

The next field in the profile dialog box 1900 is the "Location" data entry field 1910. This field 1910 allows the participant to enter their physical location. There are also two fields for entering contact information. Specifically, an "E-mail" data entry field 1912 is included to allow the participant to enter an email address, and a "Phone" data entry field 1914 is included to allow the participant to enter a telephone number. On the other hand, a profile for a remote site would have an e-mail and telephone number information associated with the site itself or a representative at the site.

The profile dialog box 1900 also has a "Thumbnail" sector which displays a currently selected thumbnail 1916 associated with the participant whose profile is described by the box. If no thumbnail is selected this thumbnail space is blank. The thumbnail can be any image or graphic representing the participant. In the case of a remote site participant this could be an image of the site representative or of the site itself, or some graphic representing the site. A thumbnail 1916 is added to the profile dialog box 1900, or changed, by selecting a file icon 1918 located adjacent the space reserved for the thumbnail image 1916. Upon selecting the file icon 1918, a standard open file dialog box (not shown) appears in the conferencing window. The participant employs the dialog box to find and select an appropriate image or graphic file. Upon selection of the file, the image data is used to generate a thumbnail that is then displayed in the aforementioned thumbnail space, which is in lieu of the last-displayed thumbnail image if one already existed. There is also a clear thumbnail icon 1920 displayed adjacent the file icon 1918. Upon selection of the clear thumbnail icon 1920, the currently displayed thumbnail image is deleted leaving a blank space.

Once the participant has entered or modified the profile data (or leaves it as is), the "OK" button 1922 is selected in the profile dialog box to save any new entries and close the dialog box 1900. Alternately, the participant can select the "Cancel" button 1924 at any time to close the profile dialog box 1900 without saving any changes.

As with the slideshow portion of the presentation, it is also envisioned that individuals at remote locations could participate in the presentation as well, without having to physically be at one of the sites. In such a case, the individual would have the ability to receive audio and video data over the network (and possibly send to if individual participants are allowed to provide A/V input to the lecture), and would employ the aforementioned student interface to enter the venue where the presentation is being broadcast and to provide participant data, among other things. The student view should include a provision like the profile dialog box where the individual participant can enter information similar to that described previously, including a thumbnail. It is also noted that it is envisioned people in the audience of a remote site would be able to interact with the presenter by both visual signals (e.g., raising a hand to ask a question) or by audio (i.e., verbally asking a question in a lull in the presentation). This could also apply to the individual participant if A/V from the individual's site is allowed. This is possible if audio and video from the individual participant or the site where the audience member is in attendance is provided to the presenter or his/her representative. The audio aspect of this interaction can be accomplished by playing the audio from remote sites or from individual participants over the sound system at the presenter's site, or via some individual audio monitoring device that only the presenter or his/her representative can hear (i.e., an ear piece, headphones, or the like). The video aspect of this interaction is accomplished by displaying video transmitted from the remote site (or by the individual participant if allowed) on the display associated with the presenter's presentation computer and on the presence window as will be described shortly.

3.2.1.1.2 Accessing Venue Information

Referring once again to FIG. 18, the participant can also highlight one of the venue icons in the venue sector 1806 to access information about that venue in the task sector 1808. Highlighting a venue icon is different from selecting it. Highlighting the venue icon makes the aforementioned information accessible, whereas selecting a venue icon causes the participant to join that venue as will be described shortly. In tested versions of the conferencing window, a venue icon is highlighted by a conventional "single-click" maneuver, and the venue icon is selected using a conventional "double-click" procedure. However, any appropriate alternate highlighting and selection procedure can be implemented, as desired.

Figure 20:
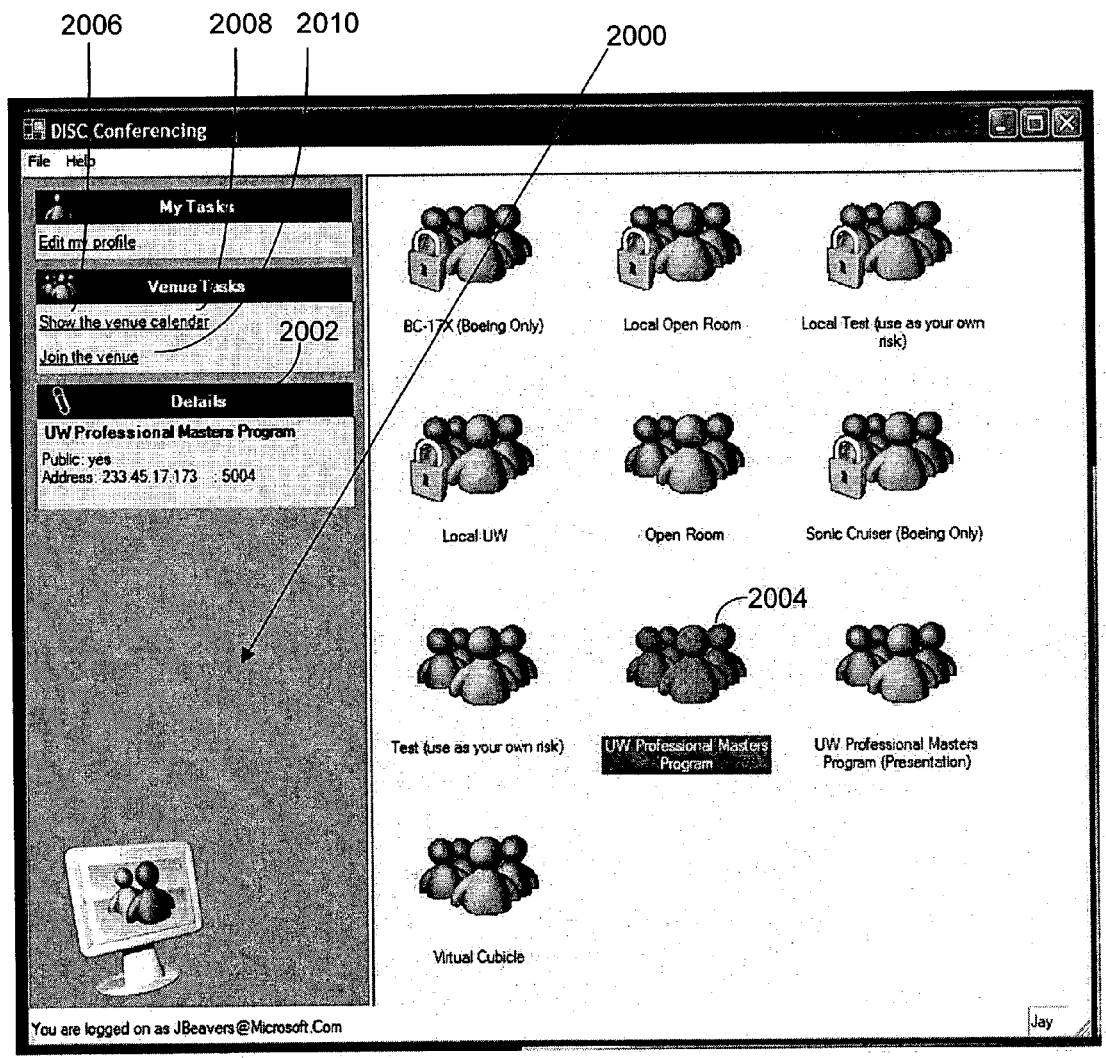
FIG. 20 shows a view of the conferencing window of FIG. 18 where a venue icon has been highlighted in the venue sector of the conferencing window and a "details" box providing information about the venue associated with the highlighted venue icon is displayed in the tasks sector of the conferencing window.

The venue information is made available in the task sector 1808 when a venue icon is highlighted. Specifically, as shown in FIG. 20, a "Details" box 2002 appears in the task sector 2000. This details box 2002 includes information about the highlighted venue 2004 such as the name of the venue, its public or private status and a network address. In addition, a "Venue Tasks" command list 2006 appears in the task sector 2000. When a venue is highlighted, the venue tasks command list 2006 displays two selectable commands. The first of these is a "Show the Venue Calendar" command 2008. Upon selection of this command 2008, a calendar box (not shown) appears in the conferencing window with a list of the presentations that are scheduled for the highlighted venue and when they are to occur. The second command in the venue tasks command list 2006 is the "Join the Venue" command 2010. Upon selection of this command 2010, the participant enters the venue. Thus a participant can enter a venue by selecting the venue's icon in the venue sector, or by highlighting the venue's icon and then selecting the join the venue command 2010 in the venue tasks command list 2006. The specifics of operations once a venue has been entered will be described next.

3.2.1.2 Venue and Task Sector Operations After Entering a Venue

Figure 21:
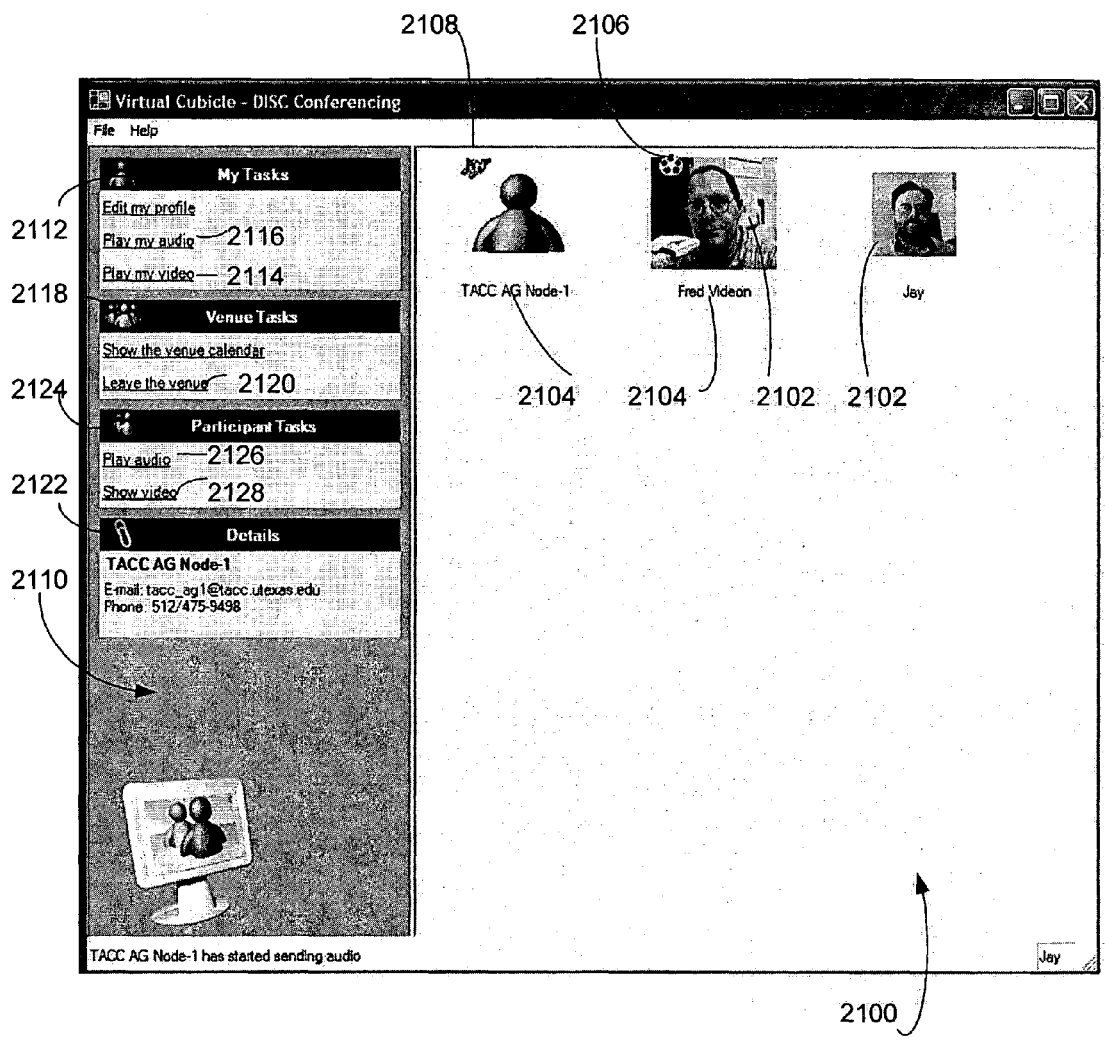
FIG. 21 shows a view of the conferencing window where a venue has been selected and the venue sector of the conferencing window is changed to show thumbnails of lecture participants and sites in a lecture hosted by the selected venue.

Generally, when a participant selects a venue as described above, the venue sector 2100 changes to display a list of the participants who have also entered the venue, as shown in FIG. 21. In tested versions of the conferencing window, the participant list took the form of a collection of thumbnails 2102 with an adjacent text title 2104 identifying the participant. If there are too many participants to fit thumbnails 2102 for them all in the space allocated to the venue sector 2100, vertical and/or horizontal scroll bars (not shown) will appear at the periphery of the sector. The participant thumbnails 2102 shown in the venue sector 2100 are the thumbnail images or graphics entered by the participant in the profile dialog box. Likewise, the text title 2104 is the text entered by the participant in the aforementioned "Name" data entry field of the profile dialog box. Small icons are displayed adjacent to each thumbnail to indicate whether that participant is proving video, audio, or both from their location. Specifically, a video icon 2106 (which in tested embodiment looks like a reel of movie film) is displayed next to a participant thumbnail 2102 if that participant is providing a video feed from their location. In addition, an audio icon (not shown), which in tested embodiment looks like a musical note, is displayed next to a participant thumbnail 2102 if that participant is providing an audio feed from their location. And finally, a combined video and audio icon 2108 (which in tested embodiments looks like a musical note superimposed onto a movie film reel) is displayed next to a participant thumbnail 2102 if that participant is providing both video and audio feeds from their location.

The task sector 2110 also changes when the participant enters a venue. Specifically, the aforementioned "My Tasks" command list 2112 is expanded to include two new commands. The first of these is a "Play My Video" command 2114, and the second is a "Play My Audio" command 2116. If the participant selects the play my video command 2114, a video feed is initiated from the participant's site. In addition, if an individual participant initiates a similar function using the aforementioned student interface and is allowed to provide A/V, a video feed would be initiated from the individual's location. This presumes the necessary video equipment is connected to the individual participant's computer and the computer is loaded with the necessary video processing software for transmitting video via the network. Similarly, if the participant selects the play my audio command 2116, an audio feed is initiated from the participant's site. Additionally, if an individual participant initiates a similar function using the aforementioned student interface and is allowed to provide A/V, an audio feed would be initiated from the individual's location. In this case it is presumed that the necessary audio equipment is connected to the individual participant's computer and that the computer is loaded with the necessary audio processing software for transmitting audio via the network. Depending on whether a video or audio feed, or both, is initiated by a participant, the appropriate icon described above is displayed adjacent the participant's thumbnail in the venue sector to indicate their broadcast status. It is noted that providing the video and audio feeds facilitates the aforementioned interaction between the presenter and the other participants.

The venue tasks command list 2118 also changes when the participant enters a venue. Namely, the "Enter the Venue" command changes to a "Leave the Venue" command 2120. Upon selection of this command, the participant ceases communications with the network in that the participant stops multicasting A/V data and stops subscribing to the multicasts of the other participants. A similar function would be provided by the student interface.

Once the participant enters a venue, and the thumbnails 2102 of each current participant are displayed in the venue sector 2100, the participant can obtain information about another participant by selecting the participant's thumbnail. This action results in a "Details" box 2122 appearing in the task sector 2110. The details box 2122 provides information about the selected participant such as their name, physical location, email address and phone number. This information corresponds to the data that was entered by the participant in the "Name", "Location", "E-mail" and "Phone" data entry fields of the previously-described profile dialog box.

Figure 22:
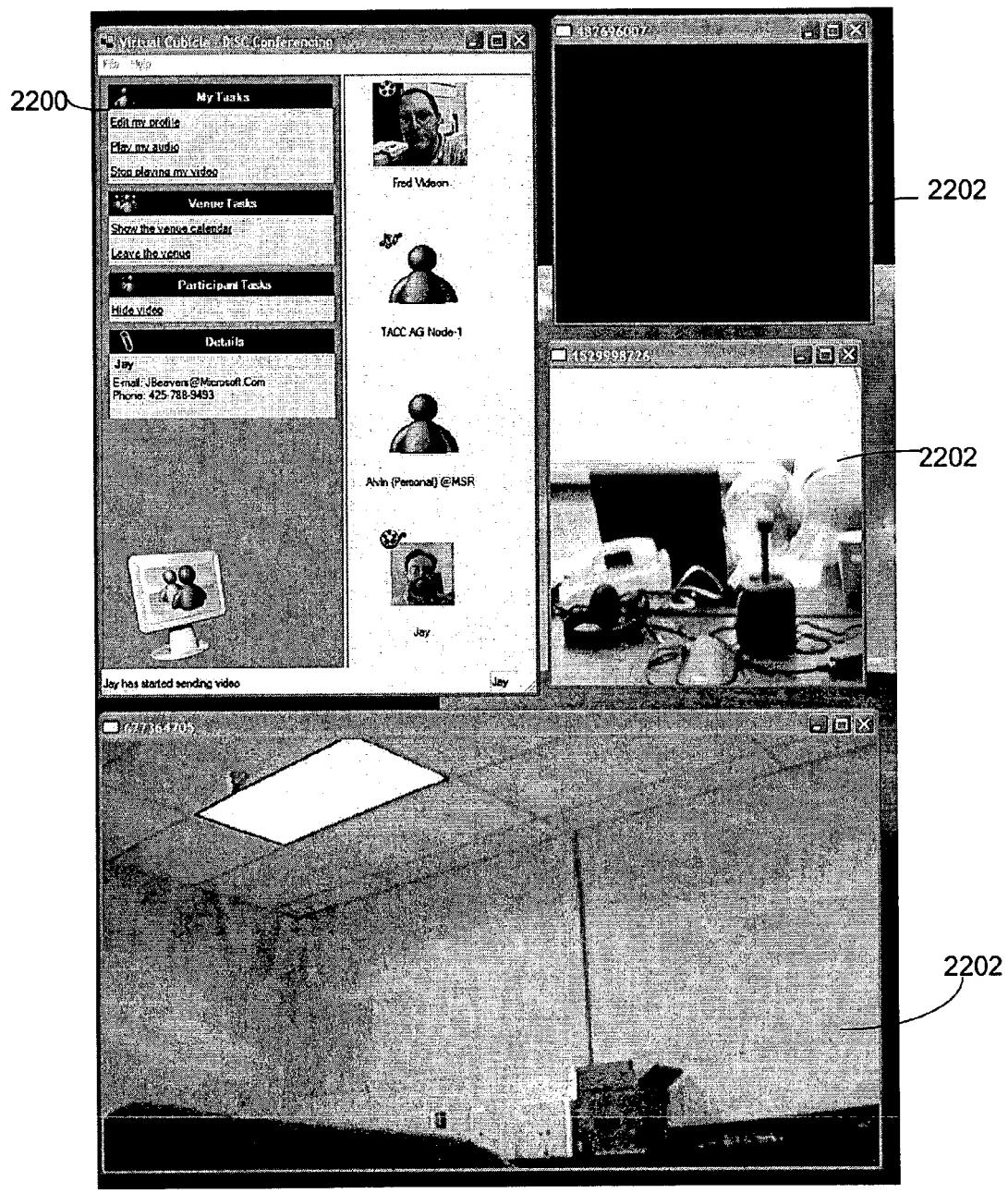
FIG. 22 shows a view of the conferencing window of FIG. 21 where the window has been reduced in size to accommodated windows displaying the video feeds from other sites participating in a lecture.

Finally, a new command list also appears in the task sector 2110 when the site participant enters a venue. Namely, a "Participant Tasks" command list 2124 is added. The participant tasks command list 2124 has two commands, namely a "Play Audio" command 2126 and a "Show Video" command 2128. In general, the aforementioned play audio and show video commands are used to respectively output the audio and/or to display the video on the display screen of the computer, of a selected participant, assuming these feeds are provided. A participant is selected by selecting that participant's thumbnail in the venue sector. Referring now to FIG. 22, in order to display the video from a selected participant, the conferencing window 2200, is resized via conventional methods to make room for one or more windows 2202 displaying the video feed of the selected participants. In the example screen shown in FIG. 22, the conferencing window 2200 has been downsized and confined to a region of the presentation computer's display screen in the upper left hand corner. In addition, the example screen shows three video windows 2202 that have been displayed by respectively selecting the show video command after selecting each of three participants having video feeds available. It should be noted that the video window in the right hand corner of FIG. 22 is black because the lights are turned off in the room associated with the participant providing the video feed for that video window.

3.2.2 The Conferencing Window Process

Figure 23:
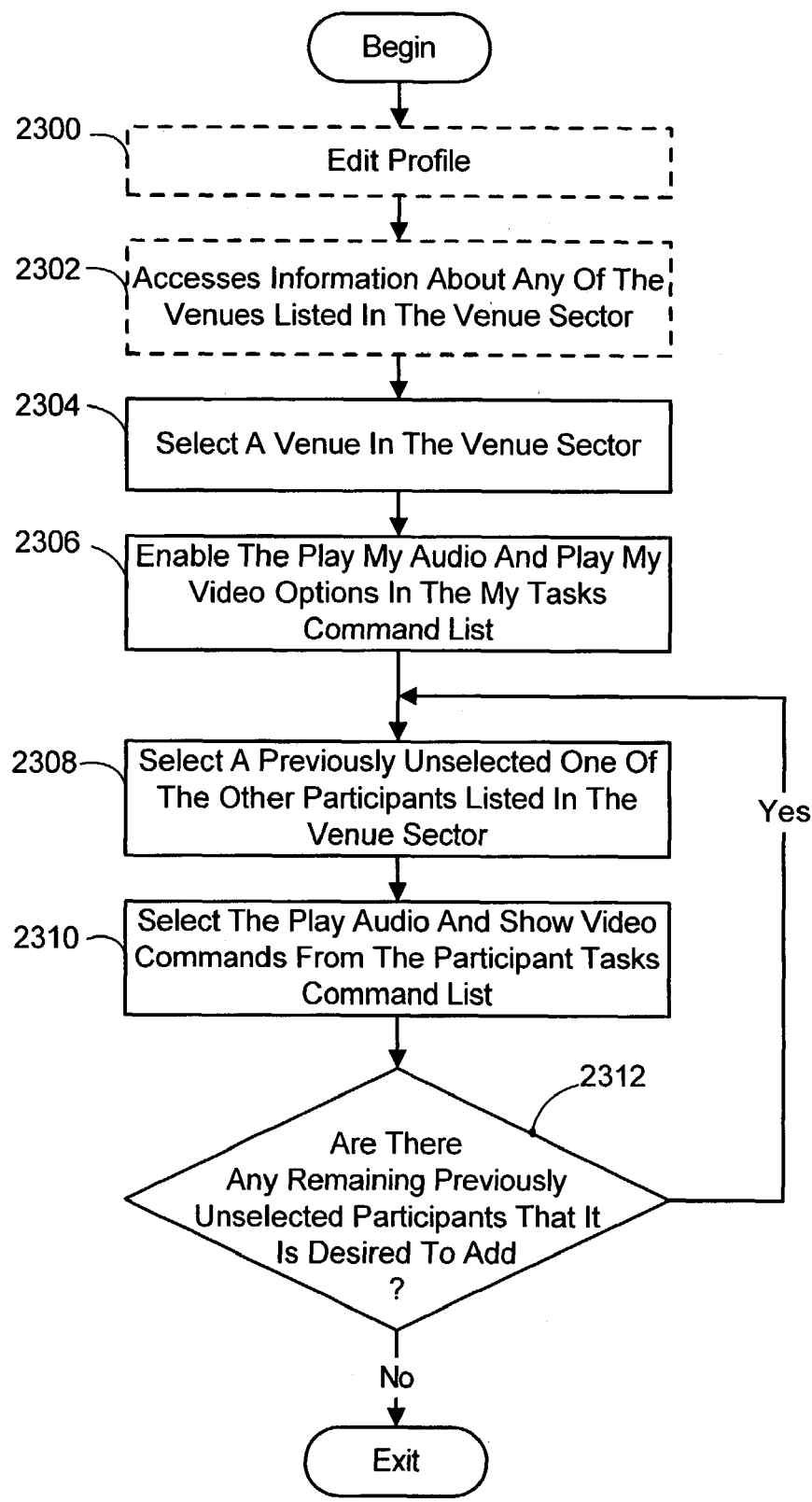
FIG. 23 is a flow chart diagramming an overall process according to the present invention for entering a venue that is hosting a lecture and participating in the lecture.

Given the foregoing conferencing window interface, the following process can be used to disseminate and receive the video and audio portions of a typical video presentation according to the present learning system. Referring to FIG. 23, an individual participant (if allowed) or representative participant of a group site first edits their profile if needed (optional process action 2300), and then accesses information about any of the venues listed in the venue sector, if desired (optional process action 2302). The individual participant (if allowed) and representative participant will be referred to simply as a participant hereinafter in the description of the conferencing window process for convenience.

The participant selects the venue that was agreed to act as the virtual presentation site for the scheduled video presentation in the venue sector of the conferencing window (process action 2304). The participant then enables the play my audio and play my video options in the My Tasks command list (process action 2306). Finally, the participant selects a previously unselected one of the other participants listed in the venue sector (process action 2308) and selects the play audio and show video commands from the Participant Tasks command list (process action 2310). It is then determined if there are any remaining previously unselected participants that it is desired to add (process action 2312). If so, then process actions 2308 through 2312 are repeated. If not, the process ends.

3.2.3 The Presence Window

Figure 24:
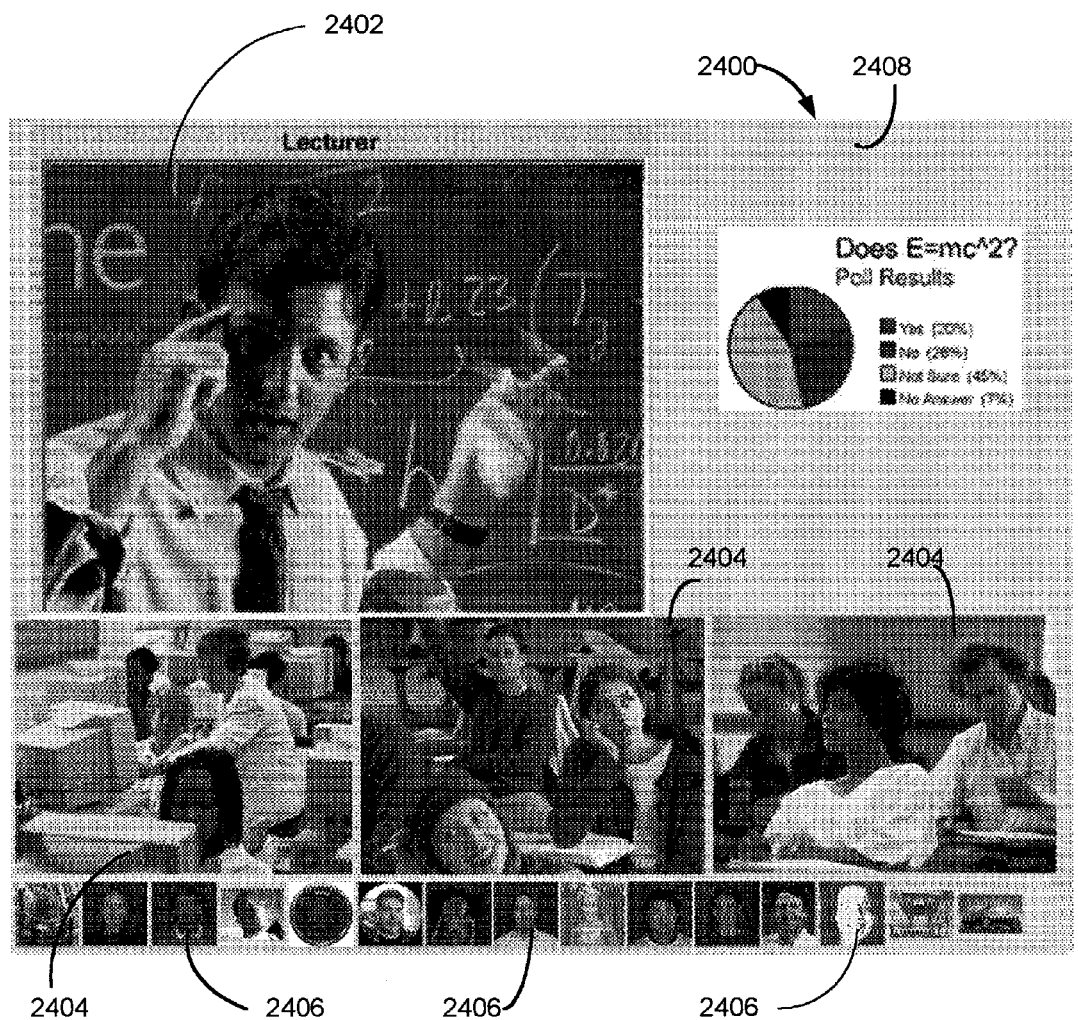
FIG. 24 is an image showing a full-featured version of the presence window of the present learning system.

The aforementioned presence window is the display presented to the audience at a site, including the presenter's own site, on the aforementioned large screen presentation display or the multiple presentation display monitors at that location that are dedicated to the providing the video portion of the presentation. An example of a full-featured version of the presence window 2400 is shown in FIG. 24. This version of the window 2400 includes a presenter sector 2402, which displays a video of the presenter giving the presentation. In addition, there are one or more venue sectors 2404, which display the video provided from each of the participating sites showing the audience, including from the presenter's site. In the example view of FIG. 24, video feeds from three different sites are displayed in separate venue sectors 2404. The aforementioned thumbnail 2406 of each individual participant is also displayed in the presence window 2400. And finally, an information sector 2408 is provided in the presence window 2400 to display any supporting information in the form of text, graphic, animations, and the like that the presenter wishes to include. For instance, in the example view of FIG. 24, a graphic showing the results of a poll is displayed in the information sector 2408.

It is noted while a full-featured version of the presence window has been described, other versions lacking parts of the full-featured version can be employed. For example, a more austere presence window could include just the video of the presenter, or the video of the presenter and the audiences of the sites, and nothing else. Or alternately, just the information sector or the individual participant thumbnails could be eliminated from the presence window.

3.3 The Teacher's Assistant Interface Feature

The teacher's assistant (TA) feature is incorporated to handle a part of the previously-described collaboration between students, teachers and teaching assistants involving the management and answering of student questions. The necessary infrastructure is realized in general by integrating a conventional instant messaging program. The instant messaging client program is resident on the computer used by each student, professor, and teaching assistant to interact during a lecture and afterwards. All these computers are connected, wirelessly or not, to the Internet or intranet on which the present system is operating as discussed previously. The instant messaging server program can be resident on the lecturer's computer or it could be located elsewhere, such a server associated with the institution hosting the lecture.

3.3.1 The TA Question Management Process

When each participant in the instant messaging (IM) group is online and the client programs are running, students in the IM group can send messages in the form of questions to the teaching assistants that are also participating in the IM group. Such questions can be sent to a TA during the lecture itself, or afterwards.

Figure 25:
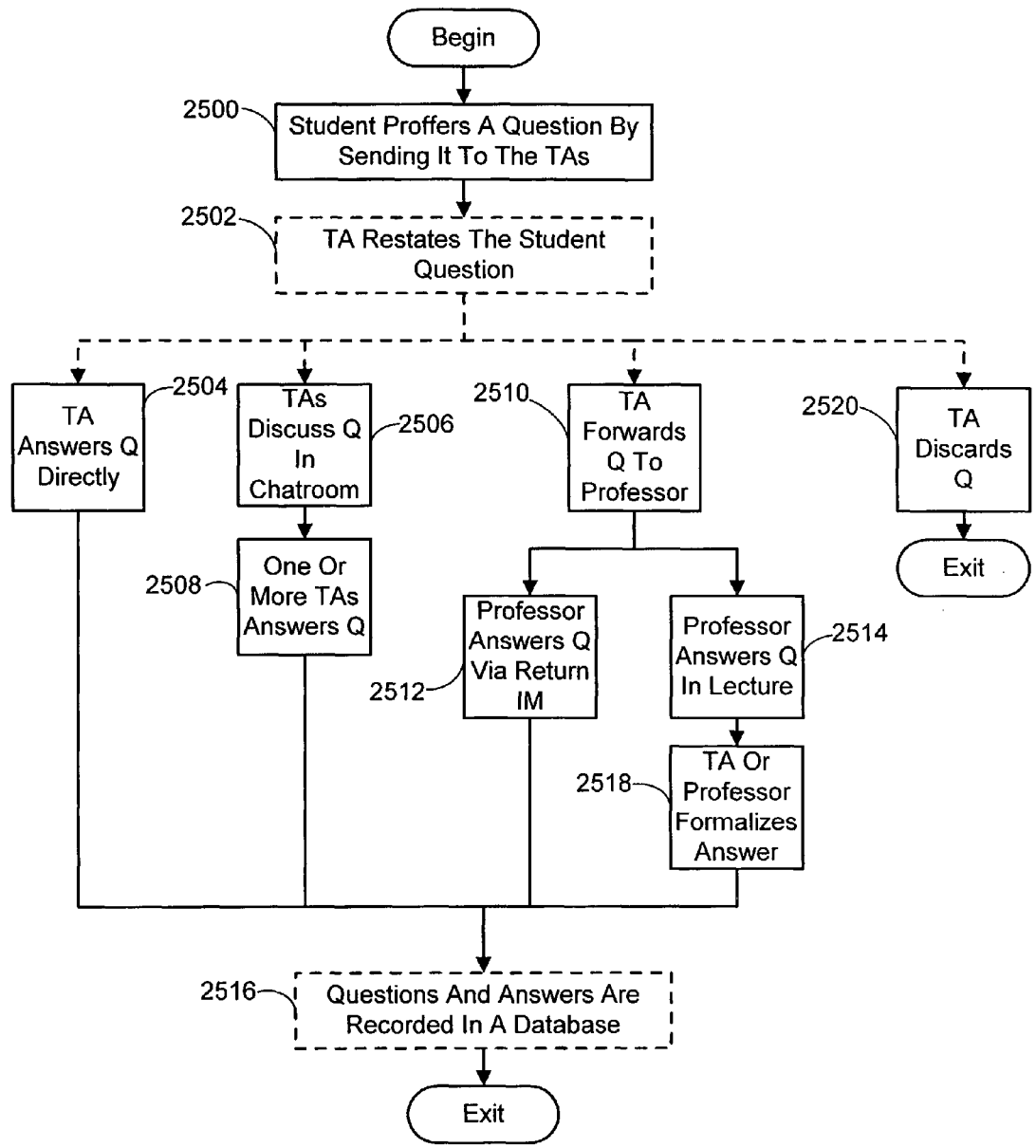
FIG. 25 is a flow chart diagramming an overall process according to the present invention which implements the question management feature by which students proffer questions via instant messaging and the presenter or teaching assistants handle the incoming questions and provide answers as warranted.

More particularly, referring to FIG. 25, a student first proffers a question by sending it to the TAs (process action 2500). Upon receipt of a student question, a TA can restate the question before taking further action (process action 2502). This might be done to clarify the question or to combine related questions into one. Regardless of whether the question is altered or not, the TA has several options. First the TA could answer the students question directly by a reply IM message (process action 2504). The TA could also discuss the question with other online TAs via a chatroom set up for the discussion within the IM group (process action 2506), and then one or more of them could answer the student via return IM messages (process action 2508). Another alternative would be for the TA receiving the student question to forward it to the professor, either in its original or a modified form (process action 2510). A question might be forwarded to the professor if it has been asked a number of times by different students, or if in the TA's estimation it is a question that is good enough that it should be answered for the whole class. The question is forwarded to the professor via an IM message. During the lecture it is assumed that the professor is online with the IM messaging group for the purpose of fielding questions forwarded by the TAs. Thus, the TAs should have the aforementioned option of sending a student question to the professor. However, if the student question is received after the lecture (or at least after the teacher logs out of the IM group after the lecture), the TAs would only be able to forward a question to the professor if the professor is online with the IM group outside the lecture hall. The professor can answer a forwarded question via a return IM message (process action 2512), although this method would probably be reserved for after the lecture to prevent disruptions, or if the question comes in during a lecture, the teacher could elect to answer it as part of the lecture itself (process action 2514). As will be discussed shortly, the questions and answers are optionally captured in a database so that they can be referred to at a later time (process action 2516). Thus, if a professor answers a TA-forwarded question in the lecture, a TA or the professor could formalize the answer afterwards and enter it to the database (process action 2518).

The TA receiving a student question also has the option of discarding the question (process action 2520). This might be done if the question is redundant, or if it is inappropriate or incomprehensible in some way.

It is noted that in the case where a professor is online with the IM group after a lecture, he or she would have the option of acting as a TA and field student questions directly, rather than after being forwarded first by a TA. In such a case, the professor would be listed in the student's IM group list.

3.3.2 The TA Feature Interface Windows

Figure 26:
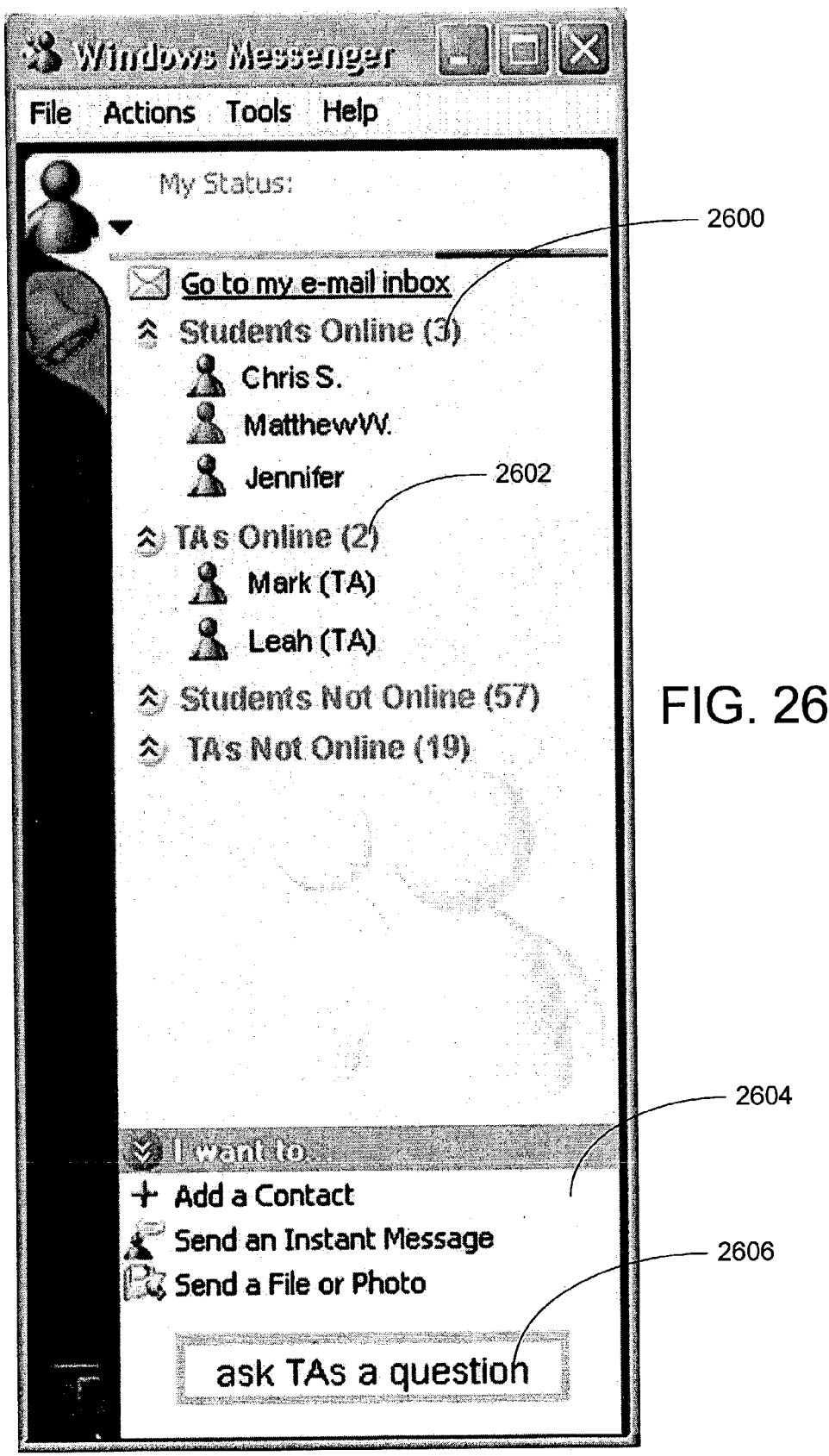
FIG. 26 is an image showing an instant messaging user interface window that has been modified to allow students to ask questions in accordance with the question management feature of FIG. 25.
Figure 27:
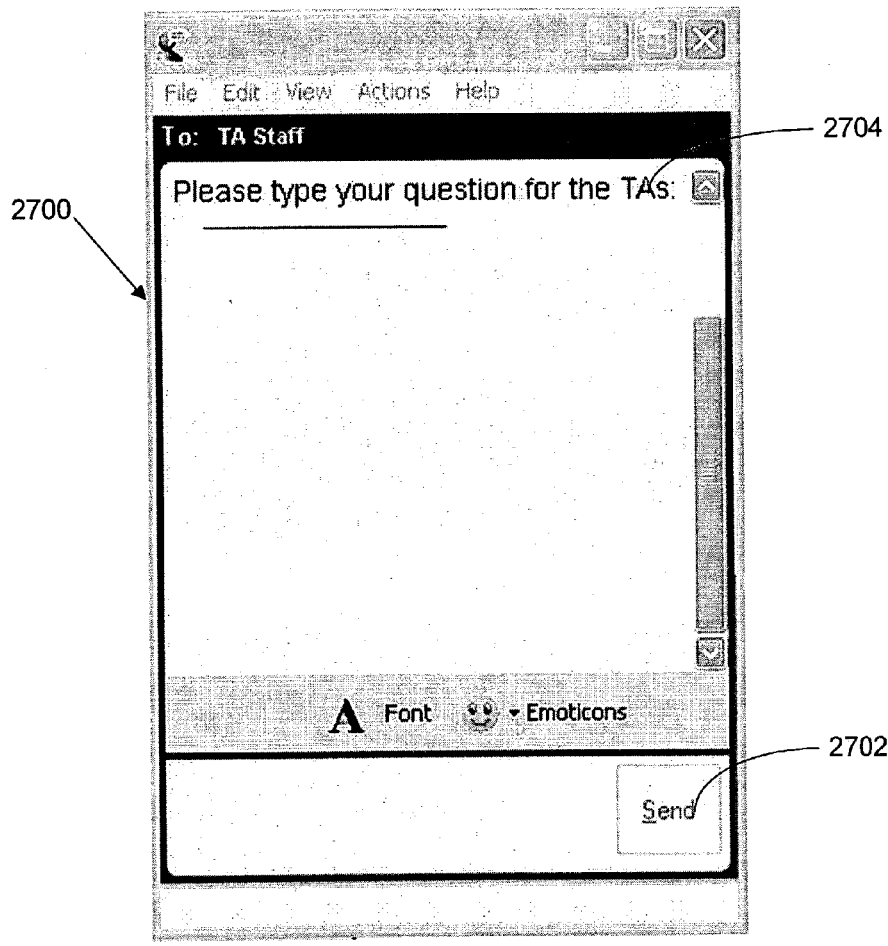
FIG. 27 is an image showing a question box that is displayed when a student selects the question request button in the interface window of FIG. 26, and which the student uses to enter and send a question.

The foregoing TA question management process is implemented via a series of graphic user interface windows. The first of these is a standard instant messaging user interface window that has been modified to allow students to ask questions and which is integrated into the student interface. For example, referring to FIG. 26, one such window is shown. It is noted that the window has been modified to list the names of other students in the IM group that are online 2600 (so that students can communicate with each other during or after a lecture), as well as the TA or TAs that are participating 2602 (and possibly the professor as well). Further, the window has been modified to include a command line that when selected by a student opens up a question box 2700 such as the one depicted in FIG. 27, which is essentially a modified IM entry box. In tested versions of the present system, the command line 2606 was located in the command sector 2604 and entitled "ask TAs a question". The student types in his or her question about the lecture materials into the question box 2700 and selects the "Send" button 2702. This transmits the student's question to the TA or TAs (and possibly the professor as well) participating in the IM group. An instructional statement can be included in the question box to aid the student in asking a question. In tested versions of the present TA interface, the instructional statement 2704 read "Please type your question for the TAs.".

Figure 28:
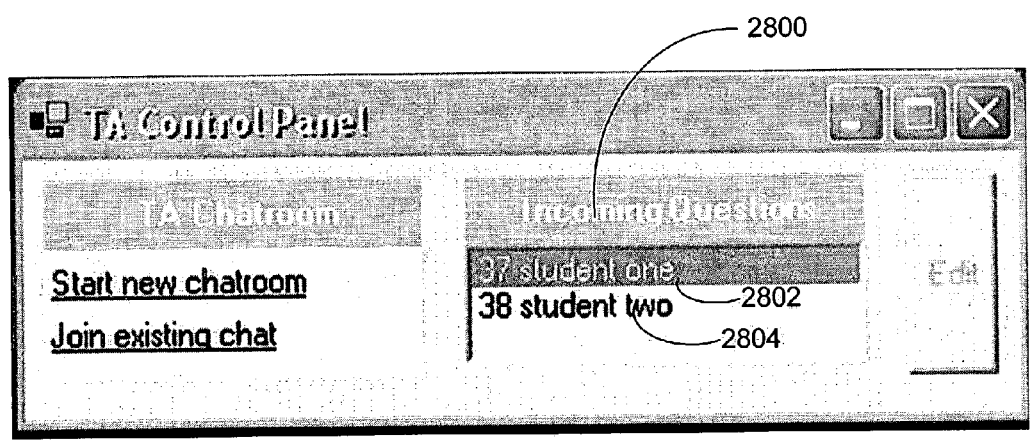
FIG. 28 is an image showing a teaching assistant control panel interface window in accordance with the question management feature of FIG. 25.

When a TA logs into the IM group a "TA Control Panel" window is displayed on the TA's computer display. The TA uses this window to manage and respond to questions, monitor a "Question Forum" window (which will be described later), and start or join a TA chatroom (which will also be described later). An example of the TA control window used in tested versions of the TA interface program is shown in FIG. 28. When a question IM is received by the TAs from a student, it is assigned a number and is displayed along with a pre-established student identifier in an "Incoming Questions" sector 2800 of the TA control panel window. Initially, the question numbers are assigned in sequence based on the order in which they are received. For example, in the example window shown in FIG. 28, two questions 2802, 2804 are displayed in the incoming questions sector 2800 which are assigned numbers "37" and "38", respectively, and which come from "student one" and "student two" respectively.

Figure 29:
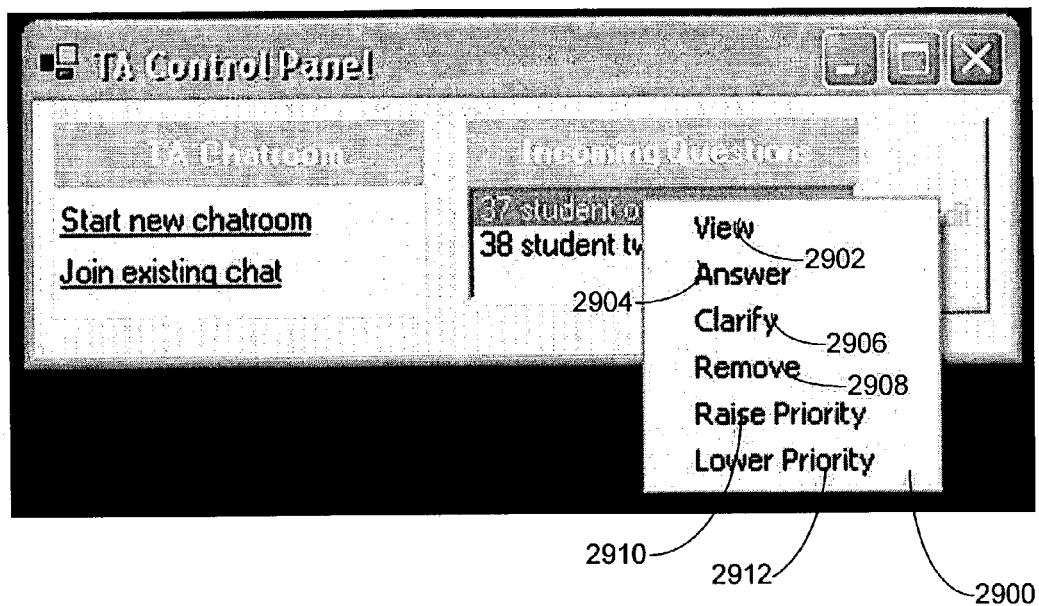
FIG. 29 is an image showing a view of the assistant control panel interface window of FIG. 28 where the question management command list is displayed.
Figure 30:
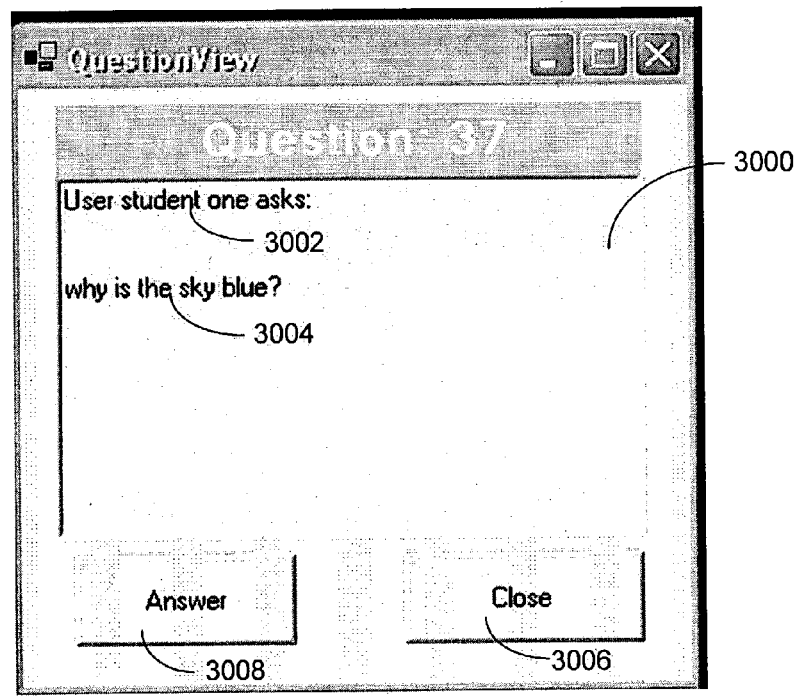
FIG. 30 is an image showing the question view window that is displayed when the view command in the question management command list of FIG. 29 is selected.

In tested embodiments of the TA Control Panel window, a TA handles a student question by first selecting its associated entry in the incoming questions sector which highlights that entry. Question 37 from student one 2802 was selected in the example window shown in FIG. 28. The TA then right-clicks on the selected question and a command list 2900 appears, as shown in FIG. 29. The command list includes a "View" command 2902 which when selected by the TA opens a "Question View" window on the TA's display, as shown in FIG. 30. The question view window has a display sector 3000 that identifies the student asking the question, for example by their identifier 3002, and displays the student's question 3004. The TA can elect to close the question view window without responding by selecting the "Close" button 3006, or can select an "Answer" button 3008 that allows the TA to respond to the question. Specifically, selecting the answer button causes a question box of FIG. 31 to appear on the TA's display. In this case the question box is modified to include a header field 3100 containing the assigned question number. The question 3104 entered by the student appears in the display sector 3102 of the box along with a title line 3106 just below the question reading "Answer:". The TA enters his or her answer to the question in the space 3108 below the answer title line, and selects the send button 3110 to transmit the answer to the student responsible for the question. The student receives an IM that when opened causes the question box to be displayed, which as shown in FIG. 32 now includes the TA's answer 3200. It is noted that a standard slider bar 3202 is included at the side of the question box display sector 3204 for scrolling should the question and/or answer not fit completely within the space allotted to the display sector.

Figure 31:
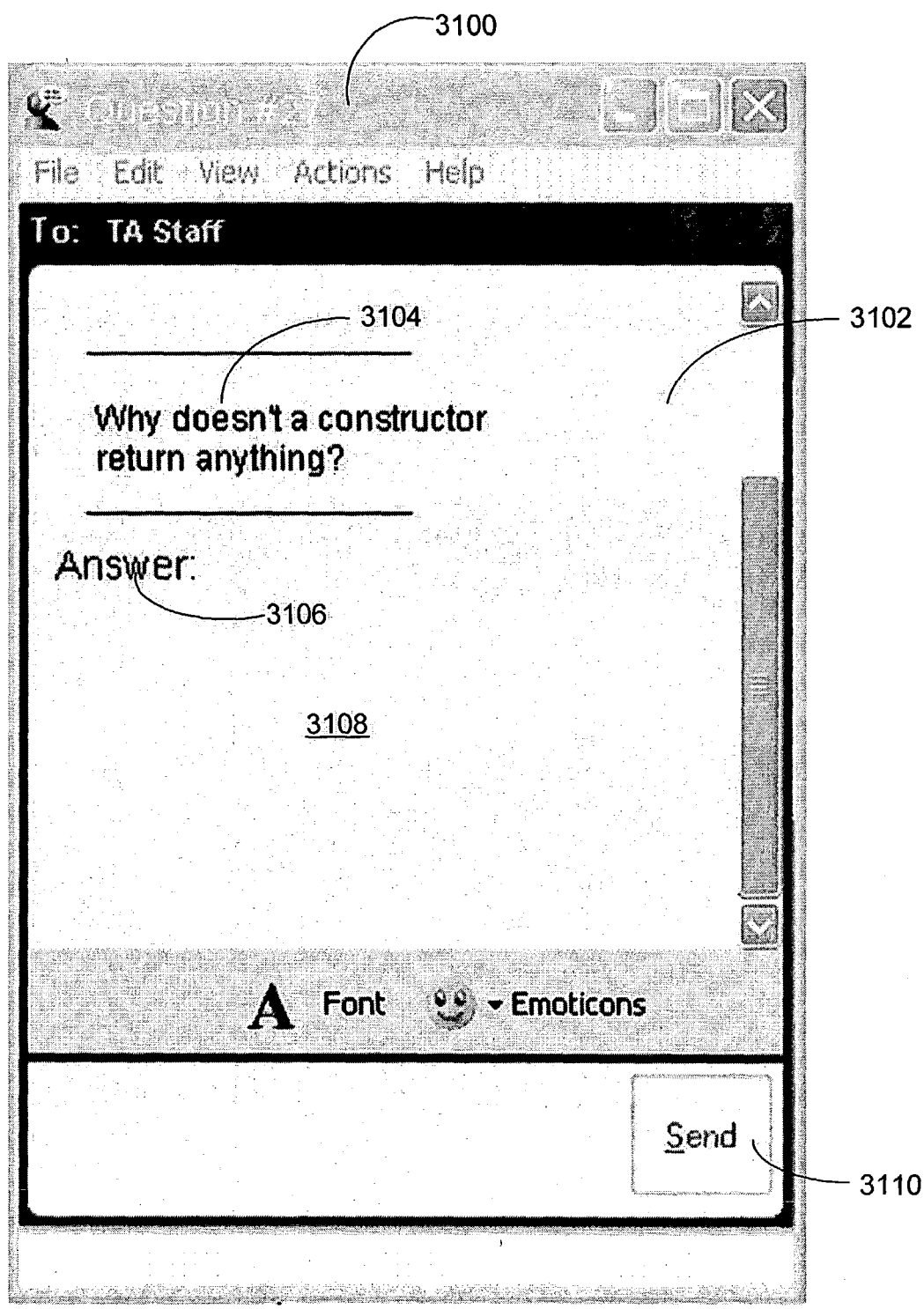
FIG. 31 is an image showing the question box that is displayed when the answer button in the question view window of FIG. 30 is selected.
Figure 32:
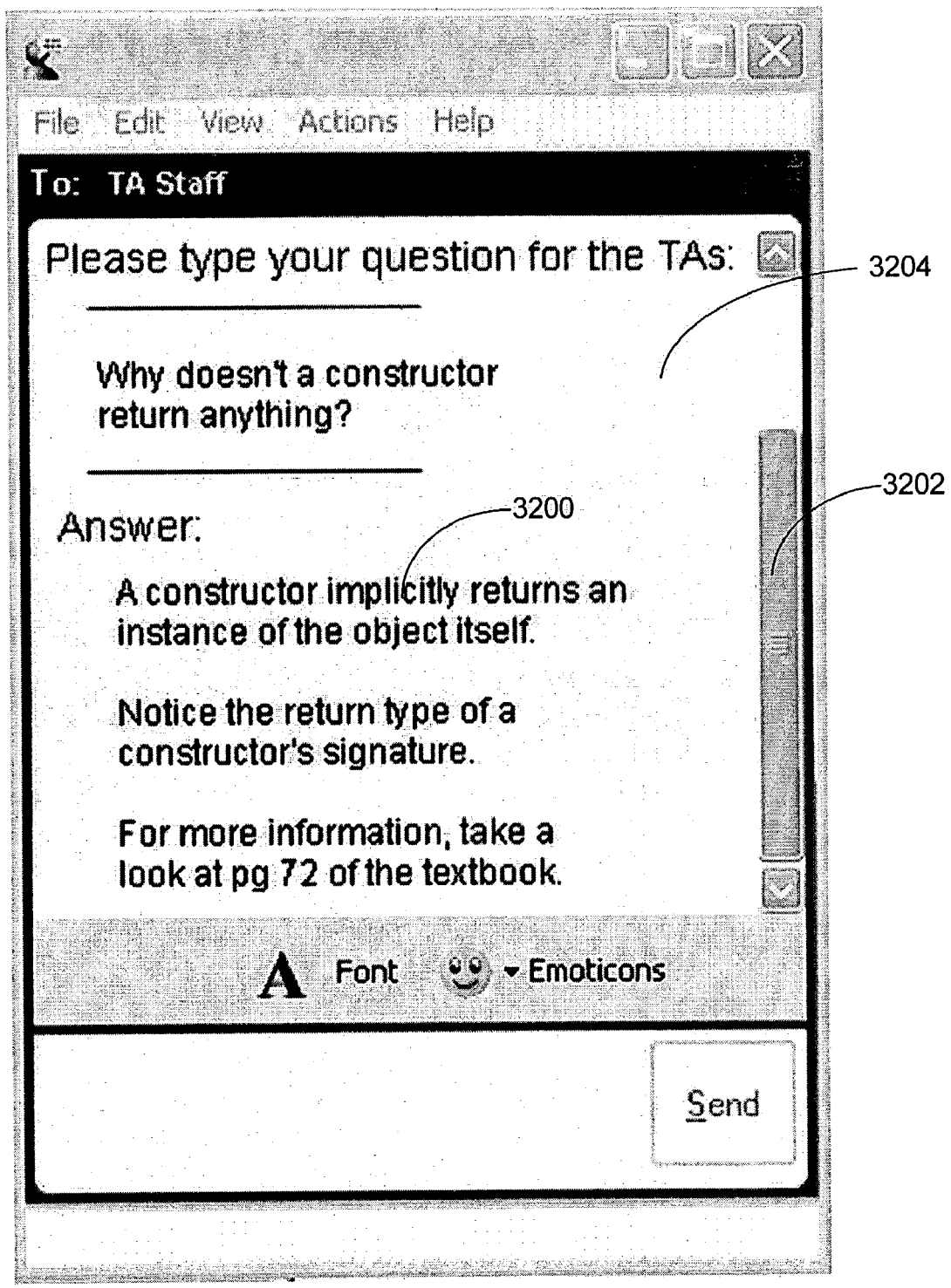
FIG. 32 is an image showing a question box with the answer to a student's question entered therein that is displayed when a student opens an instant message sent in response to his or her question.

Referring again to the command list 2900 shown in FIG. 29, an "Answer" command 2904 is also included which when selected by the TA causes the question box associated with the selected and highlighted question to appear, as shown in FIG. 31. The TA can then answer the student's question as described above. It is also noted that answers provided previously by a TA or the professor to a particular question would be displayed in the a Question box when the TA selects the answer command. The TA (or professor) can then enter an additional or supplemental answer, or by selecting an answer in the Question box can modify or delete it via standard edit commands.

The command list 2900 of FIG. 29 also has a "Clarify" command 2906. When this command 2906 is selected, the TA can communicate directly with the student for the purpose of clarifying what the student is asking. More particularly, when the TA selects the clarify command 2906, an IM is sent to the student who sent the question which indicates the name of the TA and identifies the question, and states that the TA would like to clarify the question. An IM window also pops up on the TAs display, which the TA uses to provide details as to what needs clarification. This IM is then sent to the student, who responds by IM, and so on until the question is made clear to the TA. The next command on the command list 2900 is the "Remove" command 2908. Selecting this command 2908 causes the selected question to be deleted from the incoming questions list, and from a Question Forum window, which will be discussed shortly. The remove command 2908 is used to delete inappropriate, redundant, or unclear questions. Finally, there are a pair of prioritizing commands included in the list—namely a "Raise Priority" command 2910 and a "Lower Priority" command 2912. Each time a TA selects one of these commands, the selected question moves up (raised priority) or down (lowered priority) in the incoming question list by one line. In this way, questions that the TA feels are important and which should be answered more quickly can be moved up in the question list where they will presumably be handled sooner by that TA or another participating TA than ones lower on the list. Conversely, if the TA feels a question is of less importance and can wait to be answered, it can be moved down in the incoming question list.

Figure 33:
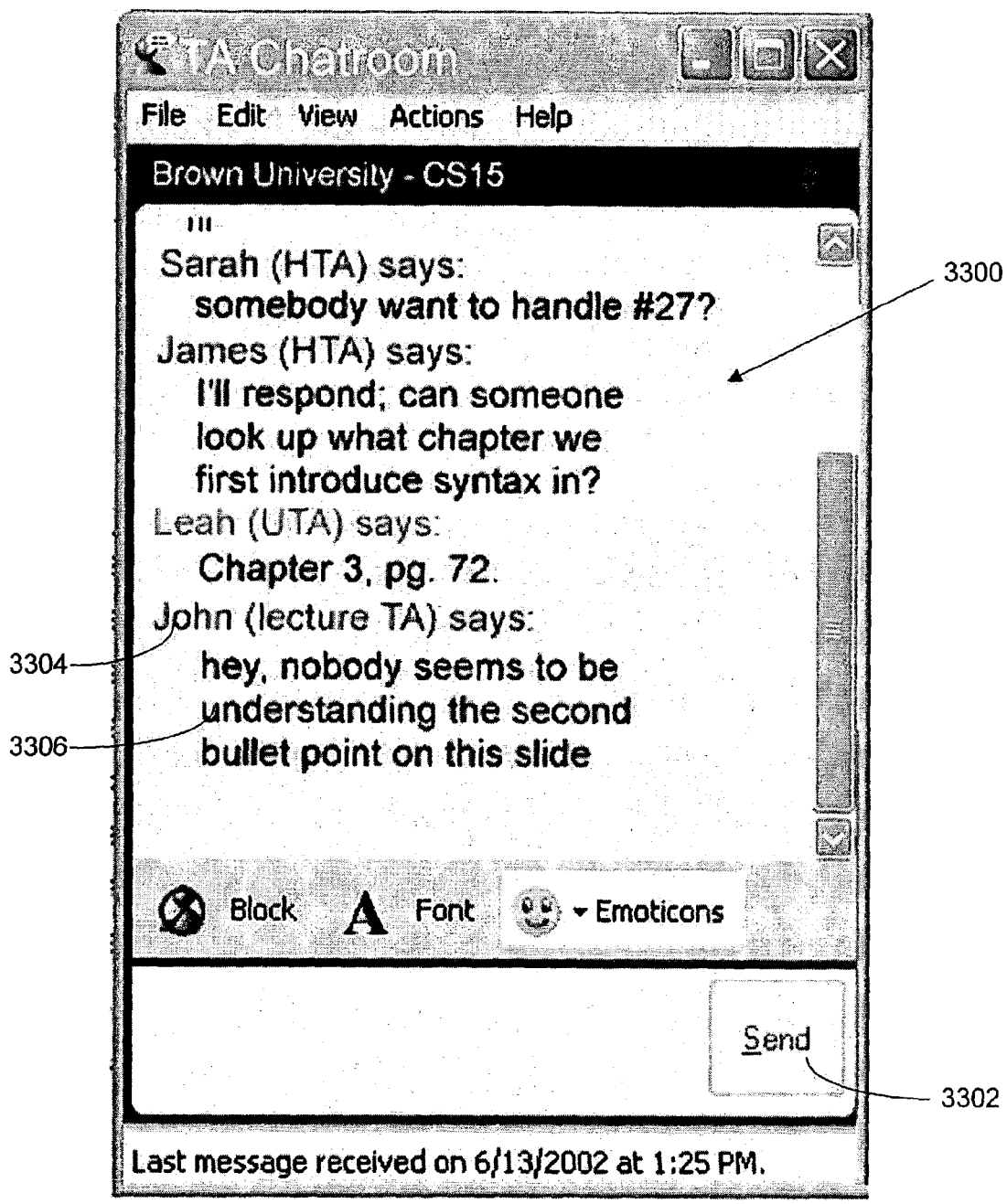
FIG. 33 is an image showing a teaching assistant chatroom box employed in the question management feature of the present learning system.

The TA interface also facilitates discussions of questions between the participating TAs. This is essentially accomplished using the chatroom feature typically found in IM programs. A TA can start a new chatroom or join an existing one, by selecting one of the respective commands listed in the "TA Chatroom" sector of the TA control panel window. Upon selecting one of the commands, a standard IM style chatroom box appears on the TA's computer display. For example, FIG. 33 depicts such a chatroom box employed in tested versions of the TA interface program, which is entitled the "TA Chatroom". Note that this example box already contains messages 3300 from various TA participating in the discussion. Essentially, to participate in the chatroom discussion a TA enters his or her comment into the box, and selects the "Send" button 3302. The TA's message appears in the chatroom box of every participating TA as a header line 3304 identifying the TA, followed by the comment 3306 entered by that TA in the order in which the messages are received.

Figure 34:
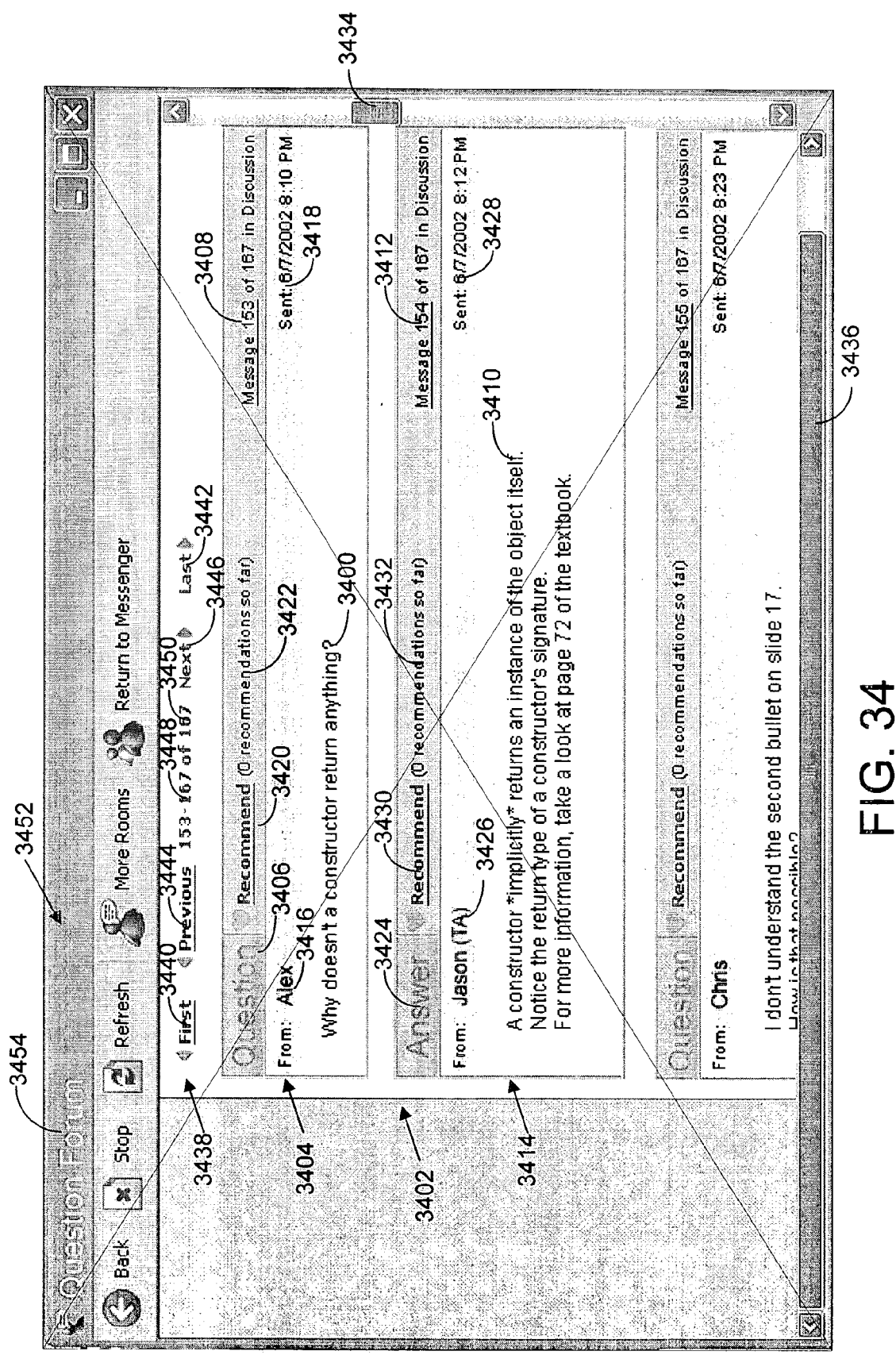
FIG. 34 is an image showing the question forum window employed in the question management feature of the present learning system.

When a question IM is sent by a student or an answer IM is sent by a TA, it is also automatically added to a "Question Forum" database and displayed in a graphic user interface window referred to as the "Question Forum" window. An example of a Question Forum window is shown in FIG. 34. An archiving program is used to maintain the Question Forum database and generate the Question Forum window. This program can run on a computer associated with a persistence feature of the overall learning system and process, as will be described later. The question forum window can be opened and displayed by a TA or professor, and in some circumstances a student, either while the lecture is ongoing or afterwards, by accessing the archiving program, as will be described later. Essentially, what is accessed is the aforementioned Question Forum window which is displayed via the accessee's browser on their computer display.

In the example Question Forum window of FIG. 34, each question 3400 is displayed in a "Question and Answer" sector 3402 in a "Question Space" 3404, which is identified by a title 3406 reading "Question" displayed in the upper left hand corner of the space. The questions are numbered by the Question Forum database program, and the question number is displayed in the question space 3404. In the example version of the Question Forum window, the question number 3408 appears in the upper right hand corner of the question space 3404 in the form of "Message XXX . . . of XXX . . . in Discussion". This refers to the question 3400 being the XXX . . . message placed in the question forum window. Note that under this scheme each answer 3410 is also assigned a number 3412, which appears in an "Answer Space" 3414 as shown in FIG. 34. The question and answer messages are assigned numbers in sequence based on the order in which they were placed into the question forum database. Thus, the question and answers may not have consecutive numbers. It is also noted that the number assigned to a question in the Question Forum window need not match the number assigned to the question in connection with the TA Control procedure described above.

Each question space 3404 includes an indication 3416 of who proffered the question, the question itself 3400 and the time and date 3418 it was sent. There is also a selectable "Recommend" command 3420 listed in the header of the question space 3404 followed by an indication 3422 of how many recommendations have been received for the question. It is noted that only one recommendation is accepted from each student. Essentially, a student viewing the message forum would select the recommend command 3420 if he or she is interested in getting an answer to it, and a message indicating a recommendation has been made is sent to the archiving program. Note that this assumes an answer has not already be generated and entered into the Question Forum window.

The answers 3410 are displayed in the answer space 3414 identified by an "Answer" title 3424, which in tested versions is displayed in the upper left hand corner of the space. The answer space 3414 has a similar form to the question space 3404. Namely, the identity 3426 of the TA answering the associated question is included, along with the answer itself 3410 and the date and time 3428 the answer was sent. The answer space 3414 also has a recommend command 3430 that can be selected by a student viewing the Question Forum window. As with the recommendation function associated with the question space 3404, one recommendation per student is accepted, and an indicator 3432 of how many recommendations have been received is displayed adjacent the command. In this case a student would select the recommend command if he or she thought the answer was a good one.

The "Question and Answer" sector 3402 includes a standard vertical slider bar 3434 at one side for scrolling the through the various questions and answer spaces 3404, 3414 entered into the Question Forum database. In addition, the sector 3402 can include a standard horizontal slider bar 3436 (such as shown at the bottom of the sector in FIG. 34). This horizontal slider bar 3436 is used to bring into view portions of the question and answer spaces 3404, 3414 that may not be visible due to size limitation imposed on the question and answer sector 3402. The sector 3402 further includes a navigation line 3438, which is displayed at the top in the example window shown in FIG. 34. This is a standard navigation line which allows a user to jump to the beginning of the list of questions/answers entered in the Question Forum database and associated with a particular lecture by selecting the "First" command 3440, and to jump to the end of the list of questions/answers by selecting the "Last" command 3442. The line 3438 also includes "Previous" and "Next" commands 3444, 3446 used to display the immediately preceding questions/answers or the next questions/answers, in respect to the currently displayed questions/answers. Finally, the navigation line 3438 includes the range of the numbers 3448 assigned to the currently displayed questions/answers, as well as the total number 3450 of questions/answer entered in to the Question Forum database and associated with the lecture under consideration. There is also a course and lecture title included in a title sector 3452 of the window, which is not shown in FIG. 34. It is envisioned that the title would appear to the right of the Question Forum title 3454 in the title sector 3452.

It was mentioned previously, that students can interact with the Question Forum window only under some circumstances. Essentially, whether students have access or not, and to what degree, is dictated by the TAs. This is accomplished by instituting a permission feature in the archiving program that allows a TA to specify if a particular question or answer is to be displayed in the Question Forum window accessed by a student. In addition, the permission feature allows a TA to completely block student access to the Question Forum. This could be done during lectures so as to minimize any distraction the Question Forum might cause if displayed on the student's computer during the lecture.

When the students have access to the Question forum, the aforementioned interaction is limited to the student reading the questions and answers in the forum window, and recommending them as desired via the procedure described previously. A TA or the professor has greater access to the Question forum database in that they can select a question, and then answer it, modify it, or delete it from the database. These actions are accomplished using the Question forum window. When such an action is performed, the change is automatically recorded in the Question Forum database. In addition, when a student's question is answered in the Question forum, the answer is sent to the student if he or she is online.

It is noted that if a student wants to submit a question when the TAs are not online with the IM group, or if a TA or the professor wants to provide an answer to a student when he or she is not online with the IM group, a standard email message can be employed. The TAs or professor can enter the question or answer into the Question Forum database as desired based on the emails. Alternately, a queue can be set up for the purpose of holding questions and answers until the addressee comes on-line, such as the question queue which will be discussed in the next section.

3.3.3 The TA Question Management Communication Architecture

Figure 35:
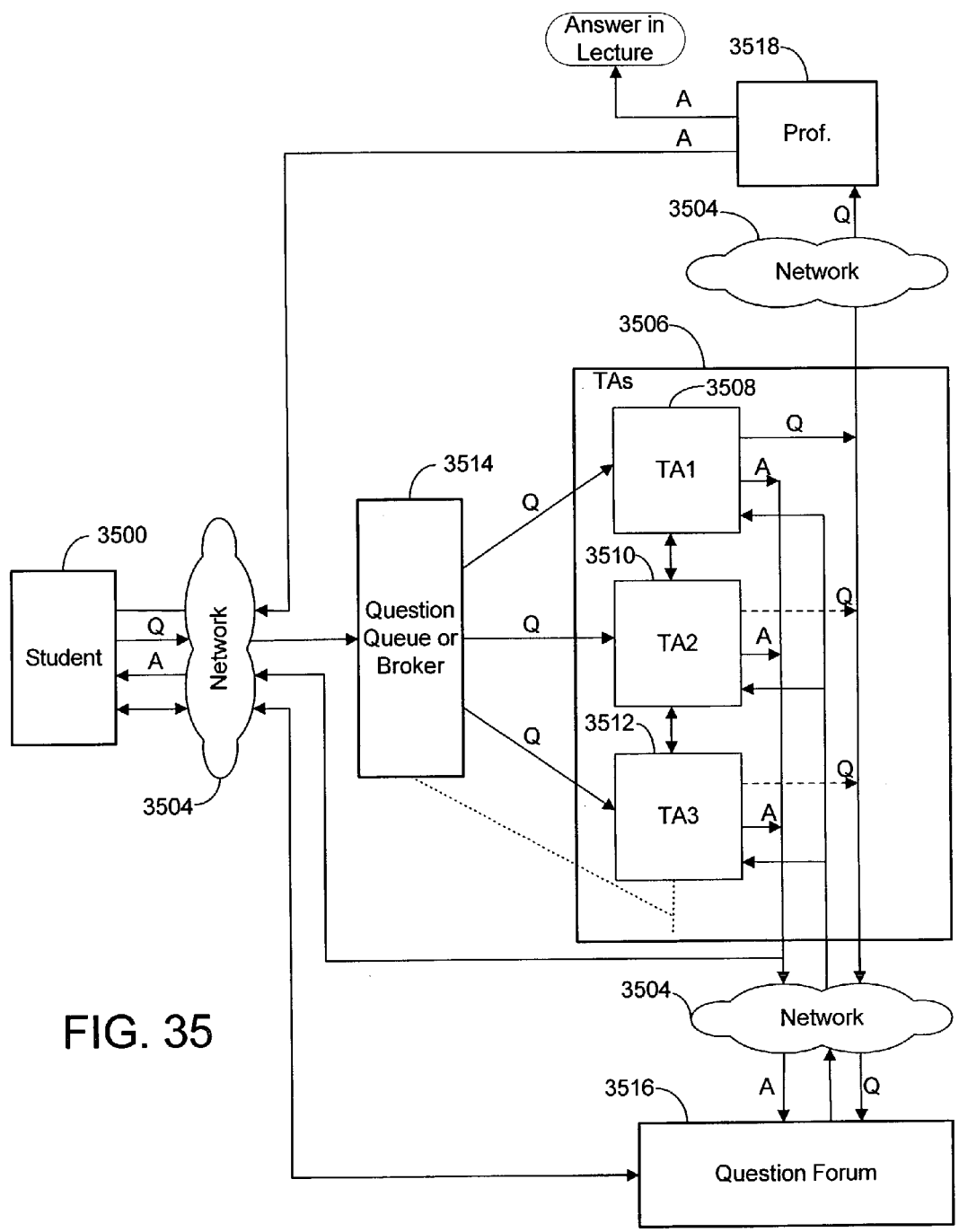
FIG. 35 is a block diagram illustrating the communication architecture employed for the question management feature of the present learning system.

FIG. 35 illustrates the communication architecture employed for the TA question management process described above. As can be seen a student represented by the student module 3500 submits a question (Q) via the network 3504 to the TAs as represented by the TAs module 3506. The question can be sent by the student directly to one of the TAs 3508, 3510, 3512 who is online with the IM group at the time by the student selecting that TA using the previously described IM interface. However, optionally, the IM user interface could be modified such that when a student wants to submit a question, he or she selects one of the TAs 3508, 3510, 3512 listed as being online with the group or a generic TA indicator displayed in the IM interface. Then, rather than the question being sent directly to a TA 3508, 3510, 3512, it is sent to an intermediary site 3514 (which could reside on the professor's computer, one of the on-line TAs computers, or a separate server) that acts as a gateway for the question. This gateway could take the form of a question queue which holds the questions until a TA contacts the site via the network and downloads the question. In addition, as indicated above, the question queue could be configured to hold answers sent by a TA to a student until the student comes on-line. Alternately, the gateway could take the form of a proactive question broker that uses some prescribed logic to decide on a particular TA or TAs that the question is to be sent to, and then forwards the question to the selected TA or TAs. Each TA 3508, 3510, 3512 (three of which are shown in FIG. 35 as an example) can communicate with each other as indicated earlier via a chatroom arrangement. Each TA 3508, 3510, 3512 can also output an answer (A) to a student's question, which is then provided via the network 3504 back to the student as described above. In addition, the answer can optionally be provided to the previously described question forum 3516. Similarly, the TAs can forward the student question, either as is or in a modified form to the professor (as represented by the professor module 3518) and to the optional question forum 3516 as well. This is done as described above via the network 3504. It is noted that this question forwarding procedure can be implemented in a variety of ways. For example, any or all of the TAs could be allowed to forward questions to the professor. In another version, a single TA (e.g., a head TA) would be authorized to forward question to the professor. This latter implementation is represented in FIG. 35 by showing the question forwarding path in dashed lines from the subordinated TAs 3508.

If a question is forwarded to the professor, he or she can provide the answer as part of the lecture, or can respond directly to the inquiring student via the network 3504 as described previously (assuming the student is online with the IM group).

It is also noted that in cases where the questions and answers are sent to the aforementioned question forum 3516, they are time stamped to facilitate later playback as will be described in connection with the archiving feature of the present invention. In regard to questions, the time stamps can be used to synchronize them with the lecture (which is also recorded) so that the context of when the question was asked can be recovered.

Further, while not shown explicitly in FIG. 35, it is noted that the professor can act in the role of a TA using the TA interface program to field questions and provide answers, if desired. Thus, the professor would take on the the position of a TA block 3508 in FIG. 35.

Figure 36:
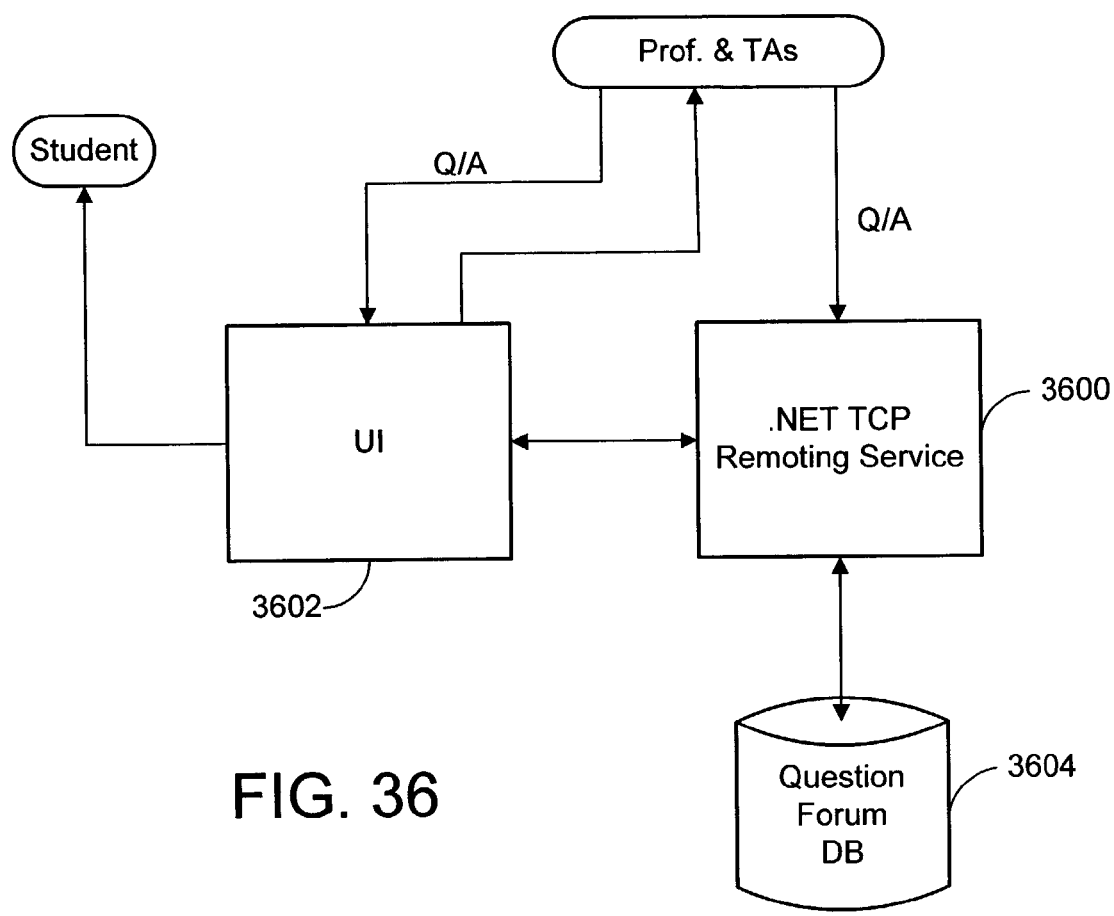
FIG. 36 is a block diagram illustrating an alternate version of the communication architecture of FIG. 35 employing a .NET TCP remoting service approach.

FIG. 36 shows an alternate version of the communication architecture associated with the question forum aspects of the present learning system and process. Specifically, a .NET TCP remoting service approach is employed. As indicated previously in the description of the venue server, the .NET TCP remoting service would have the advantage of including all the attendant security and commerce features typical of such services. In this approach, the student and TA contact the service 3600 via the network, which provides a user interface 3602 for the students and TAs to view the data contained in the Question Forum database 3604. For example, the interface 3602 could take the form of the Question forum window described above. Student questions, either in their original or modified form, and answers to the questions, would be written to the Question Forum database 3604 via the service 3600 as described previously. However, once written to the database, the TAs (or professor acting in the role of a TA) can be allowed to edit the entries (e.g., modify, delete, combine). This would be done via the interface 3602, which could be the Question forum window described above.

4.0 The Archiving Feature

In essence, the archiving feature enables the recording and playback of lectures. This can include all or part of the stream data and meta-data generated during the lecture. More particularly, it records multiple streams (audio, video, presentation slides) in a synchronous fashion, and supports synchronized playback of all or selected ones of the recorded streams. For example, the video and audio from all the participating sites and individuals can be saved, along with the slideshow presentation and student or instructor annotations thereto. The above-described Question Forum database is part of an overall persistence scheme that is handled by the archiving feature of the present learning system.

The archived data can be used for a number of educationally interesting purposes. One primary use is to allow students to review a lecture asynchronously. The aforementioned student interface can be employed for this purpose. Thus, the interface can not only be used to monitor the lecture as it is happening, but would be configured to access the achieved lecture data and allow it to be played back, typically after the lecture is completed. Further, the student interface can be configured to send student inputs to the archiving feature. In this way, a student's work while watching the lecture can be captured, such as any bookmarking actions and notes entered into the interface. This would allow a student to play back a lecture with the retained bookmarks intact and with synchronized notes. The retained student inputs could also be used by the instructor to assess the student's progress based on the notes taken. Still further, the archiving of a lecture can be useful for analysis purposes. For example, applying voice recognition techniques to the audio streams of the archived lecture material would allow for rich indexing and searching. Applying full text indexing to the archived data streams by content would be an example of this possibility.

Figure 37:
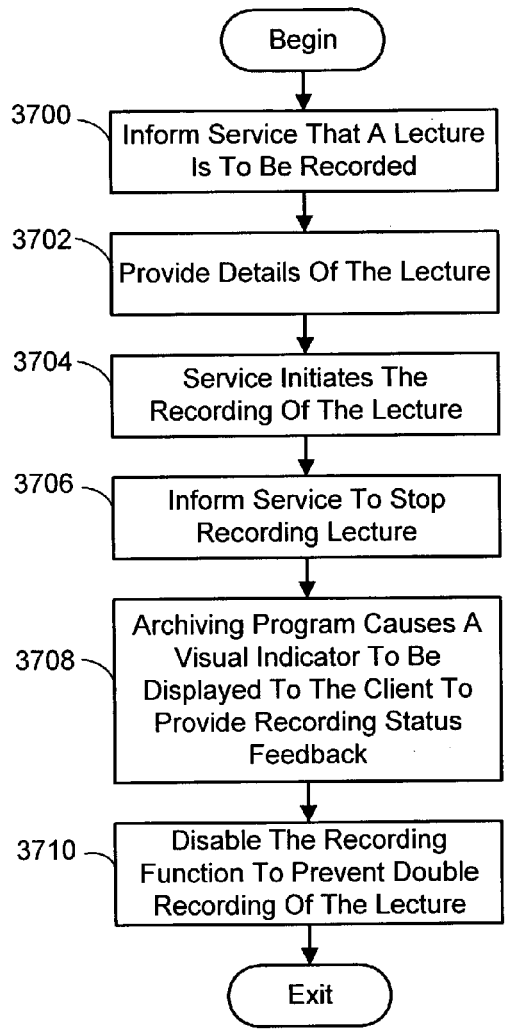
FIG. 37 is a flow chart diagramming an overall process according to the present invention for activating the archive recording feature to record a lecture in a lecture database.

In one embodiment, the archiving feature can be exposed in two ways. First, as a .NET TCP remoting service such as the one discussed in connection with the venue server and question forum database. This service would allow a customized interface to be presented to the student (e.g., as a pane in a student window associated with the student interface) that would allow access to the services of a playback system. High level commands are implemented via a graphic user interface action, such as commencing playback, stopping, fast forwarding etc, of the lecture by selecting an appropriated command button. Similarly, a feature can be incorporated into one of the previously described instructor or a TA programs that would allow a customized interface to be presented which would provided access to the services of either the playback system or a recording system. In this case, high level commands to effect the recording or playback of a lecture would be available by selecting an appropriated command button. More particularly, referring to FIG. 37, in regard to the recording system, the service is told via the aforementioned instructor or TA interface that a lecture is about to start which needs to be recorded (process action 3700). Details of the lecture are provided, such as the name and purpose of the lecture and the expected length (process action 3702). Audio, Video, and Presentation streams are recorded in a synchronized manner as indicated previously (process action 3704). In addition, the archiving program causes a visual indicator to be displayed to the client via the user interface that is designed to provide feedback to the client who requested the recording operation as to the status of the recording (process action 3706). The client can disable the user interface recording function to prevent double recording of the lecture (optional process action 3708). The service is also told to stop the recording of a lecture, assuming one is currently being recorded, via the aforementioned interfaces (process action 3710).

Figure 38:
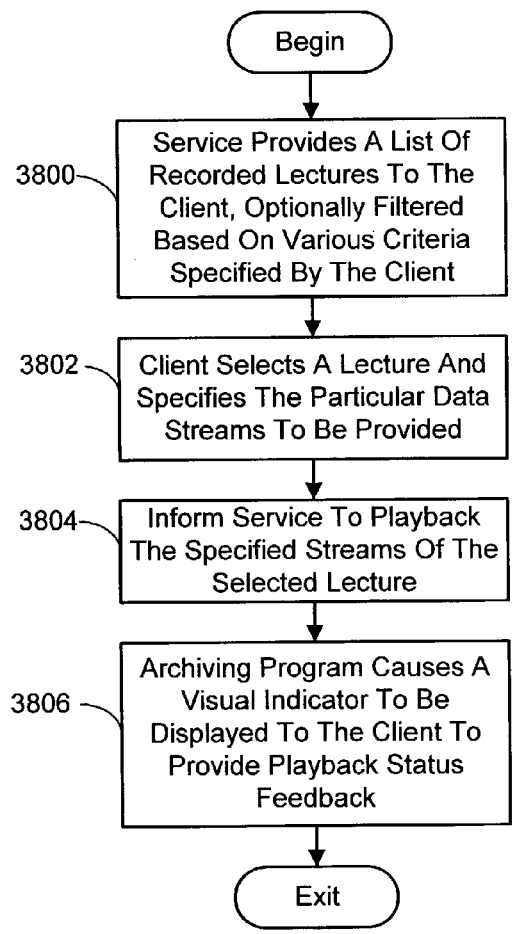
FIG. 38 is a flow chart diagramming an overall process according to the present invention for activating the archive playback feature to playback a previously recorded lecture from the lecture database.

Referring to FIG. 38, in regard to the playback system, the aforementioned service provides a list of recorded lectures, which are displayed to the client (i.e., student, instructor or TA) via their respective interfaces and which can be filtered on various criteria such as lecture name, date, group, and the like (process action 3800). In addition, the client is able to select a lecture and specify the particular streams they wish to receive (process action 3802). For example, the client could specify that only the lecturer's audio and video and the slide presentation streams be played, thereby excluding all other recorded streams such as the audio and video from the remote sites. The service is then told to arrange the playback the selected lecture via the aforementioned interfaces (process action 3804). In addition, the archiving program causes a visual indicator to be displayed to the client via the user interface that is designed to provide feedback to the client who requested the recording operation as to the status of the playback (process action 3806).

The archiving feature can also be accessed directly during playback to enable fast-forward, pause, rewind, and like functions, in addition to or as an alternative to the aforementioned service access.

4.1 The SQL Archival Platform

In one embodiment of the archiving feature, the stream data and meta-data generated during a lecture, as well as other information such as the question forum data, is persisted via a SQL server. This has the benefits of being able to add rich meta-data, and use of SQL's sophisticated querying, retrieval and post-recording analysis capabilities. In addition, enhanced blob support available in some SQL-based programs affords extremely efficient input and output (I/O).

A minimum throughput rate is preferred to make the SQL archival platform viable and the persistence architecture and design should concentrate on ensuring that this throughput can be achieved with the minimum system complexity possible. More particularly, the design is predicated on the following facts. First, disk I/O is likely to be the limiting resource. Second, disks can read/write 64 KB of data in the same time they can read/write 8K of data. And third, SQL server has two modes of accessing its on-disk information—namely sequential access, and random access, where sequential access can employ 64K reads/writes.

If sequential access can be achieved where-ever possible, a potential 8× throughput advantage is gained. This is significant given the seek times of disks and the amount of data that needs to be archived.

4.1.1 The SQL Archival Platform Recoding System

The aforementioned recording system is implemented in the SQL archival platform embodiment as follows. In general, the recording system is responsible for listening for incoming RTP traffic and persisting that traffic in SQL Server in a way that facilitates playback in the future. The system needs to support multiple streams of data of differing sizes coming in at different rates. For example, the following potential streams might be recorded:

Lecturer video feed 320×240/640×480 at 15/30 fps

Lecturer audio feed 15 Kb/s at 22 fps

Slide Presentation feed –25 k at 1 frame every 20 seconds

Whiteboard feed

Distributed audience video feeds 4×320×240 at 15 fps

Distributed audience audio feeds 4×15 Kb/s at 22 fps

The above are typical only and additional feeds for student feedback, distributed virtual mylar, among others might be recorded as well.

The main design task of the recording system is to ensure that streams of incoming RTP traffic are captured and written to SQL in an efficient manner. It achieves this by buffering the incoming frames on a per-stream basis using a series of buffers. The raw-frame data is stored in large contiguous arrays (e.g., 256 KB) and is written to SQL as a single large block when a buffer becomes full. This ensures that 64 k sequential I/O on the buffer writes is achieved.

In order to allow the frames to be reconstituted from the buffer, the system also holds a series of indexes into the buffer array, marking the start and end point of individual frames and recording the time when the frame was received. During the buffer write process these indexes are also written to SQL as a batch insert. Again by choice of index on the underlying table we are also able to ensure that this takes place as a sequential write.

4.1.1.1 The Recoding System Classes

Where possible all data-access is done through stored-procedures. This has well known advantages, such as in regard to enhanced security, improved performance (i.e., no need to parse the queries and the execution plan) and potential lessening of network traffic.

Figure 39:
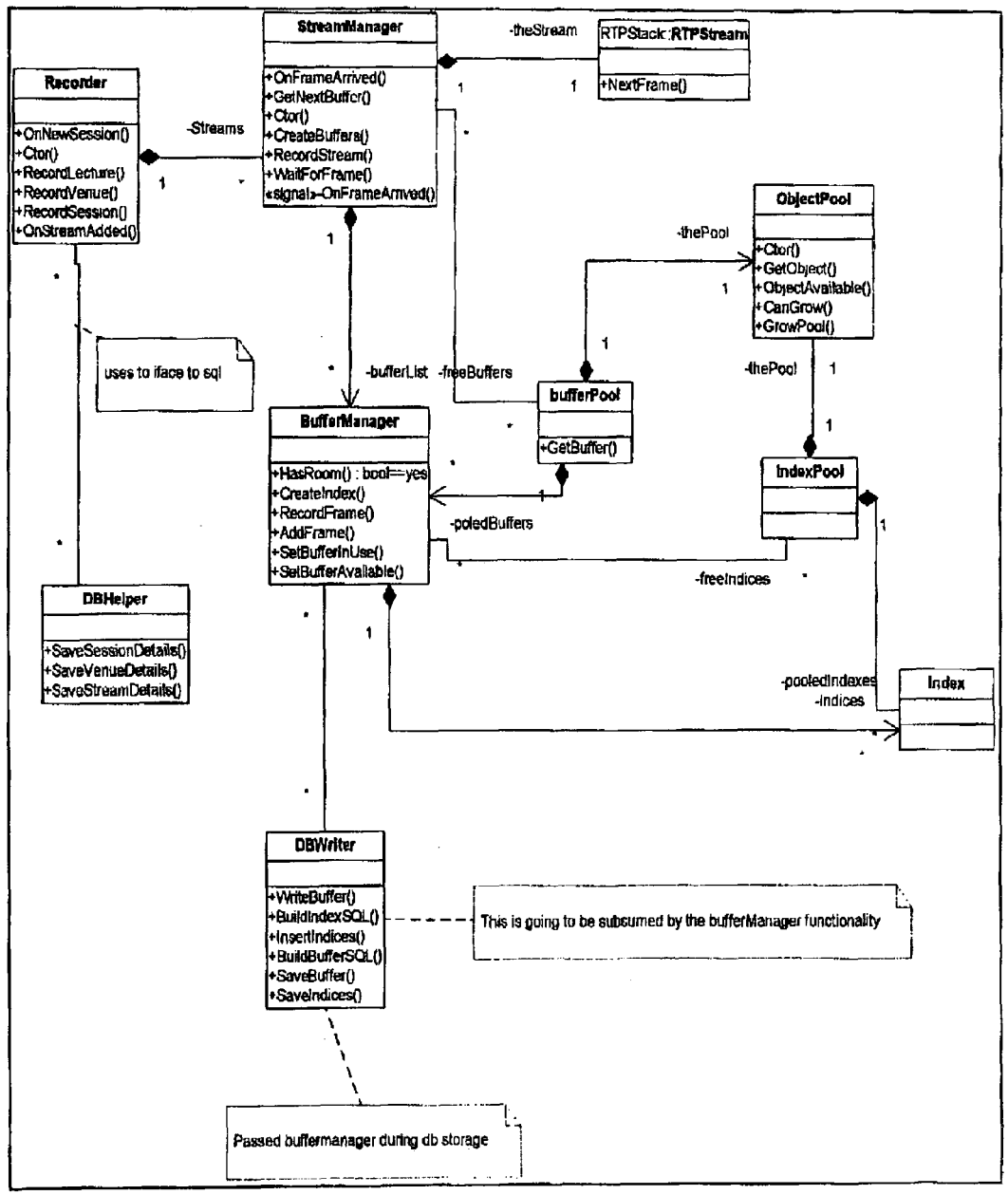
FIG. 39 is an image showing the archive object model employed to implement the archive feature of the present learning system.
Figure 40:
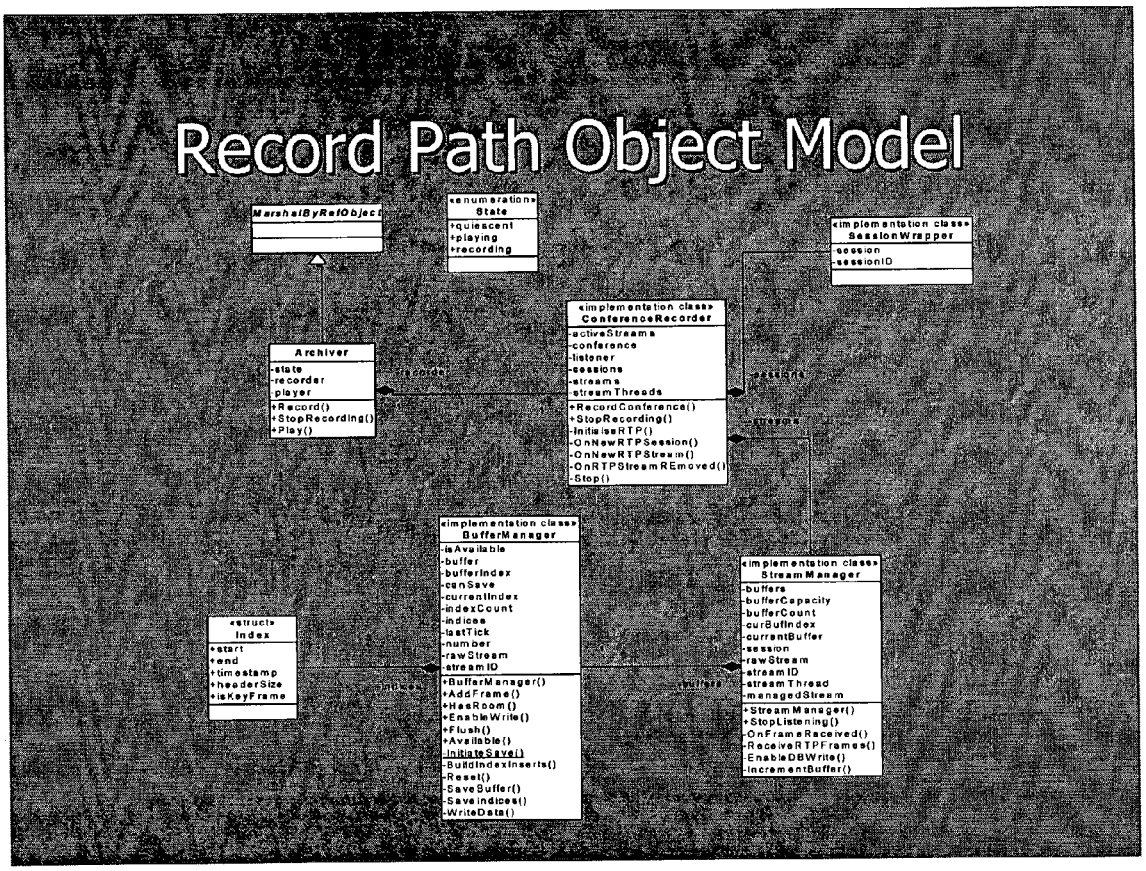
FIG. 40 is an image showing the record path object model employed to implement the archive recording feature of the present learning system.

The schema and recorder system are designed to make the extraction of n seconds of stream data from the database a very efficient operation. Namely, indexes are stored clustered on timestamp by stream. Accordingly, a 30 second block of indexes for a given stream can be retrieved using sequential I/O. In addition, the raw data for a stream is stored in a one-row-per stream format. Thus, the retrieval of the megabyte of data associated with the 30 seconds of frames can be made again using sequential 64K I/O. To accomplish this, the archive object model shown in FIG. 39 and the record path object model shown in FIG. 40, are employed. The unique classes shown in the object models are described in Table 1.

TABLE 1

| Class | Responsibilities |
|---|---|
| Recorder | Acts as the interface between the rest of the system and the external clients. Provides interfaces to the RTP stack to detect incoming streams and sessions; provides interfaces to the high-level controlling service to allow the recording and stopping of lectures. |
| StreamManager | Manages the recording of an individual RTP stream. The stream manager is responsible for reading the incoming RTP frames for a particular stream and managing the buffers used to hold those frames until they are ready to be written to disc |
| BufferManager | Manages a contiguous array of frames, and the associated index into those frames. There are a number of bufferManagers per stream and each is in one of three states: Active - currently reading frames off the wire Saving - once a buffer is filled it is marked as ready to save and a database thread is woken up to write the data out Quiescent - a buffer that is not active, and has written its contents out to SQL enters this state waiting to become active again BufferManagers are allocated to streammanagers in a circular structure. Should it happen that all buffers are currently writing to SQL, the system can grow the number of available buffers up to a pre-set maximum |

4.1.1.2 Recoding System Class Interactions

The interactions of the recording system classes will now be described. When a new stream is detected, the Recorder creates a new StreamManager to handle the incoming stream, and passes it in the underlying RTPStream object. The StreamManager allocates itself a circular array of BufferManagers to handle the incoming traffic. In addition, each BufferManager allocates a database writer thread from the .NET threadpool to be woken up when the data contained is ready to be written to the database. The StreamManager then assigns the first BufferManager as active, and enters a loop waiting on the next incoming frame from the RTP stack.

When a new frame is detected for this stream, the behavior of the system depends on whether there is room in the current BufferManager to hold the incoming frame. If there is room available, the frame is first passed to the BufferManager by the StreamManager. The BufferManager next appends the frame to the end of its internal buffer and adds a new index entry to its internal collection holding the start and end positions of the frame in the buffer and the time the frame was received. The StreamManager then returns to its listening state for the next frame. However, if the current BufferManager is full, the StreamManager informs the buffer manager that it is no longer active and should save its data to disk. The BufferManager then wakes its writer thread, which asynchronously writes the data. The buffer is written as a contiguous 256K chunk, appended to the end of a row of the RawStream table, of which there is one per stream. The indexes are batch inserted into a Frame table, which is ordered by stream identifier and timestamp for easy retrieval. The StreamManager then marks the next BufferManager in its collection as active. If there are BufferManagers available (i.e., in the quiescent state), then all is well and the StreamManager returns to its listening state. Otherwise, when there are no BufferManagers available, the StreamManager attempts to grow its BufferManager collection by one, and uses the new Buffer as the active one. There are a pre-set maximum number of buffers allowed per stream, to prevent memory runaway in pathological circumstances. If this limit has not been met then the new buffer is successfully allocated and the StreamManager returns to its listening state. However, if the preset maximum has been reached, the StreamManager discards the incoming frames until at least one buffer has become available. This status is checked for each incoming frame.

4.1.2 The SQL Archival Platform Playback System

In regard to the aforementioned playback system, it is implemented as follows in the SQL archival platform embodiment. In general, the playback system is responsible for playing back a series of streams on request. It needs to cope with the fact that streams need to be played out at variable data-rates and needs to provide some mechanism to ensure that the stream feed does not stall reading new data from the database. More particularly, stream objects are exposed through TCP remoting. This allows client control on a per-stream basis and enables scenarios such as "jump to next note", fast forward, skip in 5-second intervals, and a myriad of others. Each stream being played back contains two buffers, each holding approximately 30 seconds of stream data. One of these buffers is active and the other either waiting, or is retrieving the next block of stream data from the database. The buffers hold the raw stream data for the 30 seconds along with the block of indexes into that chunk of stream. The stream player wakes up periodically and checks to see if it is time to send out another frame. If so, it does and then returns to sleep.

4.1.2.1 The Playback System Classes

Figure 41:
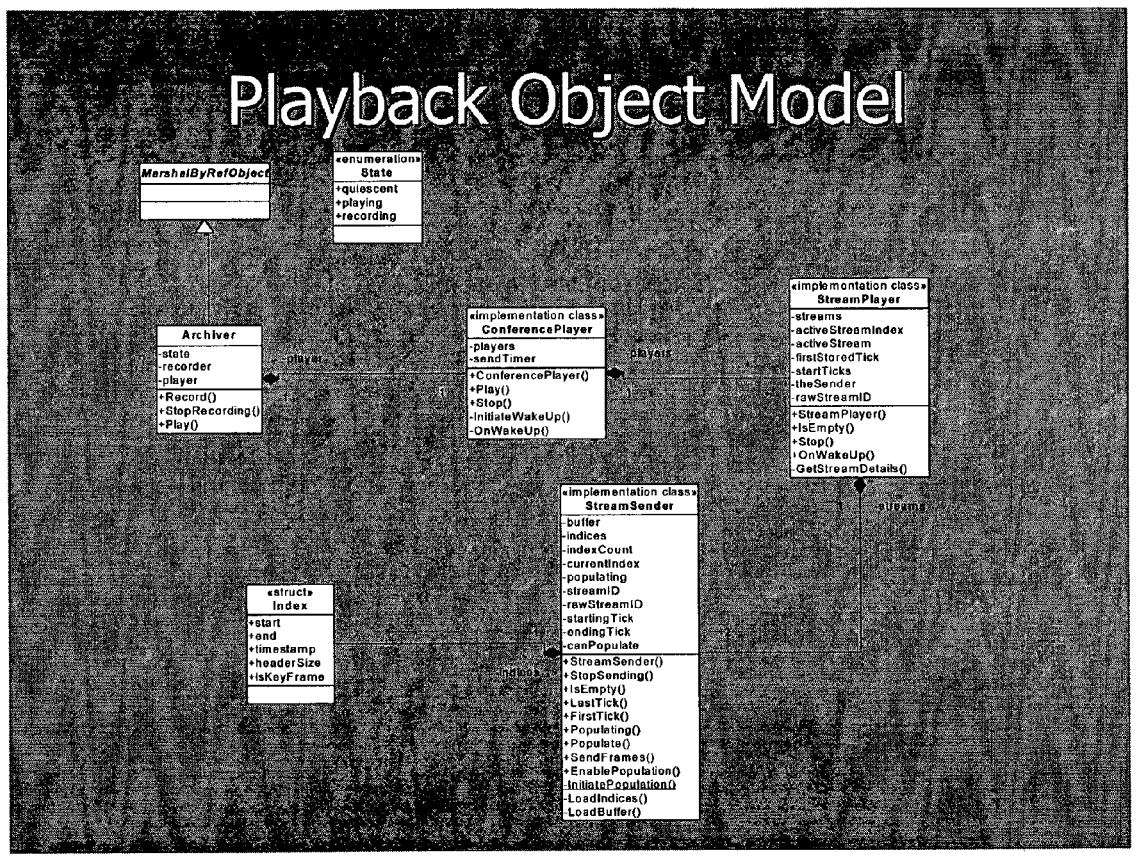
FIG. 41 is an image showing the playback object model employed to implement the archive playback feature of the present learning system.

The playback system has a simple architecture, involving just three major classes, as shown in the playback object model in FIG. 41 and described in Table 2.

TABLE 2

| Class | Responsibilities |
| --- | --- |
| ConferencePlayer | Manages the overall playback of the entire conference. Acts as the interface to the user. |
| StreamPlayer | Manages the playback of a single stream. Is associated with an RTPSender that actually pushes the frames out on the wire. The StreamPlayer contains two SenderStreams, which hold the data to be sent. |
| SenderStream | Holds a certain amount of buffered data for output. In the active state pushes the relevant frames out on the wire when the timestamp for the frame as expired. In the populating state repopulates itself with the next block of stream data from the database. Again this is done on a background thread pooled database thread |

4.1.2.2 Playback System Class Interactions

In regard to the interactions of the playback system classes, when the system is requested to playback a stream, the streamplayer creates its two internal SenderStreams and retrieves details of the stream (first timestamp and associated raw stream) from the database. The streamplayer then asks each of the SenderStreams to populate themselves with 30 seconds of stream data. In response, each sender stream populates itself with the next 30 seconds of raw data, and sets up the frame indexes into this data ordered by the time the frame was sent. The sender stream creates a database reader thread and queues it waiting for a populate-yourself event. Next, the StreamPlayer marks the first SenderStream as active, and goes to sleep specifying that it should wake up periodically (e.g., every $100^{th}$ of a second) to see if it needs to send anything. When the StreamPlayer wakes up and has work to do, it asks the active streamSender to send any frames whose timestamp has passed in the time it was asleep. In response, the active streamSender checks its frame queue and sends any frames whose timestamp has passed. It should be noted that this may involve more that one frame. The streamSender then reports back whether it has more frames held or that it is empty. If the active StreamSender still has frames left, the StreamPlayer simply goes back to sleep. However, if this StreamSender is empty, the StreamPlayer flips the active streamsender to the other sender and marks the old one as ready to populate. This then triggers the old sender to populate itself from the database on a background thread, and the StreamSender goes back to sleep unless the newly active Sender is also empty, in which case the stream must have finished sending and the StreamPlayer exits.

4.1.3 The SQL Archival Platform Database Design

Figure 42:
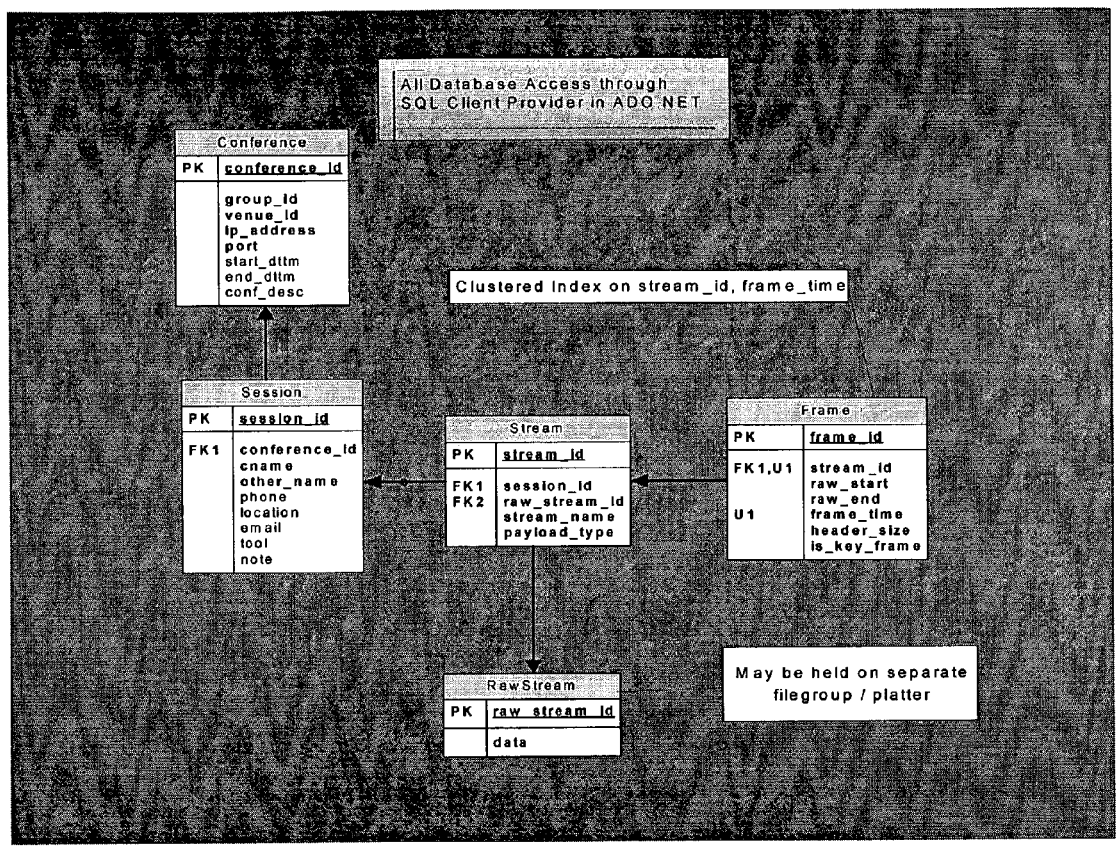
FIG. 42 is an image showing a SQL archival platform database design implementing the archive database feature of the present learning system.

FIG. 42 shows the SQL archival platform database design, and Table 3 provides definitions regarding the various tables used in the database design.

TABLE 3

| Table name | Purpose |
| --- | --- |
| Stream | Holds the basic information about a stream: the streams name and role (eg presenter video stream), and the row in the RawStream table where the raw data for this stream is held |
| Frame | Holds per-frame information: the offset into the rawStream row where this frame is held, the timestamp when the frame was written, and specific information needed by DirectShow to correctly display the frame (the size of the header and whether the frame is a key frame) |

TABLE 3-continued

| Table name | Purpose |
| --- | --- |
| RawStream | Holds the raw stream data as one long row, to which incoming buffers are appended on the end. |
| Session | Represents an RTP Session, ie a participant in a venue |
| Conference | Represents a recording of a conference. Determined by the name, venue, and time of start |

The raw stream table is one-to-one with the stream table. The tables are partitioned to allow SQL to make the most efficient use of the blob data. SQL stores blob data in a separate extent from the main table, and is most efficient when this distinction is made explicitly since it does not have to chase pointers across a number of physical IO accesses. SQL also has different behavior for small blobs (which are stored in mixed extents) and larger blobs, which are stored on dedicated extents. The initial write is of a large amount of data to prevent the extent being upgraded halfway through the process. Again, this makes more efficient use of SQL's resources as data does not have to reorganized during inserts. The frame table is the only table to have a non-trivial (i.e., not primary key or foreign key) index. This table is clustered on stream identifier and timestamp, so that requests for the next 30 seconds of stream data for this stream are contiguous and can again be satisfied by sequential I/O.

4.1.3 The SQL Archival Platform Stored Procedure Design

Table 4 points out key design features of the stored procedures.

TABLE 4

| Name | Purpose | Notes |
| --- | --- | --- |
| GetStreamDetails | Returns the start time for a given stream, and the associated raw stream | Used when a stream is first subscribed to for playback, to enable the playback buffers to be populated. The TOP 1 hint is used to make this operation reasonably efficient |
| AppendBuffer | Appends a chunk of data onto the end of the raw stream row for the current stream | Selects back the current length of the row before the append, to enable the frame indexes to be correctly offset. These selects are made with UPDLOCK hint to ensure that the row is locked between the length being recorded and the data being written. WRITETEXT is used with a null offset specified which tells the database to append to the end of the current stream. |
| ReadBuffer | Reads a block of raw stream data for the current stream | The amount of data to be read is specified by the associated index offsets. During playback 30seconds of stream traffic is buffered by default. The data is read with the NOLOCK hint to ensure that multiple readers do not block. |
| Loadindices | Loads a block of indices from the Frame table | Used during playback to gather information on a block of contiguous frames to send out. |

5.0 Alternate and Additional Features

While the invention has been described in detail by specific reference to preferred embodiments thereof, it is understood that variations and modifications thereof may be made without departing from the true spirit and scope of the invention. For example, while the user interfaces have been described as having a particular arrangement of sectors and other elements, these elements can be rearranged within the respective windows as desired. Also, the names and titles given to an element of the interfaces could be changed to any desired alternate name or title. Further, it is noted that while full-featured versions of the interfaces were described, versions having fewer of these features are also possible and within the scope of the present invention. In regard to the previously described wireless tablet PC, it is noted that this could be substituted for by the aforementioned presentation computer and a monitor/keyboard/mouse arrangement connected to the computer and made available to the presenter (e.g., at a podium) to run the presentation and view the slideshow window. Finally, it is noted that a third camera can be employed at the presenter's site. This third camera would be trained on the presenter. One of the cameras trained on the presenter would provide close-up views, while the other would provide an overview of the presenter.

Wherefore, what is claimed is:

1. A learning system for providing an interactive, educational lecture, comprising:
   a plurality of computing devices, each of which is in communication with the same distributed computer network, and at least one of which is located at a site where a presenter of the lecture is located and each remote location participating in the lecture;
   equipment sets for capturing audio and video (A/V) at the presenter's site and remotes sites, and providing it via a computing device resident at the site to the network, wherein one of the A/V equipment sets is resident at the presenter's site and wherein other ones of the A/V equipment sets are respectively resident in at least some of the remote sites; and wherein
   the computing device in communication with the A/V equipment set resident at the presenter's site further comprises a A/V computer program having program modules executable by the computing device, wherein the computing device is directed by the program modules of the A/V computer program to,
   multicast A/V data captured by the A/V equipment set resident at the presenter's site over the network;
   subscribe to A/V data multicast from remote sites via the network, and
   render and play the A/V data received over the network from the remote sites; and wherein
   one of (i) the computing device in communication with the A/V equipment set resident at the presenter's site, or (ii) another one of said computing devices also resident at the presenter's site, further comprises a slideshow computer program having program modules executable by the computing device for directing the computing device to broadcast presentation slide data associated with the lecture over the network; and wherein
   the computing device resident at each remote location further comprises a computer program having program modules executable by the computing device, wherein the computing device is directed by the program modules of the remote location's computing device computer program to multicast a still thumbnail image separately from the A/V data to the presenter's site and the other remote locations via the network, wherein said thumbnail image is representative of the remote location, and wherein each thumbnail image received at a remote location is displayed separately from said A/V data and presentation slide data.

2. The system of claim 1, further comprising one or more displays located at the presenter's site which are viewable by an audience at the site, and wherein said A/V computer program further comprises a program module for rendering the audio and video data generated by the A/V equipment set resident at the presenter's site and playing the rendered A/V in a first sector of a presence window displayed on said one or more displays.

3. The system of claim 2, wherein the presenter's site computing device computer program further comprises a program module for displaying thumbnail images received from said remote locations via the network in a thumbnail sector of the presence window displayed on said one or more displays, wherein each thumbnail image is displayed separately from said A/V data and presentation slide data.

4. The system of claim 3, wherein said remote locations comprise at least one site where an individual participating in the lecture is located, and wherein a thumbnail image received from a site where an individual participating in the lecture is located represents that individual lecture participant.

5. The system of claim 1, further comprising one or more displays located at the presenter's site which are viewable by an audience at the site, and wherein the slideshow computer program further comprises a program module for rendering the presentation slide data and displaying presentation slides associated therewith in a first sector of a workspace window displayed on said one or more displays.

6. The system of claim 1, further comprising an A/V computer program resident on a computing device in communication with an A/V equipment set resident at a remote site, wherein the remote site A/V computer program comprises program modules executable by the computing device for directing the computing device to:
  multicast A/V data captured by the A/V equipment set resident at the remote site over the network;
  subscribe to A/V data multicast from the presenter's site and other remote sites via the network;
  render and play the A/V data received over the network from the presenter's site and other remote sites.

7. The system of claim 6, wherein the remote site computing device A/V computer program further comprises a program module for displaying thumbnail images received from other remote locations via the network in a thumbnail sector of the presence window displayed on said one or more displays.

8. The system of claim 7, wherein said remote locations comprise at least one site where an individual participating in the lecture is located, and wherein a thumbnail image received from another remote location where an individual participating in the lecture is located represents that individual lecture participant.

9. The system of claim 1, respectively further comprising an A/V computer program resident on a computing device in communication with an A/V equipment set resident at each remote site, wherein the remote site A/V computer program comprises program modules executable by the computing device for directing the computing device to multicast A/V data captured by the A/V equipment set resident at the remote site over the network.

10. A process for providing an interactive, educational lecture, comprising:
  multicasting A/V data captured by an A/V equipment set resident at a site where the presenter of the lecture is located using a computing device that is in communication with the presenter's site A/V equipment set and which is one of a plurality of computing devices, each of which is in communication with the same distributed computer network, and at least one of which is located at the presenter's site and wherein the A/V data is multicast over the network to remote sites where one or more people have gathered to participate in the lecture;
  multicasting A/V data captured by an A/V equipment set resident at a remote site using a computing device that is in communication with the remote site's A/V equipment set and which is one of the plurality of computing devices, each of which is in communication with the same distributed computer network, and wherein the A/V data is multicast over the network to the presenter's site and other ones of the remote sites;
  broadcasting presentation slide data associated with the lecture over the network to said remote sites using one of (i) the computing device in communication with the A/V equipment set resident at the presenter's site, or (ii) another one of said computing devices also resident at the presenter's site; and
  multicasting a still thumbnail image separately from the A/V data from each of the remote sites using the remote site's computing device to the presenter's site and the other ones of the remote sites via the network, wherein said thumbnail image is representative of the remote location, and wherein each thumbnail image is separate from said A/V data and presentation slide data.

11. A process for participating in an interactive, educational lecture from a site remote from the site where the lecture is being presented or at the site where the lecture is being given, comprising:
  multicasting A/V data captured by an A/V equipment set resident at the participating site using a computing device that is in communication with the A/V equipment set and which is one of a plurality of computing devices, each of which is in communication with the same distributed computer network, and one of which is located at the participating site, and wherein the A/V data is multicast over the network to the site where the lecture is being presented and other remote sites where one or more people have gathered to participate in the lecture;
  receiving A/V data multicast over the network from the site where the lecture is being presented and the other remote sites where one or more people have gathered to participate in the lecture using the computing device;
  receiving broadcasted presentation slide data associated with the lecture over the network using the computing device;
  receiving a still thumbnail image separate from the A/V data from each of the remote site via the network using the computing device, said thumbnail image being representative of that remote site;
  rendering the A/V data received from the lecture site and each remote site and playing the rendered A/V in an A/V sector of a presence window displayed on one or more displays located at the participating site which are viewable by an audience at that site;
  displaying thumbnail images received from said remote sites in a thumbnail sector of the presence window which is separate from the A/V sector; and
  rendering the presentation slide data received over the network and displaying presentation slides associated therewith in a workspace window displayed on one or more displays located at the participating site which are viewable by the audience at that site, wherein said workspace window is separate from the thumbnail and A/V sectors of the presence window.

* * * * *

UNITED STATES PATENT AND TRADEMARK OFFICE
CERTIFICATE OF CORRECTION

PATENT NO. : 7,733,366 B2  Page 1 of 1
APPLICATION NO. : 10/371537
DATED : June 8, 2010
INVENTOR(S) : Jay Beavers et al.

It is certified that error appears in the above-identified patent and that said Letters Patent is hereby corrected as shown below:

In column 54, line 5, in Claim 10, after "site" insert -- , --.

Signed and Sealed this
Tenth Day of May, 2011

David J. Kappos
*Director of the United States Patent and Trademark Office*